United States Patent
McLeay

(10) Patent No.: US 9,168,977 B2
(45) Date of Patent: Oct. 27, 2015

(54) VEHICLE SUSPENSION SYSTEM

(71) Applicant: Hugh McLeay, Black Forest (AU)

(72) Inventor: Hugh McLeay, Black Forest (AU)

( * ) Notice: Subject to any disclaimer, the term of this patent is extended or adjusted under 35 U.S.C. 154(b) by 0 days.

(21) Appl. No.: 14/382,162

(22) PCT Filed: Mar. 1, 2013

(86) PCT No.: PCT/AU2013/000196
§ 371 (c)(1),
(2) Date: Aug. 29, 2014

(87) PCT Pub. No.: WO2013/126968
PCT Pub. Date: Sep. 6, 2013

(65) Prior Publication Data
US 2015/0035241 A1     Feb. 5, 2015

(30) Foreign Application Priority Data

Mar. 2, 2012   (AU) ................................. 2012900828

(51) Int. Cl.
*B62M 9/16*       (2006.01)
*B60G 11/12*      (2006.01)
(Continued)

(52) U.S. Cl.
CPC .. *B62M 9/16* (2013.01); *B60G 3/20* (2013.01); *B60G 11/12* (2013.01); *B62K 25/04* (2013.01);
(Continued)

(58) Field of Classification Search
CPC ....... B62M 9/16; B62K 25/04; B62K 25/283; B62K 25/28; B62K 2025/044; B60G 3/20; B60G 11/12; B60G 2204/421; B60G 2300/12
See application file for complete search history.

(56) References Cited

U.S. PATENT DOCUMENTS 5,121,937 A * 6/1992 Lawwill .......................... 280/284
5,217,241 A * 6/1993 Girvin ............................ 280/284

(Continued)

FOREIGN PATENT DOCUMENTS

JP     2000247282 A     9/2000

OTHER PUBLICATIONS

International Search Report for corresponding PCT International application No. PCT/AU2013/000196 dated Jun. 14, 2013.
(Continued)

*Primary Examiner* — Drew Brown
(74) *Attorney, Agent, or Firm* — Erickson Kernell Derusseau & Kleypas, LLC

(57) ABSTRACT

A driven wheel suspension system for a vehicle (100) having a chassis (12) suspended from a driven wheel (10) is disclosed. The suspension system includes a suspension mechanism including a driven wheel carrier member (11) rotatably connected to the driven wheel (10). The suspension mechanism is configured to isolate the movement of the driven wheel 10 from the movement of the chassis (12). The driven wheel (10) is movable a distance relative to the chassis (12) which defines a suspension travel. The driven wheel suspension system further includes a drive train including a looped power transmission element configured to transmit power between the driven wheel (10) and a power source mounted on the chassis (12). An idler member (31) is rotatably mounted on an idler carrier member (20) that is movable relative to both the chassis (12) and driven wheel earner member (11). The idler member (31) is configured to engage with a power transmitting segment (33) of the looped power transmission element and move to follow a predetermined path as a function of suspension travel, to thereby alter a path of said power transmitting segment (33) of the looped power transmission element. Altering the path of the power transmitting segment (33) of the looped power transmission element results in a lengthening or shortening of the power transmitting segment (33) of the looped power transmission element. The driven wheel suspension system of the present invention has many applications, including but not limited to a rear wheel suspension system for a bicycle.

22 Claims, 36 Drawing Sheets

(51) Int. Cl.
*B62K 25/28* (2006.01)
*B60G 3/20* (2006.01)
*B62K 25/04* (2006.01)

(52) U.S. Cl.
CPC ............... *B62K 25/28* (2013.01); *B62K 25/283* (2013.01); *B60G 2204/421* (2013.01); *B60G 2300/12* (2013.01); *B62K 2025/044* (2013.01)

(56) References Cited

U.S. PATENT DOCUMENTS

| | | | |
|---|---|---|---|
| 5,403,028 A | | 4/1995 | Trimble |
| 5,762,353 A | | 6/1998 | Miller |
| 5,791,674 A | * | 8/1998 | D'Aluisio et al. ............ 280/284 |
| 6,203,042 B1 | * | 3/2001 | Wilcox ........................ 280/284 |
| 6,845,998 B2 | * | 1/2005 | Probst ......................... 280/284 |
| 7,828,314 B2 | * | 11/2010 | Weagle ........................ 280/284 |
| 8,235,409 B2 | * | 8/2012 | Colegrove et al. ............ 280/284 |
| 8,696,008 B2 | * | 4/2014 | Hoogendoorn ............... 280/284 |
| 8,998,235 B2 | * | 4/2015 | Beale ........................... 280/284 |
| 2006/0071444 A1 | | 4/2006 | Griffiths |
| 2006/0225942 A1 | * | 10/2006 | Weagle ........................ 180/357 |
| 2007/0024022 A1 | | 2/2007 | Weagle |
| 2008/0067772 A1 | * | 3/2008 | Weagle ................... 280/124.134 |
| 2009/0223730 A1 | * | 9/2009 | Arnold ......................... 180/231 |
| 2009/0223731 A1 | * | 9/2009 | Arnold ......................... 180/231 |
| 2010/0109282 A1 | * | 5/2010 | Weagle ........................ 280/284 |

OTHER PUBLICATIONS

Written Opinion of the International Searching Authority for corresponding PCT International application No. PCT/AU2013/000196 dated Jun. 14, 2013.

* cited by examiner

VEHICLE SUSPENSION SYSTEM

PRIORITY DOCUMENTS

The present application claims priority from Australian Provisional Patent Application No 2012900828 entitled "A Vehicle Suspension System" and filed on 2 Mar. 2012, the entire content of which is hereby incorporated by reference in its entirety.

FIELD OF THE INVENTION

The present invention relates to a vehicle suspension system for a chain or belt driven vehicle such as a bicycle or a motorcycle. In particular, the invention relates to the dynamic behaviour of a vehicle of this type under powered acceleration or braking.

BACKGROUND OF THE INVENTION

A wheeled vehicle such as a bicycle or motorcycle is used to traverse a variety of terrain. These vehicles are designed to use a power source to drive a wheel or wheels through a power transmission system known as a drivetrain. A chain or belt driven drivetrain transfers rotary motion from the power source to the ground via a tractive or driving force between the wheel or wheels and the ground. It is this driving force that is responsible for powered acceleration of the vehicle. In some vehicles, for example a motorcycle, braking forces may also be transferred through the drivetrain to decelerate the vehicle.

Some wheeled vehicles have a suspension system that uses a spring and damper to isolate and control the movement of the vehicle's wheel(s) from the movement of its suspended mass (the suspended mass comprises the total sprung mass including the vehicle chassis and operator). A suspension system allows the suspended wheel(s) to move a distance known as the suspension travel, as the suspension is moved from a fully extended state to a fully compressed state. A suspension system may be designed so that a vehicle reacts to terrain undulations in a predictable manner. Other design goals may also be optimised such as passenger comfort, energy efficiency and traction.

For nearly all wheeled vehicles, when the vehicle accelerates there is an increase in force between the rear wheel(s) and the terrain. This occurs in conjunction with a decrease in force between the front wheel(s) and the terrain. This phenomenon is known in the field of vehicle dynamics as 'weight transfer'. The opposite occurs when a vehicle decelerates.

For a vehicle having a suspension system, 'weight transfer' can have a significant effect on the dynamic behaviour of the vehicle. During weight transfer, a vehicle having a suspension system may exhibit some compression/extension of the suspension system due to the increased/decreased loading that occurs. Typically, as a suspended vehicle accelerates (for example from a stationary position to a moving state), weight transfer causes the rear of the suspended mass to move closer to the ground ('squat'), while causing the front of the suspended mass to move away from the ground ('rise'). The opposite occurs when a vehicle decelerates. Typically, during deceleration, weight transfer causes the rear of the suspended mass to 'rise', and the front of the suspended mass to 'dive'.

For a vehicle having a suspension system, it is known that when power is transmitted through the drivetrain, forces are applied to movable elements of the suspension system which can alter its behaviour. Under powered acceleration or braking, a suspension system therefore has forces acting on it due to weight transfer and also due to power transmission through the drivetrain. For a vehicle with a rear driven wheel suspension system, the squat that occurs due to weight transfer under powered acceleration may be counteracted by the forces which are imparted into the suspension system by the drivetrain. In this way, an extension force may be generated in the rear suspension system that can counteract the compression force that occurs due to weight transfer. A vehicle with this characteristic is said to exhibit 'anti-squat'. Similarly, the rise that occurs due to weight transfer under braking may also be counteracted by the forces which are imparted into the suspension system by the drivetrain. In this way, a compression force may be generated in the rear suspension system that can counteract the extension force that occurs due to weight transfer. A vehicle with this characteristic is said to exhibit 'anti-rise'.

The dynamic behaviour of the vehicle under powered acceleration and braking is therefore dependent on how much anti-squat and anti-rise the vehicle exhibits throughout its entire range of suspension travel (referred to herein as the acceleration response and braking response respectively). For a front driven wheel suspension, the acceleration response would refer to 'anti-rise' and the braking response would refer to 'anti-dive'.

Acceleration response and braking response are important design considerations for vehicle suspension designers as they directly influence the dynamic feel, handling and performance of the vehicle. There are currently many limitations which a suspension designer faces when trying to design a vehicle suspension system having a desired acceleration response. Often a particular acceleration response cannot be achieved without affecting other important design variables such as the driven wheel path, location of the power source or some other aspect of vehicle geometry that may have been optimised to meet other goals. It would be therefore be advantageous to have a suspension system that allowed the acceleration response to be tuned independently from the existing structural vehicle geometry so that other design variables are not compromised.

Further, the acceleration or braking response able to be achieved with most vehicles is limiting and it may not be possible at all to achieve a desired acceleration or braking response with some suspension systems. It would therefore be advantageous if there was a suspension system that allowed a vehicle to achieve any desired acceleration or braking response that would be practically useful.

SUMMARY OF THE INVENTION

According to one aspect of the invention there is provided a driven wheel suspension system for a vehicle having a chassis suspended from a driven wheel, including:
  a suspension mechanism including a driven wheel carrier member rotatably connected to the driven wheel, the suspension mechanism configured to isolate the movement of the driven wheel from the movement of the chassis, the driven wheel movable a distance relative to the chassis which defines a suspension travel;
  a drivetrain including a looped power transmission element configured to transmit power between the driven wheel and a power source mounted on the chassis; and
  an idler member rotatably mounted on an idler carrier member that is movable relative to both the chassis and driven wheel carrier member, said idler member configured to engage with a power transmitting segment of the looped power transmission element and move to follow a predetermined path as a function of suspension travel, to thereby alter a path of said power transmitting segment of the looped power transmission element, wherein, altering the path of said power transmitting segment of the looped power transmission element results in a lengthening or shortening of the power transmitting segment of the looped power transmission element.

In one form, the idler member is rotatably mounted on an idler carrier member that forms part of a linkage mechanism.

In one form, the idler member is rotatably mounted on an idler carrier member that forms part of a crank and slider mechanism.

In one form, the idler member is rotatably mounted on an idler carrier member that forms part of a geared mechanism.

In one form, the idler member is rotatably mounted on an idler carrier member that forms part of a belt and pulley mechanism.

In one form, the suspension mechanism is a single-pivot arrangement whereby the driven wheel carrier member is pivotally connected to the chassis. In alternative forms, the suspension mechanism may be a four bar linkage, a six bar linkage or slidable on linear tracks in a slider-slider configuration.

In one form, the looped transmission member is a chain and the idler member is a sprocket. Alternatively, the looped transmission member may be a belt and the idler member is a pulley.

In one form, the power source is a motor or engine. Alternatively, the power source may be a human.

In one form, the driven wheel is a rear wheel of the vehicle. In another form, it may be the front wheel.

In one form, idler member is configured such that the power transmitting segment of the looped power transmission element is routed above the idler member. Alternatively, it may be configured such that the power transmitting segment of the looped power transmission element is routed below the idler member.

In one form, the vehicle is a bicycle. In another form, the vehicle is a motorcycle.

In one form, the power transmitting segment of the looped transmission element is an upper run of the looped transmission element. Alternatively, it may be a lower run.

In another aspect of the invention there is provided a driven wheel suspension system for a bicycle having a chassis suspended from a rear driven wheel, including:
 a suspension mechanism including a driven wheel carrier member rotatably connected to the driven wheel, the suspension mechanism configured to isolate the movement of the driven wheel from the movement of the chassis, the driven wheel movable a distance relative to the chassis which defines a suspension travel;
 a drivetrain configured to transmit power between the driven wheel and a power source mounted on the chassis, the drivetrain including:
  a driving sprocket rotatably mounted to the chassis that receives power from the power source;
  a driven sprocket mounted to the driven wheel;
  a chain looped around and engaged with the driving sprocket and the driven sprocket; and
 an idler member rotatably mounted on an idler carrier member that is movable relative to both the chassis and driven wheel carrier member, said idler member configured to engage with a power transmitting segment of the looped power transmission element and move to follow a predetermined path as a function of suspension travel, to thereby alter a path of said power transmitting segment of the looped power transmission element,
 wherein, altering the path of said power transmitting segment of the chain results in a lengthening or shortening of the power transmitting segment of the chain.

In yet a further aspect of the invention there is provided a power transmitting wheel suspension system for a motorcycle having a chassis suspended from a rear power transmitting wheel, including:
 a suspension mechanism including a power transmitting wheel carrier member rotatably connected to the power transmitting wheel, the suspension mechanism configured to isolate the movement of the power transmitting wheel from the movement of the chassis, the power transmitting wheel movable a distance relative to the chassis which defines a suspension travel;
 a drivetrain configured to transmit power between a power source or power sink mounted on the chassis and the power transmitting wheel, the drivetrain including:
  a front sprocket rotatably mounted to the chassis and operatively connected to the power source or power sink;
  a rear sprocket fixed to the power transmitting wheel;
  a chain looped around and engaged with the front sprocket and the rear sprocket; and
 an idler member rotatably mounted on an idler carrier member that is movable relative to both the chassis and power transmitting wheel carrier member, said idler member configured to engage with a power transmitting segment of the looped power transmission element and move to follow a predetermined path as a function of suspension travel, to thereby alter a path of said power transmitting segment of the looped power transmission element,
 wherein, altering the path of said power transmitting segment of the chain results in a lengthening or shortening of the power transmitting segment of the chain.

In one form, the power sink is a friction device. In other forms, the power sink may be an energy recovery system such as a generator or flywheel.

In a further aspect of the invention there is provided a vehicle having a chassis and a power transmitting wheel, including:
 a drivetrain having a chain or belt and configured to:
  (a) transmit power between the power transmitting wheel and a power source mounted to the chassis in order to accelerate the vehicle; or
  (b) transmit power between the power transmitting wheel and a power sink mounted to the chassis in order to brake the vehicle;
 a suspension mechanism including a power transmitting wheel carrier member rotatably connected to the power transmitting wheel, the suspension mechanism configured to isolate the movement of the power transmitting wheel from the movement of the chassis, the power transmitting wheel movable a distance relative to the chassis which defines a suspension travel; and
 an idler member rotatably mounted on an idler carrier member that is movable relative to both the chassis and power transmitting wheel carrier member, said idler member configured to engage with a power transmitting segment of the chain or belt and move to follow a predetermined path as a function of suspension travel, to thereby alter a path of said power transmitting segment of the chain or belt,
 wherein, altering the path of said power transmitting segment of the chain or belt results in a lengthening or shortening of the power transmitting segment of the chain or belt.

BRIEF DESCRIPTION OF THE DRAWINGS

Various aspects of the present invention will be described in detail with reference to the following drawings in which:

FIG. 23b shows an acceleration and braking response for the suspension system shown in FIG. 23a.

In the following description, like reference characters designate like or corresponding parts throughout the several views of the drawings.

DETAILED DESCRIPTION OF THE INVENTION

Figure 1A:
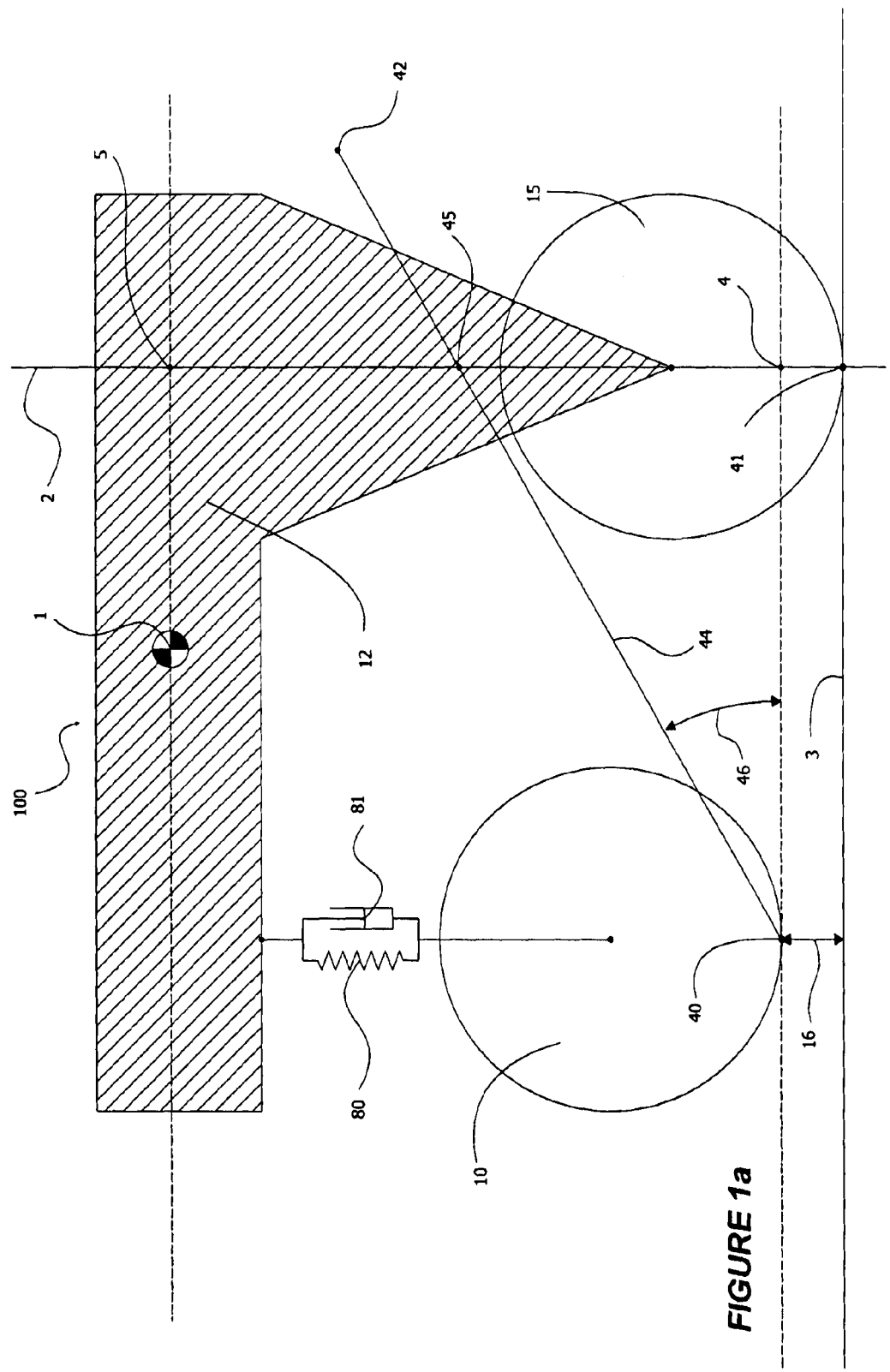
FIGS. 1a-1c provide diagrammatic representations of a vehicle driven wheel suspension system for the purposes of defining the quantity of 'anti-squat'.

This invention relates to the dynamic behaviour of vehicle suspension systems under powered acceleration or braking. In particular, chain or belt driven vehicles in which power is transmitted between a 'power transmitting wheel' and a chassis mounted power source (acceleration) or power sink (braking). When describing acceleration of a vehicle, the term 'driven wheel' is used to describe the 'power transmitting wheel'. Likewise, when describing braking of a vehicle, the term 'braking wheel' may be used to describe the 'power transmitting wheel'. However, a driven wheel and a braking wheel may refer to the same physical wheel, just with power transmitted in the opposite direction. Before the invention is described with reference to the illustrative embodiments, some key concepts and definitions will first be described.

When a vehicle accelerates, there is an increase in force between the rear wheel(s) and the terrain. This occurs in conjunction with a decrease in force between the front wheel(s) and the terrain. The opposite occurs when a vehicle decelerates. This phenomenon is known in the field of vehicle dynamics as 'weight transfer'. During weight transfer, a vehicle having a suspension system may exhibit some compression/extension of the suspension system due to the increased/decreased loading that occurs. Typically, as a suspended vehicle accelerates (for example from a stationary position to a moving state), weight transfer causes the rear of the suspended mass to move closer to the ground ('squat'), while causing the front of the suspended mass to move away from the ground ('rise').

Similarly, as a suspended vehicle decelerates under braking (for example from a moving state to a stationary position), weight transfer causes the front of the suspended mass to move closer to the ground ('dive'), and the rear of the suspended mass to move away from the ground ('rise').

For the case of a vehicle having a suspension system, when a vehicle undergoes powered acceleration, power is transmitted through the vehicle's drivetrain (from the power source to its driven wheel(s)) and forces are applied to the movable elements of the suspension system. The drivetrain forces can affect the overall behaviour of the suspension system. In other words, the drivetrain forces can generate an extension or compression force in the suspension system. Therefore, power transmission can increase or decrease the amount of squat, rise or dive exhibited by the suspension system under powered acceleration (depending on whether the suspension is at the front or rear of the vehicle). In the same way that drivetrain power transmission can affect the behaviour of the suspension system under powered acceleration, braking forces can also affect the behaviour of the suspension system during deceleration (braking). Braking forces may be used to increase or decrease the amount of rise or dive exhibited by the suspension system under deceleration.

With specific reference to a vehicle having a rear suspension system, if the drivetrain forces result in a suspension system having a reduced (or even zero) amount of squat under powered acceleration the suspension system is said to have 'anti-squat'. That is, under powered acceleration, the drivetrain forces act in a manner that reduces the amount of squat that would otherwise be exhibited. Similarly, if the braking forces result in a suspension system having a reduced (or even zero) amount of rise under braking the suspension system is said to have 'anti-rise'. That is under braking, the braking forces act in a manner that reduces the amount of rise that would otherwise be exhibited. Similar definitions apply to 'anti-dive' and 'anti-rise' for a vehicle having a front wheel suspension.

In this specification, the invention is described mainly with reference to the quantity of anti-squat. Anti-squat is defined as follows in Table 1.

TABLE 1

Anti-Squat Definition

| % Anti-Squat | Definition |
|---|---|
| >100 | The drivetrain force extending the suspension system is greater than the weight transfer force compressing the suspension system. This will result in an overall suspension system that extends under powered acceleration. |
| 100 | The drivetrain force extending the suspension system is exactly balanced by the weight transfer force compressing the suspension system. This will result in an overall suspension system that neither extends nor compresses, under powered acceleration. |
| 1-99 | The drivetrain force extending the suspension system is less than the weight transfer force compressing the suspension system. This will result in an overall suspension system that compresses under powered acceleration. |

TABLE 1-continued

Anti-Squat Definition

| % Anti-Squat | Definition |
|---|---|
| 0 | The drivetrain force does not influence the suspension system; however the weight transfer force does compress the suspension system. This will result in an overall suspension system that compresses under powered acceleration. |
| <0 | The drivetrain force compresses the suspension system, adding to the compression caused by the weight transfer force. This will result in an overall suspension system that compresses under powered acceleration. |

In the majority of suspension systems, the quantity of Anti-Squat will vary as a function of suspension travel. It is therefore useful to graph the quantity of Anti-Squat, as a function of suspension travel (Anti-Squat on y-axis, suspension travel on x-axis). This graph can be considered as an 'acceleration response', describing the behaviour of the vehicle under powered acceleration, for its entire range of travel.

Some suspension systems exhibit an acceleration response, which has a decreasing quantity of Anti-Squat as the suspension is compressed (the acceleration response is a curve with negative slope). Some suspension systems exhibit an acceleration response, which has an increasing quantity of Anti-Squat as the suspension is compressed (the acceleration response is a curve with positive slope). Some suspension systems exhibit an acceleration response, which has a constant quantity of Anti-Squat as the suspension is compressed (the acceleration response is a flat line (or close to it)). More advanced suspension systems exhibit an acceleration response, where the quantity of anti-squat strategically varies throughout the suspension travel, to produce a variety of desired vehicle behaviours at different points throughout the suspension travel. These types of acceleration responses can be complex, and can have a curve that rapidly changes direction. Some curves might have one or two turning points (where the slope of the curve changes from a positive value to a negative value or vice-versa).

For a vehicle having a chain or belt drivetrain, a common strategy for manipulating the acceleration response is to design some distancing or angular displacement between the input and output sprockets, so that the length of the drivetrain increases or decreases as a function of suspension travel. Usually this is achieved by altering the path of the driven wheel. Basic suspension systems use a single pivot mechanism to control the wheel path. More advanced suspension systems feature a multi-link arrangement, providing more control over the path of the driven wheel, therefore providing more control over the shape of the acceleration response. For many suspension systems, a positive amount of chain growth throughout some/most/all of the suspension travel range is desirable to provide adequate amounts of Anti-Squat. The present invention provides a means for manipulating the acceleration response, without affecting the path of the driven wheel. Further, the acceleration response can be tuned with greater flexibility than is possible with current suspension systems.

Similar to how quantities of anti-squat are defined in Table 1, definitions can also be applied to the concept of anti-rise for a rear driven wheel suspension system under braking. The quantity of anti-rise may be graphed as a function of suspension travel to produce a 'braking response'. The braking response describes the behaviour of the vehicle under braking, for its entire range of travel.

The invention described in this specification may be applicable to control any of the following modes of vehicle behaviour (although the invention is described with reference mainly to anti-squat):

Anti-Squat (rear driven wheel suspension under powered acceleration)
Anti-Rise (rear driven wheel suspension under braking)
Anti-Dive (front driven wheel suspension under braking)
Anti-Rise (front driven wheel suspension under powered acceleration).

The amount of 'anti-squat' exhibited by a particular suspension system may be quantified graphically for each instantaneous point in a vehicle's suspension travel. With reference to FIG. 1a, a simple graphical representation of 'anti-squat' is provided. In FIG. 1a there is shown a vehicle 100 having a driven wheel suspension system. The vehicle 100 has a chassis 12 supported by a driven wheel 10 and a non-driven wheel 15. The suspension system acts to isolate movement of the chassis 12 from movement of the driven wheel 10. FIG. 1a may be regarded as having an arbitrary suspension mechanism (not shown) operating between the driven wheel 10 and chassis 12 and controlled by a spring 80 and damper 81. In this figure and throughout the specification, the chassis 12 is part of the overall suspended mass of the vehicle (which may also include for example the operator of the vehicle). The suspended mass has a centre of gravity 1. When discussing vehicle dynamics, the term suspended mass is often used. When discussing physical structure the term chassis may be used for clarity. It is to be understood that, unless indicated otherwise, in this specification a reference to the term chassis, should be understood as a reference also to the suspended mass of the vehicle. For the vehicle 100 shown in FIG. 1a, there is a power source (not shown) mounted on the chassis 12 that transmits power through a drivetrain to the driven wheel 10 to produce acceleration of the vehicle.

A vertical axis 2 is drawn vertically through the non-driven wheel contact patch 41 (contact point/area between the wheel and the ground). A horizontal axis 3 is drawn horizontally through the non-driven wheel contact patch 41. The driven wheel 10 is positioned at an arbitrary point of suspension travel having a vertical wheel travel 16 measured vertically from the driven wheel contact patch 40 to the horizontal axis 3. FIG. 1a can be considered as a rear driven wheel suspension vehicle (travelling left to right on the page) or as a front driven wheel suspension vehicle (travelling right to left on the page).

For a rear driven wheel suspension vehicle under powered acceleration, a driving force line 44 determines the quantity of anti-squat exhibited by the vehicle suspension system. The driving force line 44 always passes through the driven wheel contact patch 40 as it is this force generated between the driven wheel 10 and the ground that causes the acceleration of the vehicle. The driving force line 44 also always passes through an instant centre 42 of the driven wheel 10 relative to the vehicle's suspended mass. The driving force line 44 is orientated at an angle 46 as shown relative to a horizontal line through the driven wheel contact patch 40. The driving force line 44 crosses the vertical axis 2 at a driving force intercept point 45.

In order to satisfy the definition of 100% anti-squat as defined in Table 1, the driving force intercept point 45 must be at the same height as the centre of gravity 1 of the suspended mass of the vehicle. A line drawn horizontally through the centre of gravity 1 of the suspended mass of the vehicle crosses the vertical axis 2 at a 100% anti-squat intercept point 5.

In order to satisfy the definition of 0% anti-squat as defined in Table 1, the driving force intercept point 45 must be at the same height as the driven wheel contact patch 40. A line drawn horizontally through the driven wheel contact patch 40 crosses the vertical axis 2 at a 0% anti-squat intercept point 4. The mathematical derivations of the above definitions are not relevant for the purposes of this description.

If the direction of the driving force line 44 is known, then the amount of anti-squat can be quantified as a percentage, based on the height of the driving force intercept point 45, in relation to the 0% anti-squat intercept point 4 and the 100% anti-squat intercept point 5. If the driving force line 44 is calculated for each instantaneous position in suspension travel then the acceleration response of the vehicle may be quantified graphically.

For each instantaneous position of suspension travel, in order to determine the direction of the driving force, it is necessary to determine the location of the instant centre of the driven wheel relative to the vehicle's suspended mass. The location of this instant centre determines the direction in which traction forces at the driven wheel's contact patch act on the suspended mass of the vehicle. For a vehicle suspension system, it is possible to consider the suspension and drivetrain system as an arrangement of mechanical links. It is then possible to determine the location of the instant centre of the driven wheel, relative to the suspended mass, by using known kinematic principles such as Kennedy's theorem. The instant centre is a virtual point, and will move depending on the instantaneous position of suspension travel. The instant centre might be within the dimensions of the vehicle, or it might be a large distance from the vehicle.

Figure 1B:
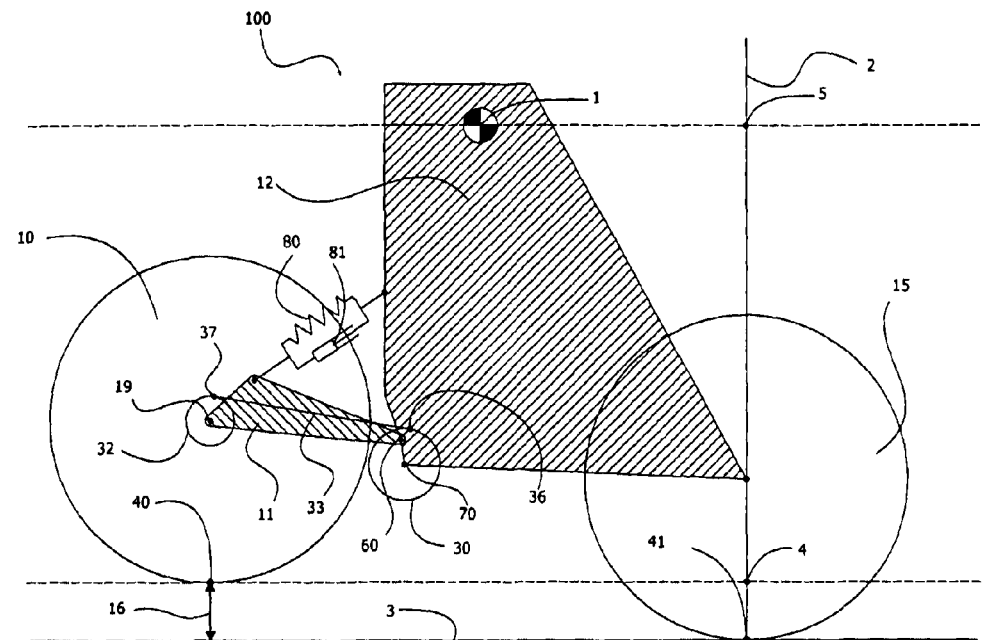
Figure 1C:
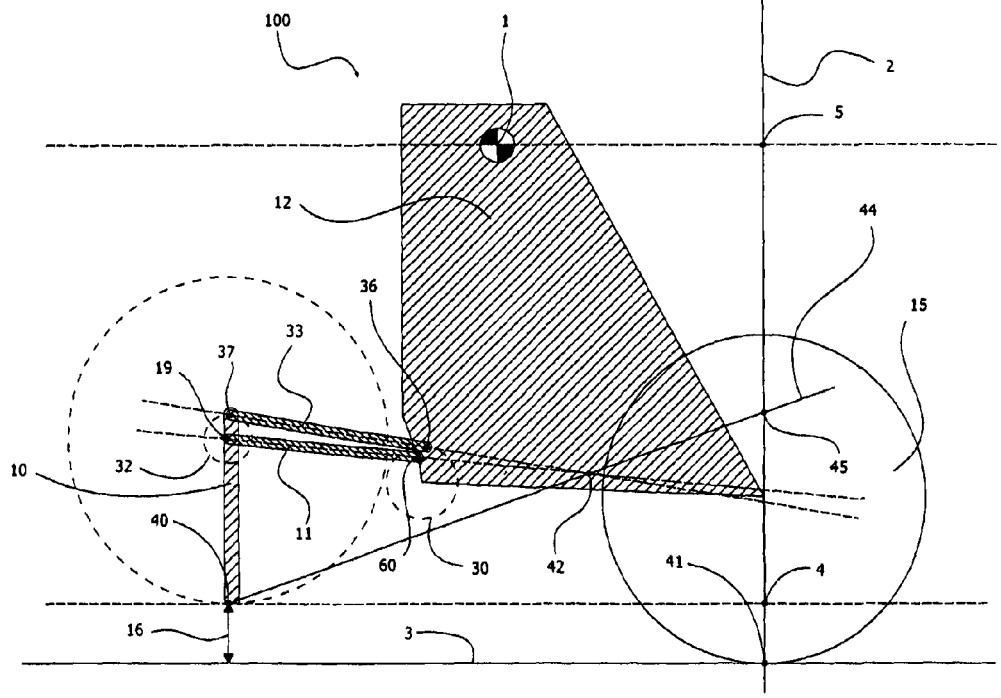

In order to derive the acceleration or braking response, the instant centre of the driven wheel relative to the suspended mass must be ascertained. This specification does not teach a method of calculating the position of the instant centre. There are known methods in the art for calculating the instant centre location and it is to be understood that any suitable method may be applied. FIGS. 1b and 1c may however be a useful reference as they depict how the suspension and drivetrain system may be simplified as an arrangement of mechanical links.

Referring now to FIGS. 1b and 1c, there is shown a vehicle 100 having a driven rear wheel suspension system according to a known prior art arrangement. The vehicle in FIG. 1b has a chassis 12 supported by a driven wheel 10 and non-driven wheel 15. The suspension system acts to isolate movement of the chassis 12 from movement of the driven wheel 10 via a suspension mechanism, the movement of which is controlled by an arbitrary spring 80 and damper 81 operable between the chassis 12 and member supporting or 'carrying' the driven wheel 10. As shown for FIG. 1a, a vertical axis 2 is drawn vertically through the non-driven wheel contact patch 41. A horizontal axis 3 is drawn horizontally through the non-driven wheel contact patch 41. The driven wheel 10 is positioned at an arbitrary point of suspension travel having a vertical wheel travel 16 measured vertically from the driven wheel contact patch 40 to the horizontal axis 3.

In this figure, the driven wheel 10 is rotatably connected to a driven wheel carrier member 11. The driven wheel carrier member 11 is also pivotally connected to the chassis 12 at pivot point 60. This type of arrangement is referred to as a 'single-pivot' suspension mechanism as the driven wheel carrier member 11 pivots about a single fixed point on the chassis 12.

The spring 80 and damper 81 shown in FIG. 1b are pivotally mounted between the driven wheel carrier member 11 and the chassis 12. The spring 80 provides support for the vehicle's suspended mass, and the damper 81 controls the speed of suspension movement. Springs and dampers can be mounted in many different ways in suspension systems. Sometimes they are actuated by a dedicated mechanism, to allow the spring and damper to be positioned in a more convenient location. The location of these elements is not relevant to the working of the present invention. In practice, the spring and damper would be incorporated into any of the suspension systems shown herein in a conventional manner as is well understood in the art.

For the purposes of this discussion, the vehicle depicted in FIG. 1b is a bicycle 100 having a bottom bracket 70 that is part of the chassis 12. A driving sprocket 30 is rotatably mounted to the bottom bracket 70. A power source (e.g. a rider) is mounted on the chassis 12, and applies power through pedals (not shown) that are connected to the driving sprocket 30. The driving sprocket 30 is mechanically coupled by a looped power transmission element (e.g. a chain) to a driven sprocket 32 that is engaged with the driven wheel 10. The chain makes tangential contact with the driving sprocket 30 at a driving sprocket chain contact point 36. The chain 35 also makes tangential contact with the driven sprocket 32 at a driven sprocket chain contact point 37. Power is transmitted from the power source, through the chain, to the driven wheel 10 to generate vehicle acceleration through this drivetrain arrangement. For the purposes of this discussion, only the segment of chain under tension that is transmitting power is shown. This is the segment of chain between contact points 36 and 37 and is referred to herein as the power transmitting segment 33 of the chain.

FIG. 1c is a simplified representation of the vehicle described in FIG. 1b, showing how under powered acceleration, at an instantaneous point in suspension travel, the suspension and drivetrain system can be considered as an arrangement of mechanical links. By applying known kinematic principles such as Kennedy's theorem, it is possible to determine the location of the instant centre 42 of the driven wheel 10 relative to the suspended mass 12. A driving force line 44 can then be drawn from the driven wheel contact patch 40, through the instant centre 42 of the driven wheel 10 relative to the suspended mass 12. The driving force line 44 crosses the vertical axis 2 at a driving force intercept point 45.

With an understanding of the concepts and definitions described above, a vehicle suspension system according to the present invention shall now be described with reference to several illustrative embodiments.

Throughout this specification an 'idler member' refers to a sprocket or pulley located in a chain or belt driven drivetrain that is intermediate of the power input and power output sprockets/pulleys, which does not put power into the system or transmit power out of the system.

In the illustrative embodiments shown, the suspension spring and damper are not shown for clarity. It is to be understood that for each embodiment, there would be a spring and damper mounted in the suspension system in order to support the vehicle's suspended mass and control the speed of suspension movement.

In the illustrative embodiments shown, it is to be understood that each drivetrain system requires the chain or belt drive to form a continuous or endless loop, to enable continuous transmission of power. When power is transmitted using a continuous loop chain or belt, there is always at least one run of chain or belt that does not transmit power, called the 'return run'. In most embodiments, the return run of the chain or belt drive is not represented in the drawings (for clarity), as it is not relevant to the working of the present invention. In practice, the return run of the chain or belt would be routed via a chain tensioner device in a conventional manner as is well understood in the art.

Single-Pivot Embodiments

Figure 2A:
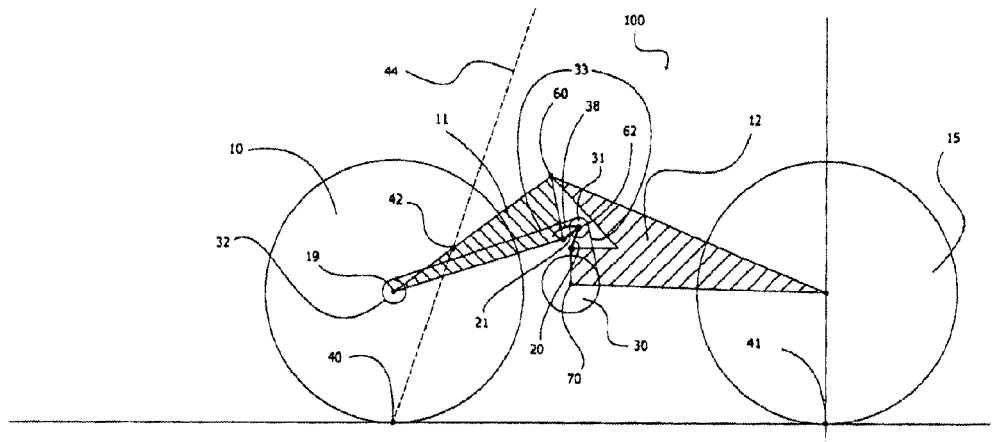
FIGS. 2a-2c show diagrammatic representations of a bicycle driven wheel suspension system according to a 'single-pivot' embodiment of the invention at 0%, 50% and 100% suspension travel respectively.
Figure 2B:
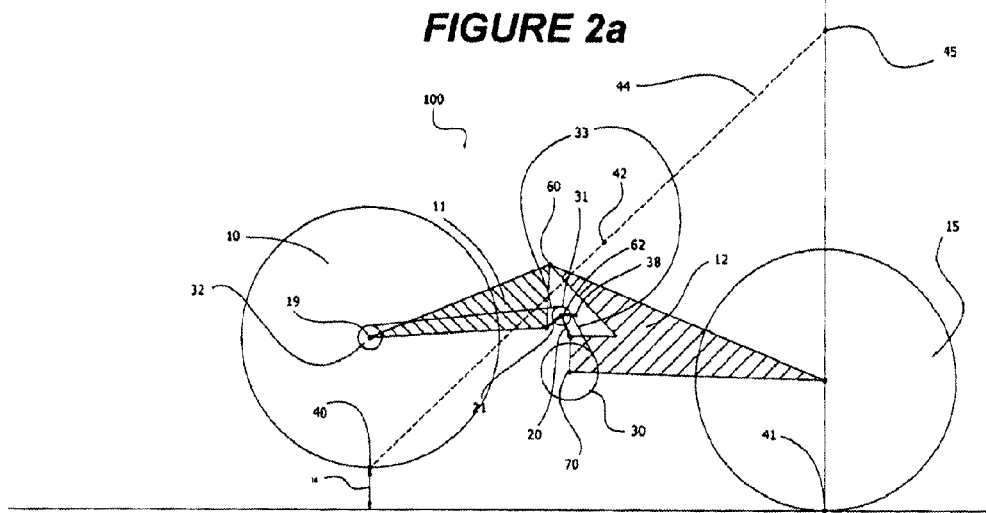
Figure 2C:
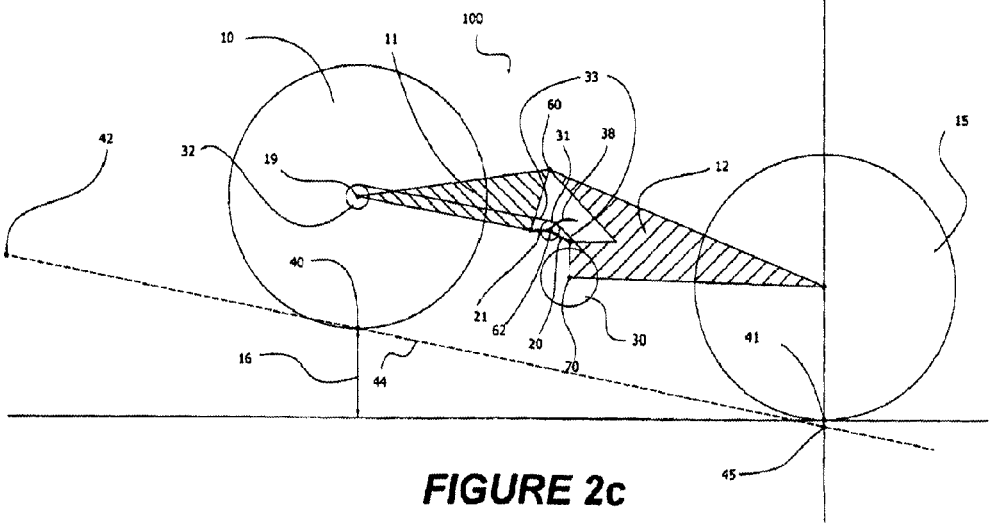

Referring now to FIGS. 2a-2c there is shown a vehicle suspension system according to an embodiment of the invention. Each of FIGS. 2a-2c is a simplified two dimensional (2D) diagrammatic representation of the vehicle. FIG. 2a depicts the suspension system in a fully extended state (0% suspension travel); FIG. 2b shows the suspension system at 50% suspension travel, while FIG. 2c shows the suspension system in a fully compressed state (100% suspension travel). The suspension spring and damper elements are not shown in these figures for clarity.

The vehicle in FIGS. 2a-2c is a bicycle 100 having a rear driven wheel suspension system. The bicycle 100 has a front wheel 15, a rear (driven) wheel 10 and a chassis 12 (the main frame or front triangle). A rear driven wheel suspension system is provided by a suspension mechanism that is configured to isolate the movement of the driven wheel 10 from the movement of the chassis 12 of the bicycle 100. The suspension mechanism includes a driven wheel carrier member 11 that is rotatably connected to the driven wheel 10 (specifically the driven wheel axle 19). The driven wheel carrier member 11 is also pivotally connected to the chassis 12 at pivot point 60. This type of arrangement is referred to as a 'single-pivot' suspension system as the driven wheel carrier member 11 pivots about a single fixed point on the chassis 12. The driven wheel carrier member 11 in a single-pivot system may also be referred to as a 'swingarm'.

In FIGS. 2a-2c, the bicycle 100 has a bottom bracket 70 that is part of the chassis 12. A first sprocket 30 (the front or driving sprocket) is rotatably mounted to the bottom bracket 70. A power source (e.g. a rider) is mounted on the chassis 12, and applies power through pedals (not shown) that are connected to the driving sprocket 30. The rider is considered 'mounted' to the chassis as he/she is attached to the chassis via the pedals, handlebars and seat.

The driving sprocket 30 is mechanically coupled by a looped power transmission element (a chain in this embodiment) to a second sprocket 32 (the rear or driven sprocket) that is engaged with the driven wheel 10. Power is transmitted from the power source to the driven wheel 10 to generate vehicle acceleration through this chain-driven drivetrain arrangement. In FIGS. 2a-2c only the power transmitting segment 33 of the chain is shown. The power transmitting segment of the chain is known as the 'acceleration chain run' or 'power run'. The power transmitting segment refers to the segment of chain between the front and rear sprockets that is under tension during powered acceleration of the vehicle.

In this embodiment, an idler member 31 (an idler sprocket) is included in the suspension system/drivetrain to alter the dynamic behaviour of the vehicle under powered acceleration. The idler sprocket 31 is configured to engage with the power transmitting segment of the chain and to move to follow a predetermined path 38 as a function of suspension travel, to thereby alter a path of the power transmitting segment of the chain. In this embodiment, the idler sprocket 31 is configured such that the power transmitting segment 33 of the chain is routed above the idler sprocket 31. In other arrangements, the chain may be routed below the idler sprocket 31 or to the left or right of it. The idler member 31 is configured to strategically affect growth or shrinkage of the power transmitting segment of the chain, thereby manipulating the amount of anti-squat.

The idler sprocket 31 in this embodiment is rotatably mounted at the pivot point 62 between a first idler carrier member 20 and a second idler carrier member 21. The first idler carrier member 20 is pivotally connected to the chassis 12. The second idler carrier member 21 is pivotally connected to the driven wheel carrier member 11. In this embodiment, movement of the idler sprocket 31 during suspension travel is governed by a 'linkage' mechanism (the first and second idler carrier members) operating between the driven wheel carrier member 11 and the chassis 12. Importantly, the idler carrier members 20, 21 are movable relative to both the chassis 12 and driven wheel carrier member 11.

FIGS. 2a-2c show how the position of the idler sprocket 31 moves throughout suspension travel. As the idler sprocket 31 moves throughout suspension travel, the path of the power transmitting segment of the chain is altered as shown. This results in a controlled lengthening/shortening of the power transmitting segment of the chain. As the power transmitting segment of the chain is under tension, the direction at which chain tension forces are being transmitted back into the suspension system is constantly changing as the suspension moves through its range of travel. For each position of suspension travel shown in FIGS. 2a-2c, a driving force line 44 has been drawn at each instantaneous position. Powered acceleration of the vehicle produces this driving force at the contact patch 40 between the driven wheel 10 and the ground. The direction of this driving force line 44 determines its effect on the suspended mass 12 during powered acceleration. The driving force line 44 is drawn by calculating the location of the instant centre (IC) 42 of the driven wheel 10 relative to the suspended mass 12. The driving force generated at the driven wheel contact patch 40 must pass through instant centre 42 as shown.

The % anti-squat at each position throughout suspension travel is calculated by finding a driving force intercept point 45. Driving force intercept point 45 is located at the intersection between the driving force line 44 and a vertical line drawn through the front wheel contact patch 41. As described previously, a driving force intercept point 45 located at the height of the centre of gravity of the suspended mass 12 represents 100% anti-squat, while an intercept point located at the height of the driven wheel contact patch 40 represents 0% anti-squat. Using these definitions, the % anti-squat can be calculated at any point in the suspension travel. As defined previously, a graph of % anti-squat as a function of % suspension travel is defined as the acceleration response of the vehicle.

Figure 2D:
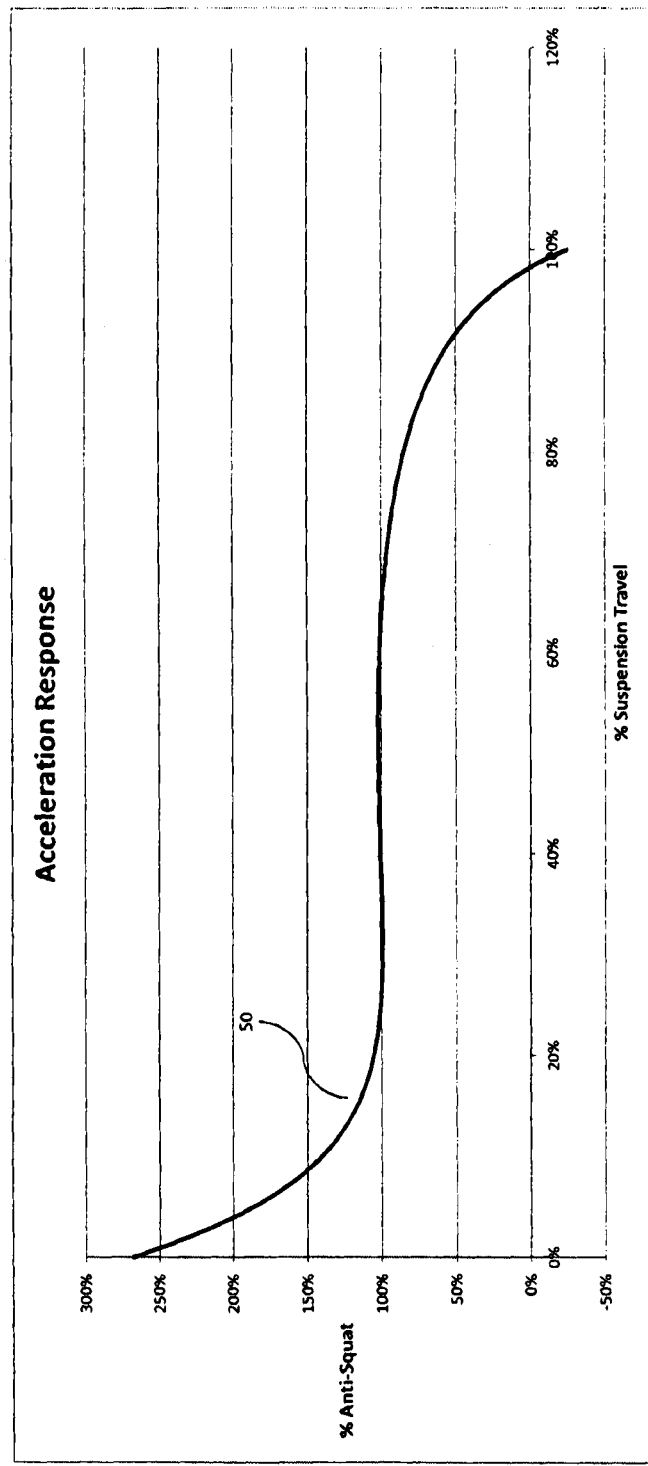
FIG. 2d depicts an acceleration response for the suspension system shown in FIGS. 2a-2c.

For the embodiment shown in FIGS. 2a-2c, an acceleration response curve 50 is shown in FIG. 2d. For this geometric arrangement, the idler sprocket 31 moves in a manner that produces an initially high amount of anti-squat, settling to a stable amount of anti-squat before finishing with a rapidly reducing amount of anti-squat as the suspension compresses.

The suspension system shown in FIGS. 2a-2c is configurable to enable the design of almost any desired acceleration response (the acceleration response shown in FIG. 2d illustrates the particular response which the geometric arrangement shown in FIGS. 2a-2c would generate). The acceleration response may be tuned (changed or varied to achieve a desired response) by changing geometric variables which include: the length of the first or second idler carrier members, the pivot location of the first idler carrier member on the chassis, the pivot location of the second idler carrier member on the driven wheel carrier link, or the diameter of the idler sprocket. These variables all affect the motion (speed or path) of the idler sprocket, and hence affect the amount of chain growth or shrinkage that occurs during suspension travel. The above-mentioned variables allow the acceleration response to be tuned independently without affecting any other characteristics of the suspension system so that other design variables (such as the driven wheel path) are not compromised.

The ability that this system provides to tune a wide range of acceleration responses is due to the idler sprocket being rotatably mounted on a structure (the idler carrier member) that is movable relative to both the chassis and driven wheel carrier member. This enables the idler sprocket 31 to follow a larger number of predetermined paths as a function of suspension travel than has been possible in any previously known suspension systems.

Figure 2E:
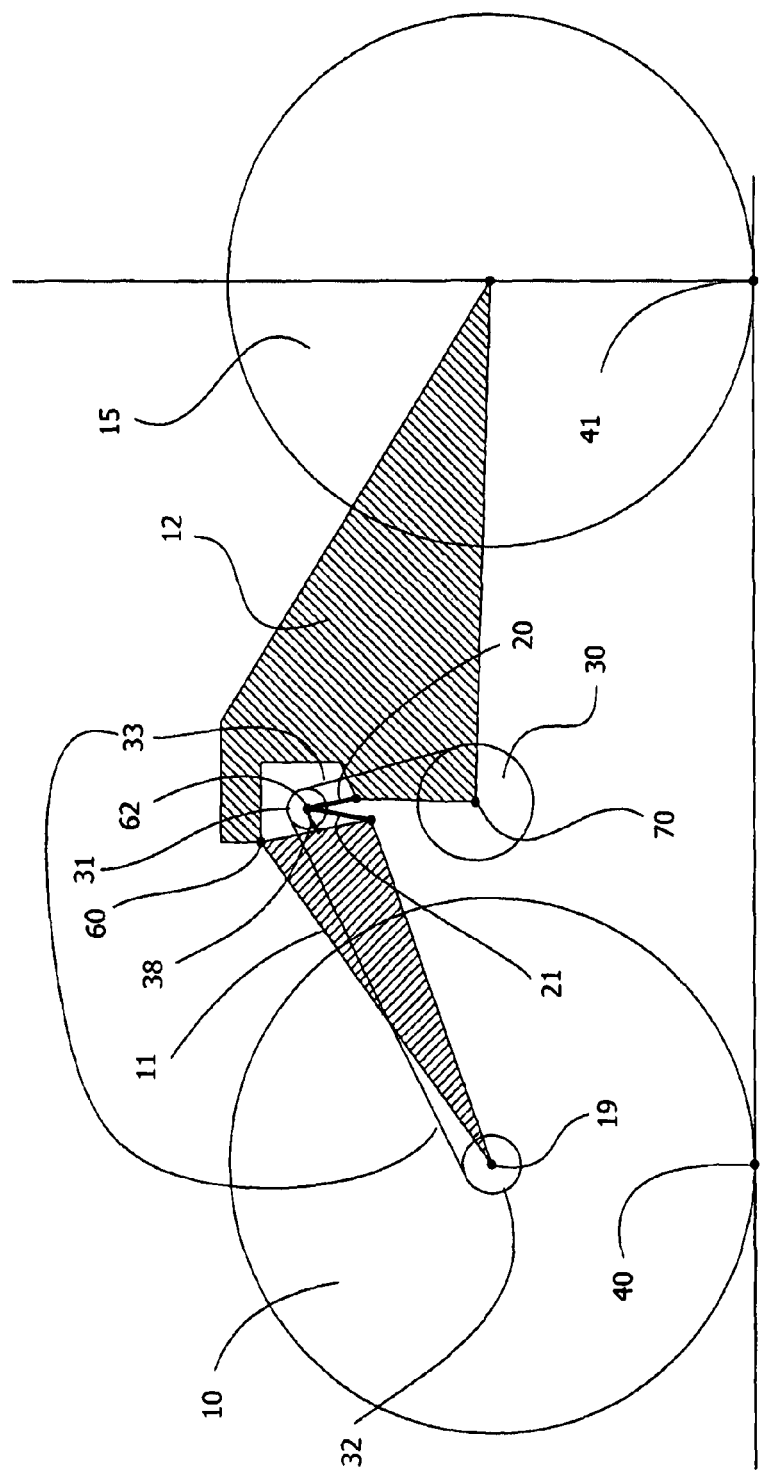
FIG. 2e shows a diagrammatic representation of the same vehicle as shown in FIGS. 2a-2c, with an alternative positioning of the idler.
Figure 2F:
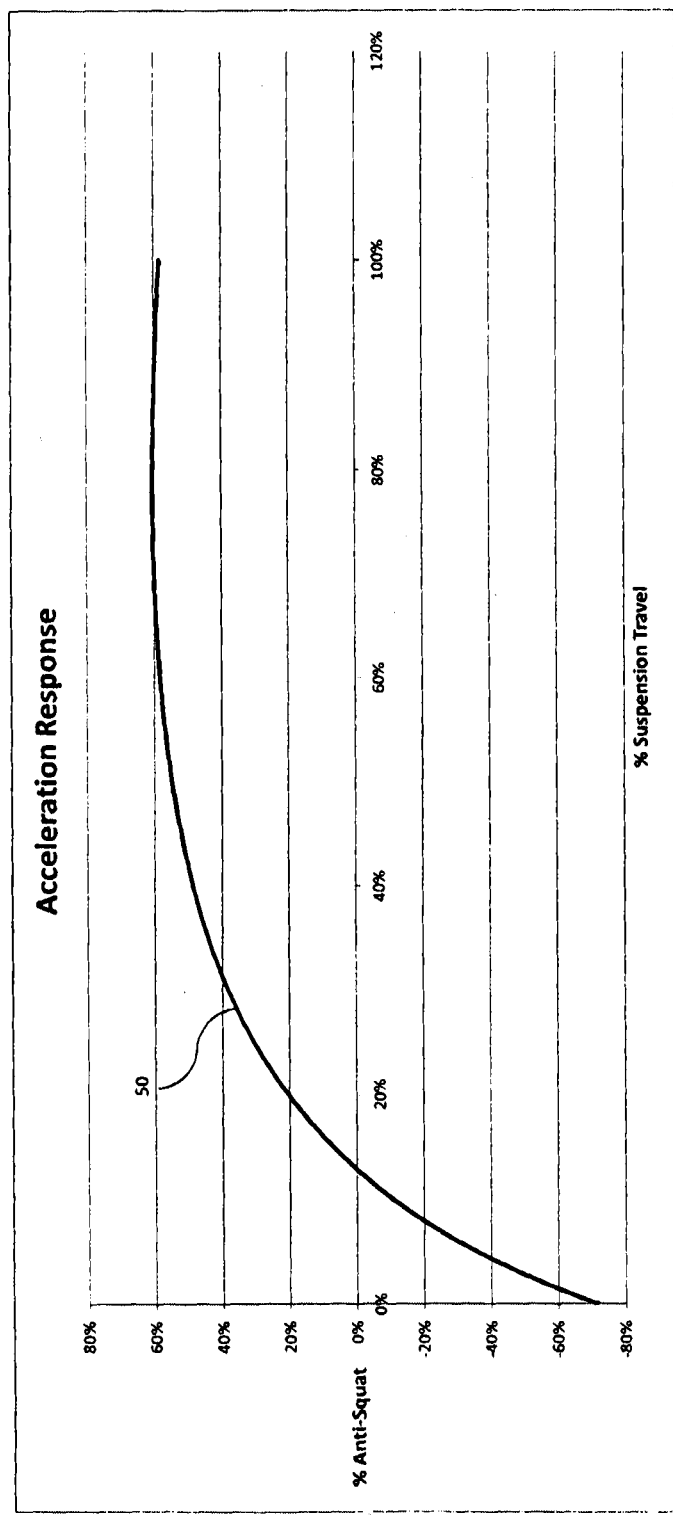
FIG. 2f depicts an acceleration response for the suspension system shown in FIG. 2e.

FIG. 2e depicts a diagrammatic representation of the vehicle depicted in FIGS. 2a-2c. The vehicle is geometrically identical to the vehicle depicted in FIGS. 2a-2c, except that the geometric positioning of the idler sprocket 31 in the suspension system has been altered slightly. FIG. 2f shows the acceleration response 50 of the vehicle depicted in FIG. 2e. For this geometric arrangement, the idler sprocket 31 moves in a manner that produces an increasing amount of anti-squat, as the suspension compresses.

Figure 2G:
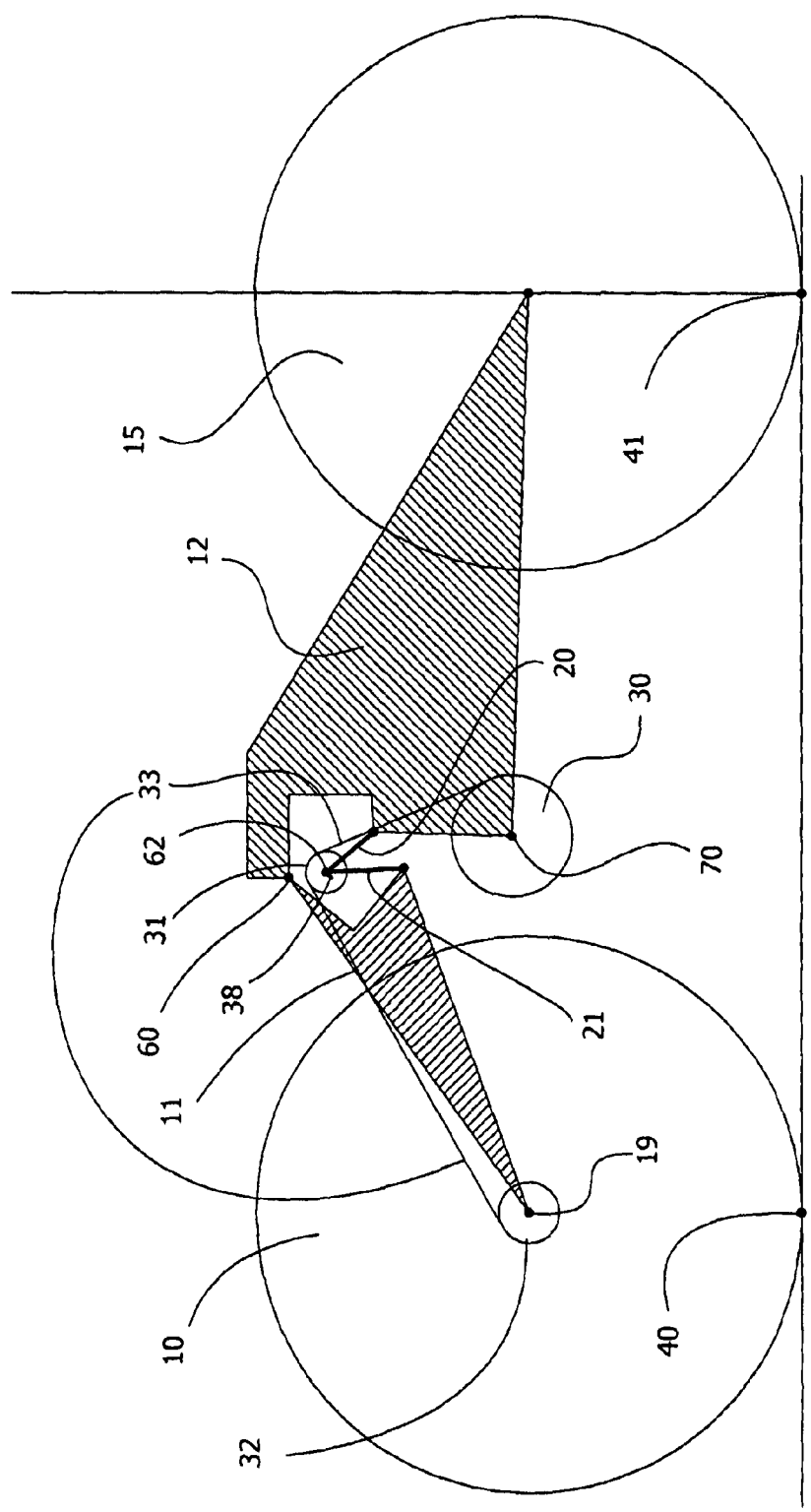
FIG. 2g shows a diagrammatic representation of the same vehicle as shown in FIGS. 2a-2c, with yet another alternative positioning of the idler.
Figure 2H:
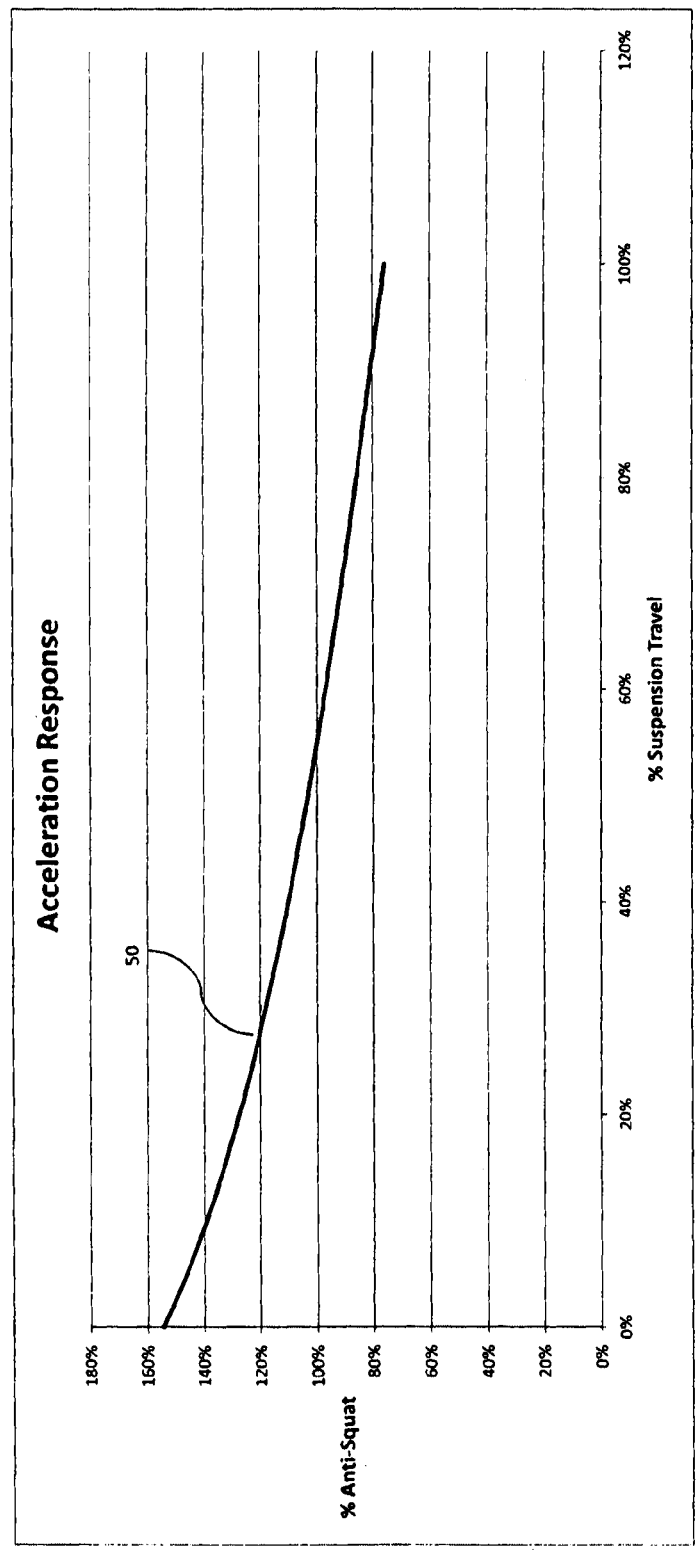
FIG. 2h depicts an acceleration response for the suspension system shown in FIG. 2g.

FIG. 2g depicts a diagrammatic representation of the vehicle depicted in FIGS. 2a-2c. The vehicle is geometrically identical to the vehicle depicted in FIGS. 2a-2c, except that the geometric positioning of the idler sprocket 31 in the suspension system has been altered slightly. FIG. 2h shows the acceleration response 50 of the vehicle depicted in FIG. 2g. For this geometric arrangement, the idler sprocket 31 moves in a manner that produces a decreasing amount of anti-squat, as the suspension compresses.

FIGS. 2e-2h demonstrate how the acceleration response of the vehicle can be tuned by varying the geometric manner in which the idler sprocket is configured in the suspension system. The same process can be applied to any of the following embodiments to produce a different acceleration response.

Figure 3A:
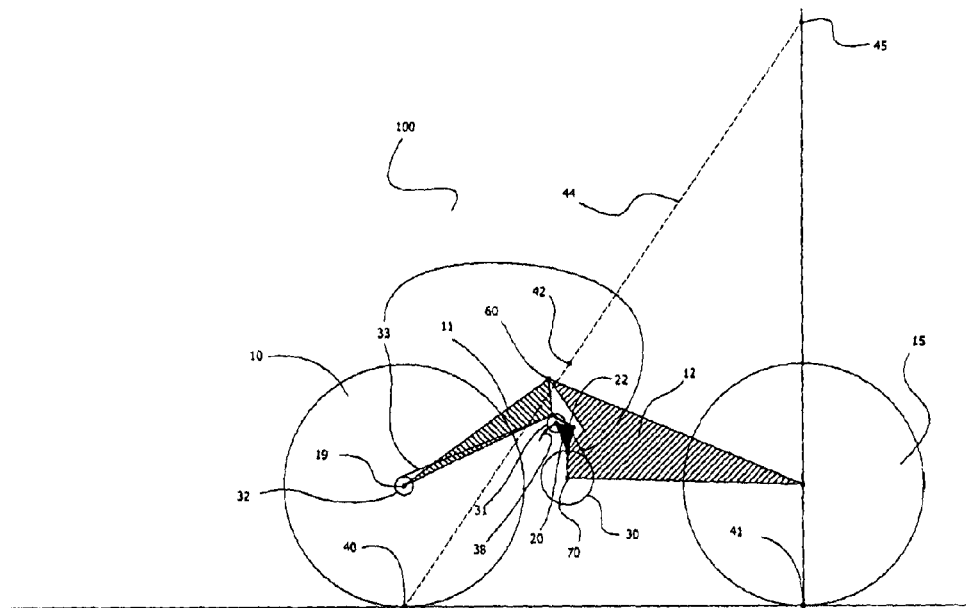
FIGS. 3a-3c show diagrammatic representations of a bicycle driven wheel suspension system according to a further 'single-pivot' embodiment of the invention at 0%, 50% and 100% suspension travel respectively.
Figure 3B:
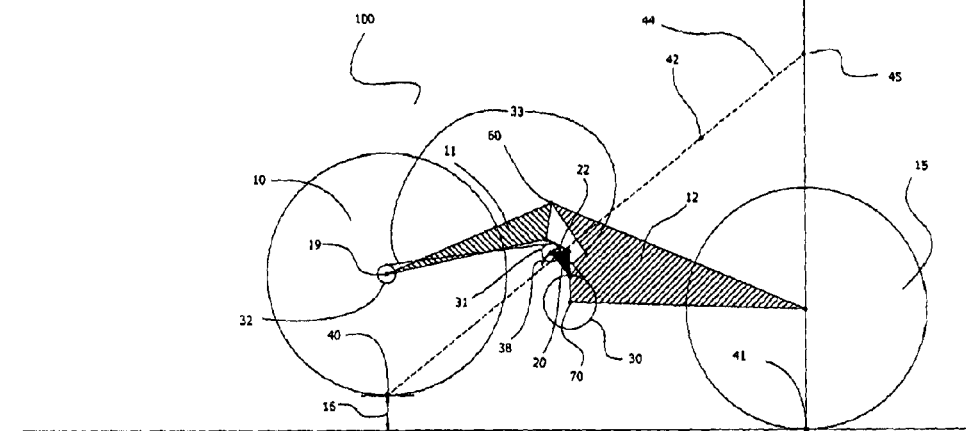
Figure 3C:
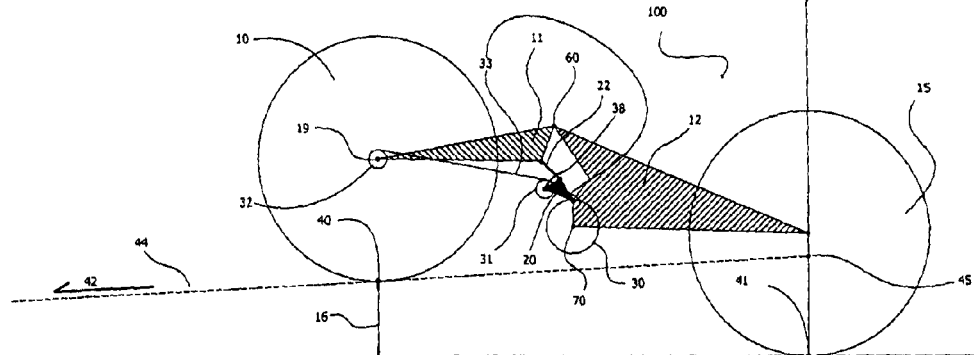

Referring now to FIGS. 3a-3c there is shown a vehicle suspension system according to a further single-pivot embodiment of the invention. Each of FIGS. 3a-3c is a simplified two dimensional (2D) diagrammatic representation of the vehicle. FIG. 3a depicts the suspension system in a fully extended state (0% suspension travel); FIG. 3b shows the suspension system at 50% suspension travel, while FIG. 3c shows the suspension system in a fully compressed state (100% suspension travel). The suspension spring and damper arrangement are again not shown in these figures for clarity.

The vehicle in FIGS. 3a-3c is a bicycle 100 having a rear driven wheel suspension system. The bicycle 100 has a front wheel 15, a rear (driven) wheel 10 and a chassis 12 (the main frame or front triangle). A rear driven wheel suspension system is provided by a suspension mechanism that is configured to isolate the movement of the driven wheel 10 from the movement of the chassis 12 of the bicycle 100. The suspension mechanism includes a driven wheel carrier member 11 that is rotatably connected to the driven wheel 10 (specifically the driven wheel axle 19). The driven wheel carrier member 11 is also pivotally connected to the chassis 12 at pivot point 60.

In FIGS. 3a-3c, the bicycle 100 has a bottom bracket 70 that is part of the chassis 12. A first sprocket 30 (the front or driving sprocket) is rotatably mounted to the bottom bracket 70. A power source (e.g. a rider) is mounted on the chassis 12, and applies power through pedals (not shown) that are connected to the driving sprocket 30. The rider is considered 'mounted' to the chassis as he/she is attached to the chassis via the pedals, handlebars and seat.

The driving sprocket 30 is mechanically coupled by a looped power transmission element (a chain in this embodiment) to a second sprocket 32 (the rear or driven sprocket) that is engaged with the driven wheel 10. Power is transmitted from the power source to the driven wheel 10 to generate vehicle acceleration through this chain-driven drivetrain arrangement. In FIGS. 3a-3c only the power transmitting segment 33 of the chain is shown. The power transmitting segment of the chain is known as the 'acceleration chain run' or 'power run'. The power transmitting segment refers to the segment of chain between the front and rear sprockets that is under tension during powered acceleration of the vehicle.

In this embodiment, an idler member 31 (an idler sprocket) is included in the suspension system/drivetrain to alter the dynamic behaviour of the vehicle under powered acceleration. The idler sprocket 31 is configured to engage with the power transmitting segment of the chain and to move to follow a predetermined path 38 as a function of suspension travel, to thereby alter a path of the power transmitting segment of the chain. In this embodiment, the idler sprocket 31 is configured such that the power transmitting segment 33 of the chain is routed above the idler sprocket 31. In other arrangements, the chain may be routed below the idler sprocket 31 or to the left or right of it. The idler member 31 is configured to strategically affect growth or shrinkage of the power transmitting segment of the chain, thereby manipulating the amount of anti-squat.

The idler sprocket 31 in this system is rotatably mounted to an idler carrier member 20. The idler carrier member 20 is pivotally connected to the chassis 12. An idler carrier manipulation member 22 is pivotally connected to both the driven wheel carrier member 11 and the idler carrier member 20. The idler sprocket 31 is not connected to the idler carrier manipulation member 22. In this embodiment, movement of the idler sprocket 31 during suspension travel is governed by a 'linkage' mechanism (the idler carrier member 20 and the idler carrier manipulation member 22) operating between the driven wheel carrier member 11 and the chassis 12. Importantly, the idler carrier member 20 is movable relative to both the chassis 12 and driven wheel carrier member 11.

FIGS. 3a-3c show how the position of the idler sprocket 31 moves throughout suspension travel. As the idler sprocket 31 moves throughout suspension travel, the path of the power transmitting segment of the chain is altered as shown. This results in a controlled lengthening/shortening of the power transmitting segment of the chain. As the power transmitting segment of the chain is under tension, the direction at which chain tension forces are being transmitted back into the suspension system is constantly changing as the suspension moves through its range of travel. Again, for each instantaneous position of suspension travel, a driving force line 44 is drawn from the rear wheel contact patch 40 through the instant centre 42 of the driven wheel 10 relative to the suspended mass 12.

Figure 3D:
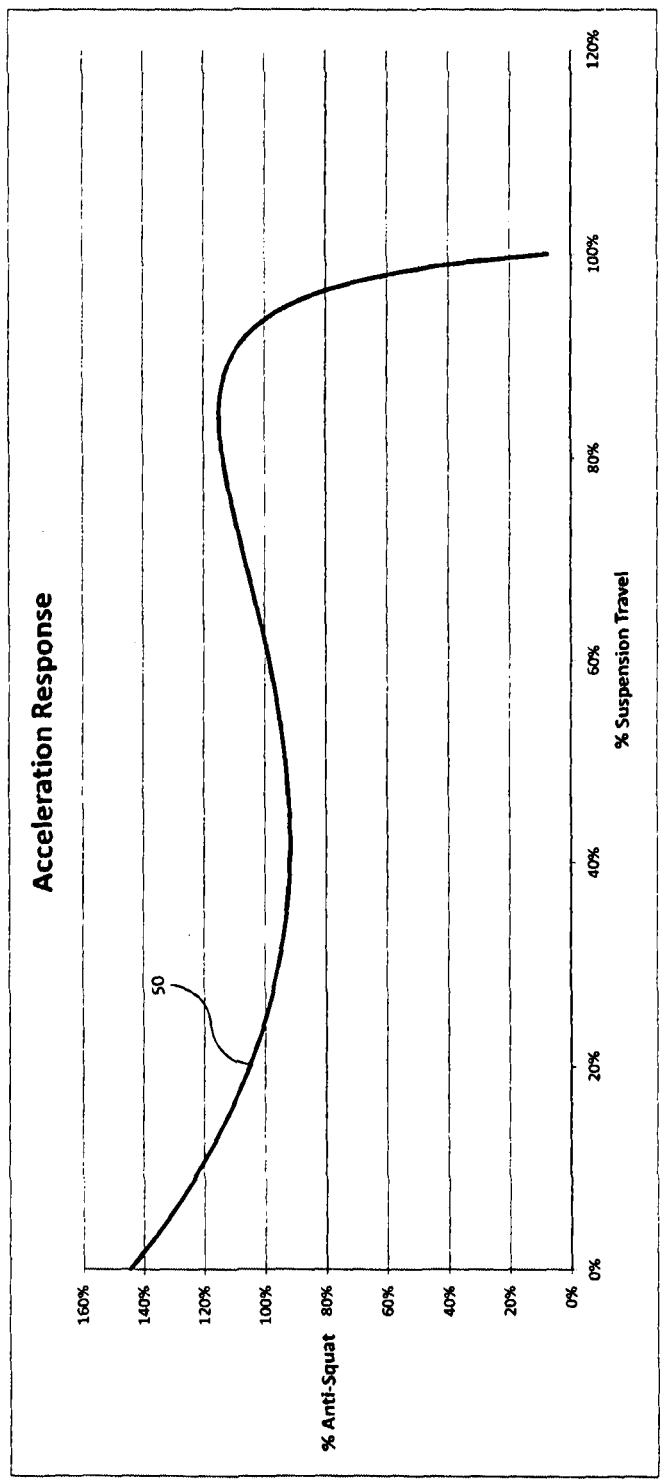
FIG. 3d depicts an acceleration response for the suspension system shown in FIGS. 3a-3c.

For the embodiment shown in FIGS. 3a-3c, an acceleration response curve 50 is shown in FIG. 3d. For this geometric arrangement, the idler sprocket 31 moves in a manner that produces an initially high amount of anti-squat, settling to a stable amount of anti-squat before finishing with a rapidly reducing amount of anti-squat as the suspension compresses.

The acceleration response of the embodiment may be tuned (changed or varied to achieve a desired response) by changing geometric variables which include: the length of the idler carrier manipulation member, the pivot location of the idler carrier manipulation member on the driven wheel carrier member, the pivot location of the idler carrier member on the chassis, the distance from idler centre to the pivot location of the idler carrier member on the chassis, the distance from idler centre to the pivot location between the idler carrier member and idler carrier manipulation member and the distance from idler carrier member pivot on chassis to idler carrier member pivot on idler carrier manipulation member. These variables all affect the motion (speed or path) of the idler sprocket, and hence affect the amount of chain growth or shrinkage that occurs during suspension travel. The abovementioned variables allow the acceleration response to be tuned independently without affecting any other characteristics of the suspension system so that other design variables (such as the driven wheel path) are not compromised.

The suspension system shown in FIGS. 3a-3c is configurable to enable the design of almost any desired acceleration response (the acceleration response shown in FIG. 3d illustrates the particular response which the geometric arrangement shown in FIGS. 3a-3c would generate). The ability that this system provides to tune a wide range of acceleration responses is due to the idler sprocket being rotatably mounted on a structure (the idler carrier member) that is movable relative to both the chassis and driven wheel carrier member.

Figure 4A:
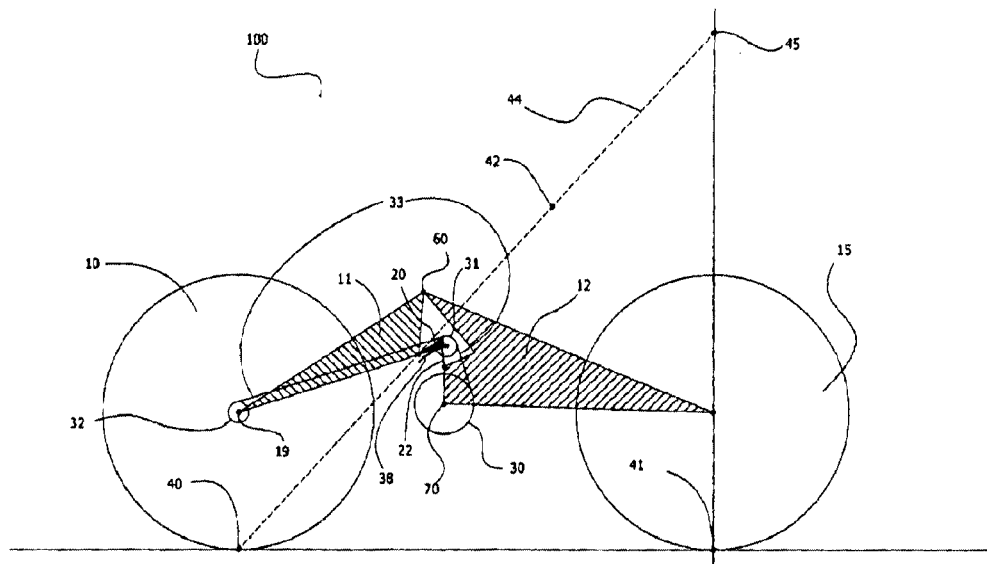
FIGS. 4a-4c show diagrammatic representations of a bicycle driven wheel suspension system according to a further 'single-pivot' embodiment of the invention at 0%, 50% and 100% suspension travel respectively.
Figure 4B:
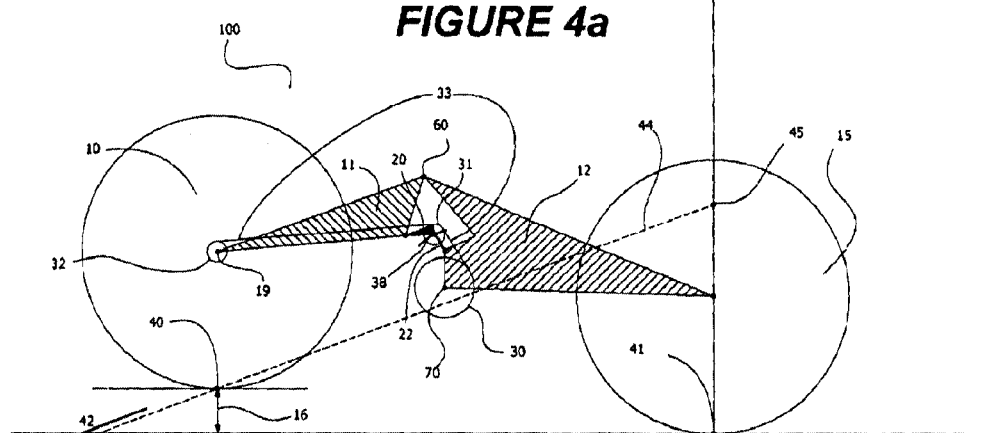
Figure 4C:
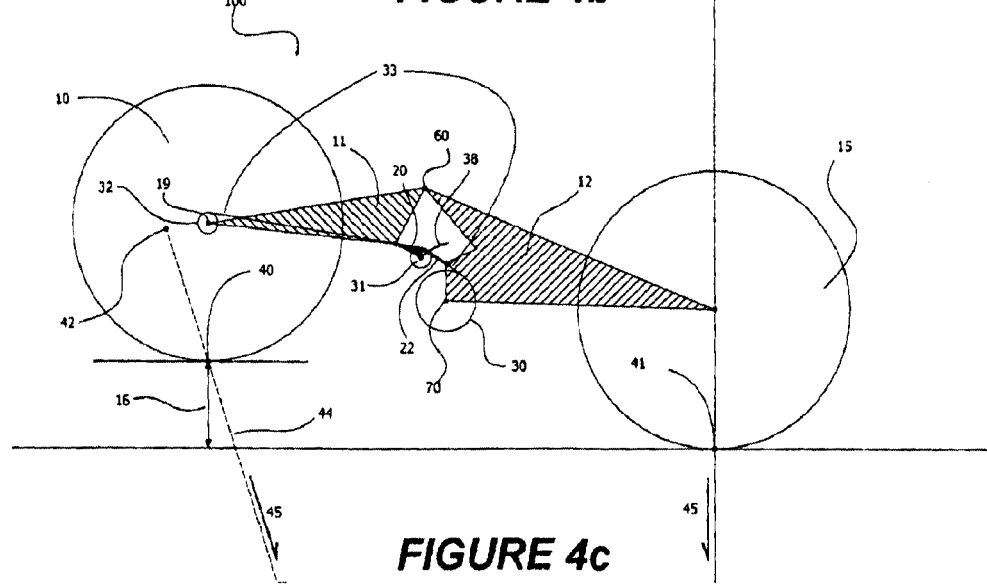

Referring now to FIGS. 4a-4c there is shown a vehicle suspension system according to a further single-pivot embodiment of the invention. Each of FIGS. 4a-4c is a simplified two dimensional (2D) diagrammatic representation of the vehicle. FIG. 4a depicts the suspension system in a fully extended state (0% suspension travel); FIG. 4b shows the suspension system at 50% suspension travel, while FIG. 4c shows the suspension system in a fully compressed state (100% suspension travel). The suspension spring and damper arrangement are again not shown in these figures for clarity.

The vehicle in FIGS. 4a-4c is a bicycle 100 having a rear driven wheel suspension system. The bicycle 100 has a front wheel 15, a rear (driven) wheel 10 and a chassis 12 (the main frame or front triangle). A rear driven wheel suspension system is provided by a suspension mechanism that is configured to isolate the movement of the driven wheel 10 from the movement of the chassis 12 of the bicycle 100. The suspension mechanism includes a driven wheel carrier member 11 that is rotatably connected to the driven wheel 10 (specifically the driven wheel axle 19). The driven wheel carrier member 11 is also pivotally connected to the chassis 12 at pivot point 60.

In FIGS. 4a-4c, the bicycle 100 has a bottom bracket 70 that is part of the chassis 12. A first sprocket 30 (the front or driving sprocket) is rotatably mounted to the bottom bracket 70. A power source (e.g. a rider) is mounted on the chassis 12, and applies power through pedals (not shown) that are connected to the driving sprocket 30. The rider is considered 'mounted' to the chassis as he/she is attached to the chassis via the pedals, handlebars and seat.

The driving sprocket 30 is mechanically coupled by a looped power transmission element (a chain in this embodiment) to a second sprocket 32 (the rear or driven sprocket) that is engaged with the driven wheel 10. Power is transmitted from the power source to the driven wheel 10 to generate vehicle acceleration through this chain-driven drivetrain arrangement. In FIGS. 4a-4c only the power transmitting segment 33 of the chain is shown. The power transmitting segment of the chain is known as the 'acceleration chain run' or 'power run'. The power transmitting segment refers to the segment of chain between the front and rear sprockets that is under tension during powered acceleration of the vehicle.

In this embodiment, an idler member 31 (an idler sprocket) is included in the suspension system/drivetrain to alter the dynamic behaviour of the vehicle under powered acceleration. The idler sprocket 31 is configured to engage with the power transmitting segment of the chain and to move to follow a predetermined path 38 as a function of suspension travel, to thereby alter a path of the power transmitting segment of the chain. In this embodiment, the idler sprocket 31 is configured such that the power transmitting segment 33 of the chain is routed above the idler sprocket 31. In other arrangements, the chain may be routed below the idler sprocket 31 or to the left or right of it. The idler member 31 is configured to strategically affect growth or shrinkage of the power transmitting segment of the chain, thereby manipulating the amount of anti-squat.

The idler sprocket 31 in this system is rotatably mounted to an idler carrier member 20. The idler carrier member 20 is pivotally connected to the driven wheel carrier member 11. An idler carrier manipulation member 22 is pivotally connected to both the chassis 12 and the idler carrier member 20. The idler sprocket 31 is not connected to the idler carrier manipulation member 22. In this embodiment, movement of the idler sprocket 31 during suspension travel is governed by a 'linkage' mechanism (the idler carrier member 20 and the idler carrier manipulation member 22) operating between the driven wheel carrier member 11 and the chassis 12. Importantly, the idler carrier member 20 is movable relative to both the chassis 12 and driven wheel carrier member 11.

FIGS. 4a-4c show how the position of the idler sprocket 31 moves throughout suspension travel. As the idler sprocket 31 moves throughout suspension travel, the path of the power transmitting segment of the chain is altered as shown. This results in a controlled lengthening/shortening of the power transmitting segment of the chain. As the power transmitting segment of the chain is under tension, the direction at which chain tension forces are being transmitted back into the suspension system is constantly changing as the suspension moves through its range of travel. Again, for each instantaneous position of suspension travel, a driving force line 44 is drawn from the rear wheel contact patch 40 through the instant centre 42 of the driven wheel 10 relative to the suspended mass 12.

Figure 4D:
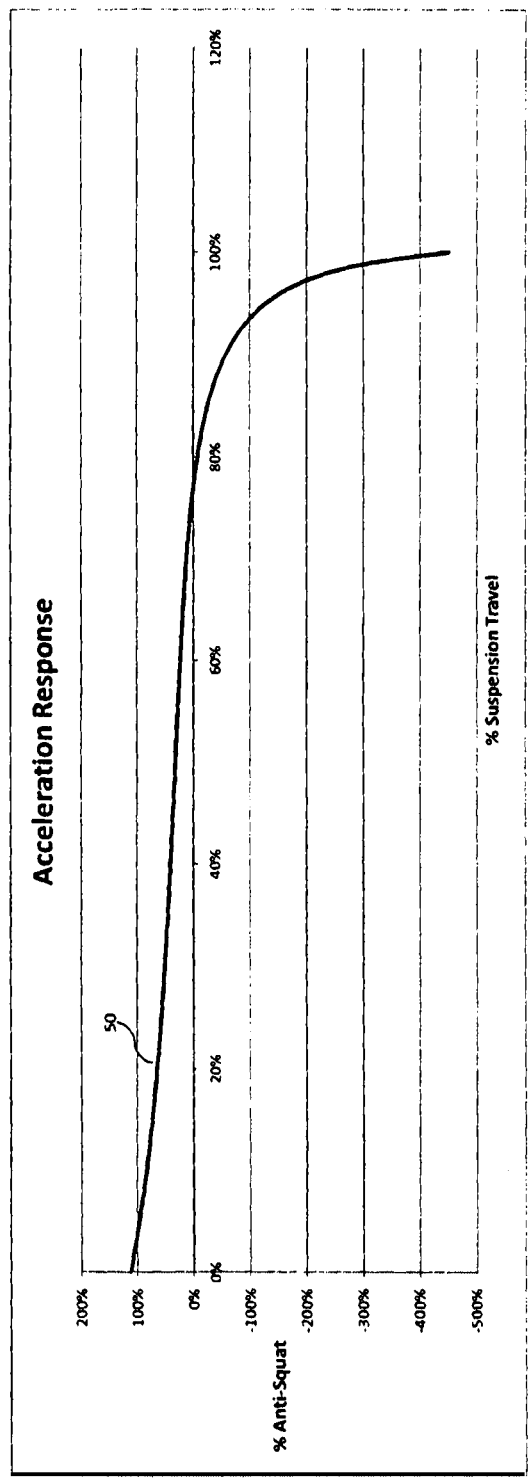
FIG. 4d depicts an acceleration response for the suspension system shown in FIGS. 4a-4c.

For the embodiment shown in FIGS. 4a-4c, an acceleration response curve 50 is shown in FIG. 4d. For this geometric arrangement, the idler sprocket 31 moves in a manner that produces an initially high amount of anti-squat, settling to a stable amount of anti-squat before finishing with a rapidly reducing amount of anti-squat as the suspension compresses.

The acceleration response of the embodiment may be tuned (changed or varied to achieve a desired response) by changing geometric variables which include: the length of the idler carrier manipulation member, pivot location of the idler carrier manipulation member on the chassis, pivot location of the idler carrier member on the driven wheel carrier member, distance from idler centre to pivot location of the idler carrier member on the driven wheel carrier member, distance from the idler centre to the pivot location between the idler carrier member and idler carrier manipulation member and the distance from idler carrier member pivot on driven wheel carrier member to idler carrier member pivot on idler carrier manipulation member. These variables all affect the motion (speed or path) of the idler sprocket, and hence affect the amount of chain growth or shrinkage that occurs during suspension travel. The above-mentioned variables allow the acceleration response to be tuned independently without affecting any other characteristics of the suspension system so that other design variables (such as the driven wheel path) are not compromised.

The suspension system shown in FIGS. 4a-4c is configurable to enable the design of almost any desired acceleration response (the acceleration response shown in FIG. 4d illustrates the particular response which the geometric arrangement shown in FIGS. 4a-4c would generate). The ability that this system provides to tune a wide range of acceleration responses is due to the idler sprocket being rotatably mounted on a structure (the idler carrier member) that is movable relative to both the chassis and driven wheel carrier member.

Figure 5A:
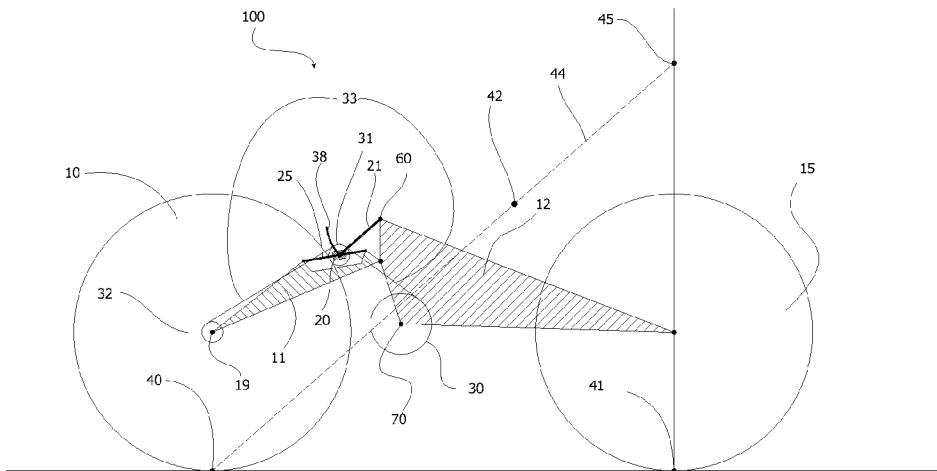
FIGS. 5a-5c show diagrammatic representations of a bicycle driven wheel suspension system according to a further 'single-pivot' embodiment of the invention at 0%, 50% and 100% suspension travel respectively.
Figure 5B:
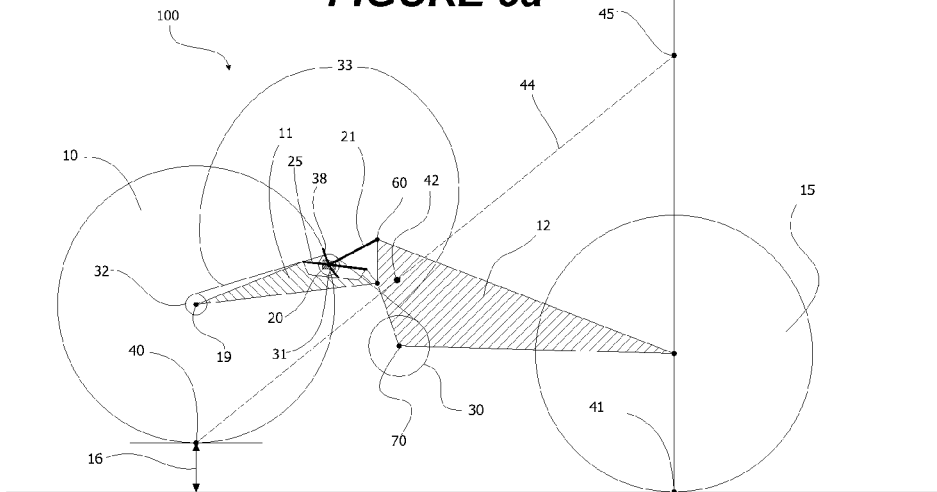
Figure 5C:
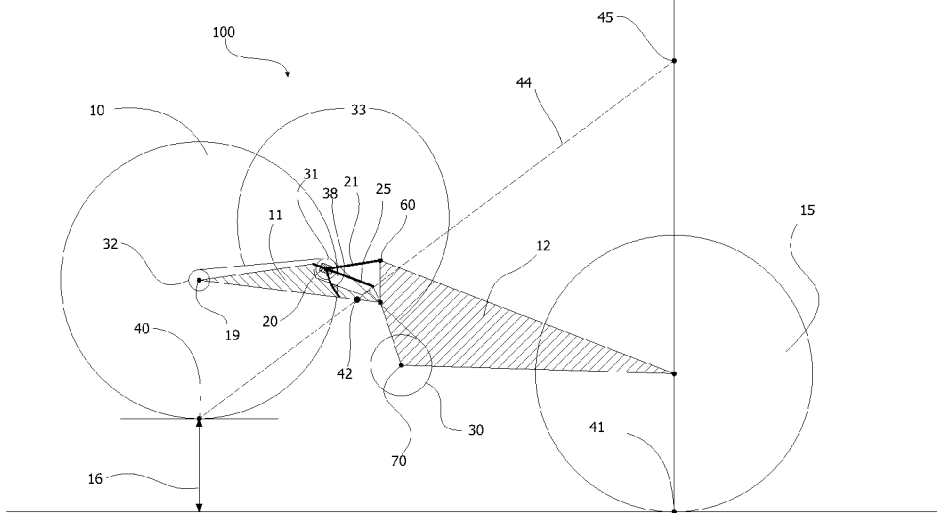

Referring now to FIGS. 5a-5c there is shown a vehicle suspension system according to a further single-pivot embodiment of the invention. Each of FIGS. 5a-5c is a simplified two dimensional (2D) diagrammatic representation of the vehicle. FIG. 5a depicts the suspension system in a fully extended state (0% suspension travel); FIG. 5b shows the suspension system at 50% suspension travel, while FIG. 5c shows the suspension system in a fully compressed state (100% suspension travel). The suspension spring and damper arrangement are again not shown in these figures for clarity.

The vehicle in FIGS. 5a-5c is a bicycle 100 having a rear driven wheel suspension system. The bicycle 100 has a front wheel 15, a rear (driven) wheel 10 and a chassis 12 (the main frame or front triangle). A rear driven wheel suspension system is provided by a suspension mechanism that is configured to isolate the movement of the driven wheel 10 from the movement of the chassis 12 of the bicycle 100. The suspension mechanism includes a driven wheel carrier member 11 that is rotatably connected to the driven wheel 10 (specifically the driven wheel axle 19). The driven wheel carrier member 11 is also pivotally connected to the chassis 12 at pivot point 60.

In FIGS. 5a-5c, the bicycle 100 has a bottom bracket 70 that is part of the chassis 12. A first sprocket 30 (the front or driving sprocket) is rotatably mounted to the bottom bracket 70. A power source (e.g. a rider) is mounted on the chassis 12, and applies power through pedals (not shown) that are connected to the driving sprocket 30. The rider is considered 'mounted' to the chassis as he/she is attached to the chassis via the pedals, handlebars and seat.

The driving sprocket 30 is mechanically coupled by a looped power transmission element (a chain in this embodiment) to a second sprocket 32 (the rear or driven sprocket) that is engaged with the driven wheel 10. Power is transmitted from the power source to the driven wheel 10 to generate vehicle acceleration through this chain-driven drivetrain arrangement. In FIGS. 5a-5c only the power transmitting segment 33 of the chain is shown. The power transmitting segment of the chain is known as the 'acceleration chain run' or 'power run'. The power transmitting segment refers to the segment of chain between the front and rear sprockets that is under tension during powered acceleration of the vehicle.

In this embodiment, an idler member 31 (an idler sprocket) is included in the suspension system/drivetrain to alter the dynamic behaviour of the vehicle under powered acceleration. The idler sprocket 31 is configured to engage with the power transmitting segment of the chain and to move to follow a predetermined path 38 as a function of suspension travel, to thereby alter a path of the power transmitting segment of the chain. In this embodiment, the idler sprocket 31 is configured such that the power transmitting segment 33 of the chain is routed above the idler sprocket 31. In other arrangements, the chain may be routed below the idler sprocket 31 or to the left or right of it. The idler member 31 is configured to strategically affect growth or shrinkage of the power transmitting segment of the chain, thereby manipulating the amount of anti-squat.

A first idler carrier member 20 is slidably connected to a linear guide 25 mounted on the driven wheel carrier member 11. A second idler carrier member 21 is pivotally connected to the chassis 12, and pivotally connected to the first idler carrier member 20. The idler sprocket 31 is rotatably mounted at the location where the first and second idler carrier members are pivotally connected to each other. In this embodiment, movement of the idler sprocket 31 during suspension travel is governed by a 'link and slider' mechanism operating between the driven wheel carrier member 11 and the chassis 12. This type of mechanism may also be referred to as a 'crank and slider' mechanism. Importantly, the idler carrier members 20, 21 are movable relative to both the chassis 12 and driven wheel carrier member 11.

FIGS. 5a-5c show how the position of the idler sprocket 31 moves throughout suspension travel. As the idler sprocket 31 moves throughout suspension travel, the path of the power transmitting segment of the chain is altered as shown. This results in a controlled lengthening/shortening of the power transmitting segment of the chain. As the power transmitting segment of the chain is under tension, the direction at which chain tension forces are being transmitted back into the suspension system is constantly changing as the suspension moves through its range of travel.

Again, for each instantaneous position of suspension travel, a driving force line 44 is drawn from the rear wheel contact patch 40 through the instant centre 42 of the driven wheel 10 relative to the suspended mass 12.

Figure 5D:
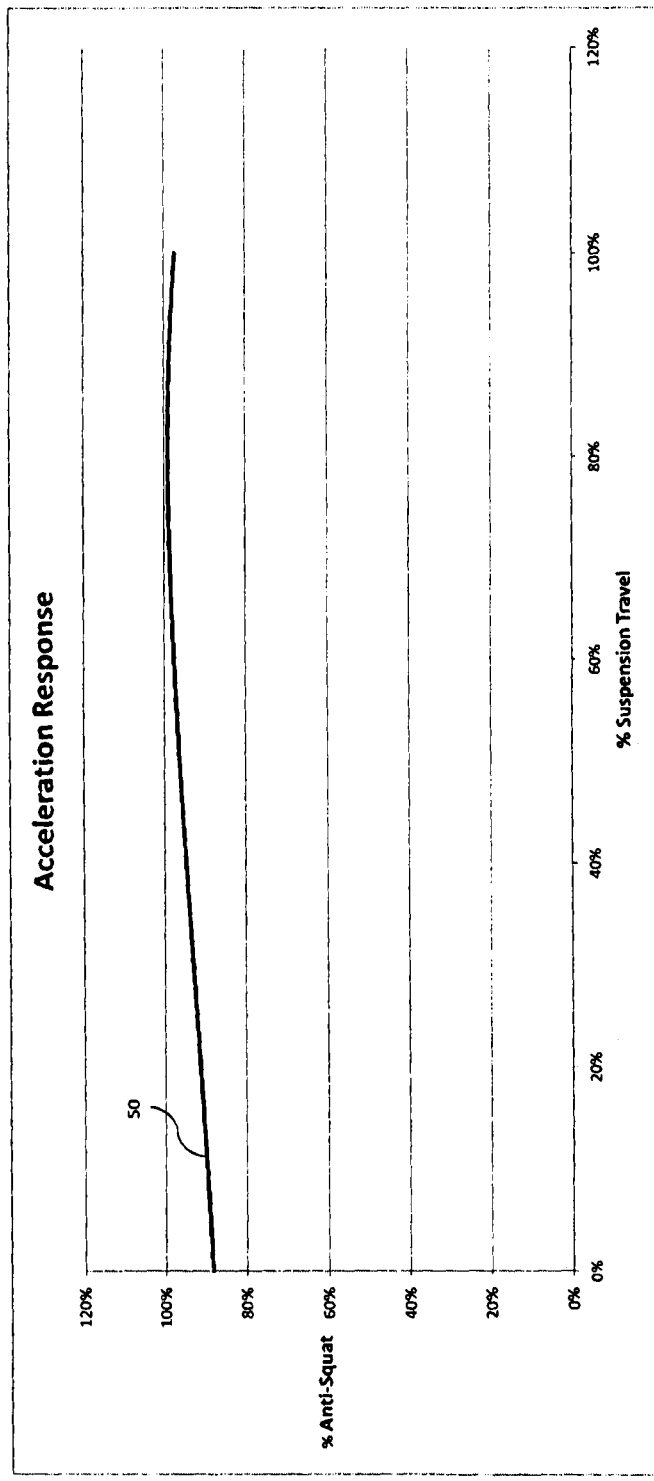
FIG. 5d depicts an acceleration response for the suspension system shown in FIGS. 5a-5c.

For the embodiment shown in FIGS. 5a-5c, an acceleration response curve 50 is shown in FIG. 5d. For this geometric arrangement, the idler sprocket 31 moves in a manner that produces a relatively stable (i.e. flat or constant) amount of anti-squat as the suspension compresses.

The acceleration response of the embodiment may be tuned (changed or varied to achieve a desired response) by changing geometric variables which include: the length of the second idler carrier member, pivot location of the second idler carrier member on the chassis, location of linear guide on driven wheel carrier member and shape of the linear guide (e.g. straight, curved). These variables all affect the motion (speed or path) of the idler sprocket, and hence affect the amount of chain growth or shrinkage that occurs during suspension travel. The above-mentioned variables allow the acceleration response to be tuned independently without affecting any other characteristics of the suspension system so that other design variables (such as the driven wheel path) are not compromised.

The suspension system shown in FIGS. 5a-5c is configurable to enable the design of almost any desired acceleration response (the acceleration response shown in FIG. 5d illustrates the particular response which the geometric arrangement shown in FIGS. 5a-5c would generate). The ability that this system provides to tune a wide range of acceleration responses is due to the idler sprocket being rotatably mounted on a structure (the idler carrier member) that is movable relative to both the chassis and driven wheel carrier member.

Figure 6A:
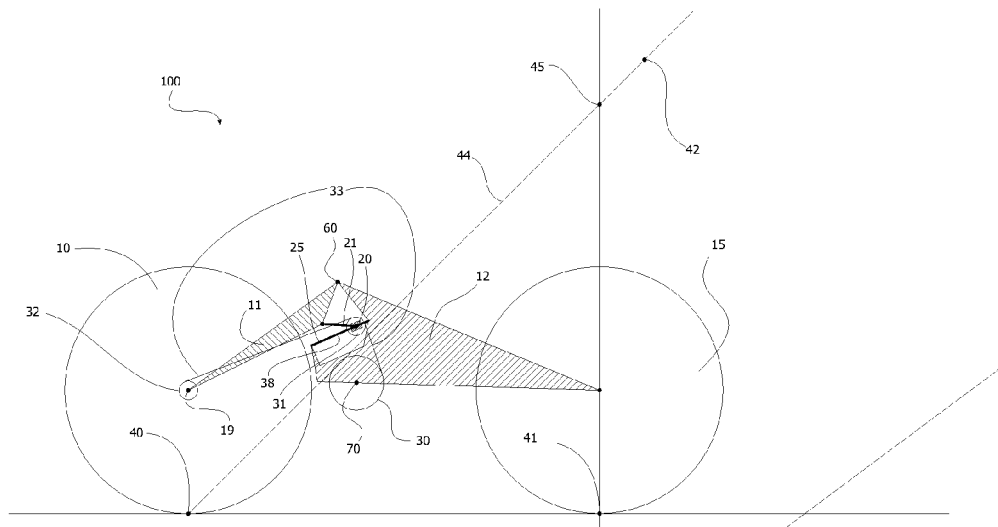
FIGS. 6a-6c show diagrammatic representations of a bicycle driven wheel suspension system according to a further 'single-pivot' embodiment of the invention at 0%, 50% and 100% suspension travel respectively.
Figure 6B:
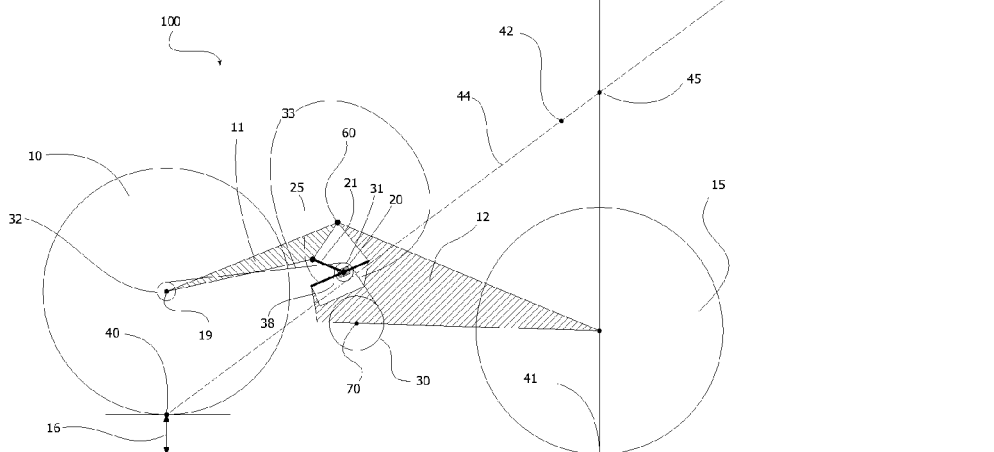
Figure 6C:
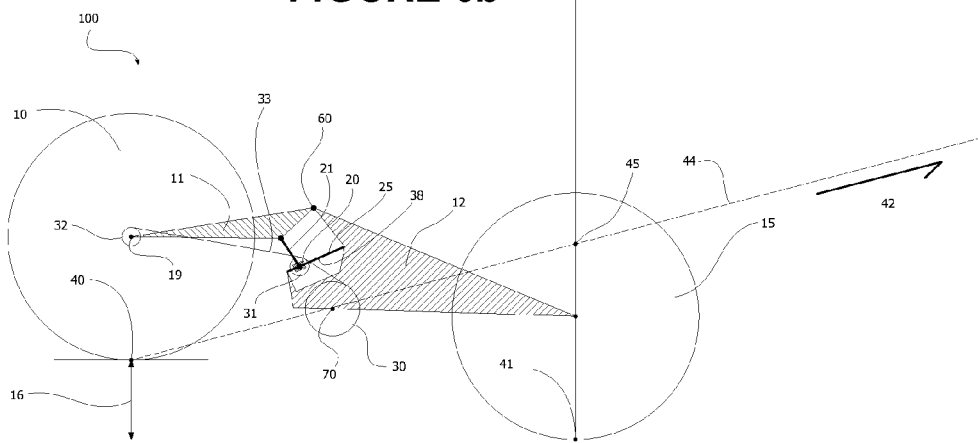

Referring now to FIGS. 6a-6c there is shown a vehicle suspension system according to a further single-pivot embodiment of the invention. Each of FIGS. 6a-6c is a simplified two dimensional (2D) diagrammatic representation of the vehicle. FIG. 6a depicts the suspension system in a fully extended state (0% suspension travel); FIG. 6b shows the suspension system at 50% suspension travel, while FIG. 6c shows the suspension system in a fully compressed state (100% suspension travel). The suspension spring and damper arrangement are again not shown in these figures for clarity.

The vehicle in FIGS. 6a-6c is a bicycle 100 having a rear driven wheel suspension system. The bicycle 100 has a front wheel 15, a rear (driven) wheel 10 and a chassis 12 (the main frame or front triangle). A rear driven wheel suspension system is provided by a suspension mechanism that is configured to isolate the movement of the driven wheel 10 from the movement of the chassis 12 of the bicycle 100. The suspension mechanism includes a driven wheel carrier member 11 that is rotatably connected to the driven wheel 10 (specifically the driven wheel axle 19). The driven wheel carrier member 11 is also pivotally connected to the chassis 12 at pivot point 60.

In FIGS. 6a-6c, the bicycle 100 has a bottom bracket 70 that is part of the chassis 12. A first sprocket 30 (the front or driving sprocket) is rotatably mounted to the bottom bracket 70. A power source (e.g. a rider) is mounted on the chassis 12, and applies power through pedals (not shown) that are connected to the driving sprocket 30. The rider is considered 'mounted' to the chassis as he/she is attached to the chassis via the pedals, handlebars and seat.

The driving sprocket 30 is mechanically coupled by a looped power transmission element (a chain in this embodiment) to a second sprocket 32 (the rear or driven sprocket) that is engaged with the driven wheel 10. Power is transmitted from the power source to the driven wheel 10 to generate vehicle acceleration through this chain-driven drivetrain arrangement. In FIGS. 6a-6c only the power transmitting segment 33 of the chain is shown. The power transmitting segment of the chain is known as the 'acceleration chain run' or 'power run'. The power transmitting segment refers to the segment of chain between the front and rear sprockets that is under tension during powered acceleration of the vehicle.

In this embodiment, an idler member 31 (an idler sprocket) is included in the suspension system/drivetrain to alter the dynamic behaviour of the vehicle under powered acceleration. The idler sprocket 31 is configured to engage with the power transmitting segment of the chain and to move to follow a predetermined path 38 as a function of suspension travel, to thereby alter a path of the power transmitting segment of the chain. In this embodiment, the idler sprocket 31 is configured such that the power transmitting segment 33 of the chain is routed above the idler sprocket 31. In other arrangements, the chain may be routed below the idler sprocket 31 or to the left or right of it. The idler member 31 is configured to strategically affect growth or shrinkage of the power transmitting segment of the chain, thereby manipulating the amount of anti-squat.

A first idler carrier member 20 is slidably connected to a linear guide 25 mounted on the chassis 12. A second idler carrier member 21 is pivotally connected to the driven wheel carrier member 11, and pivotally connected to the first idler carrier member 20. The idler sprocket 31 is rotatably mounted at the location where the first and second idler carrier members are pivotally connected to each other. In this embodiment, movement of the idler sprocket 31 during suspension travel is governed by a 'link and slider' mechanism operating between the driven wheel carrier member 11 and the chassis 12. This type of mechanism may also be referred to as a 'crank and slider' mechanism. Importantly, the idler carrier members 20, 21 are movable relative to both the chassis 12 and driven wheel carrier member 11.

FIGS. 6a-6c show how the position of the idler sprocket 31 moves throughout suspension travel. As the idler sprocket 31 moves throughout suspension travel, the path of the power transmitting segment of the chain is altered as shown. This results in a controlled lengthening/shortening of the power transmitting segment of the chain. As the power transmitting segment of the chain is under tension, the direction at which chain tension forces are being transmitted back into the suspension system is constantly changing as the suspension moves through its range of travel. Again, for each instantaneous position of suspension travel, a driving force line 44 is drawn from the rear wheel contact patch 40 through the instant centre 42 of the driven wheel 10 relative to the suspended mass 12.

Figure 6D:
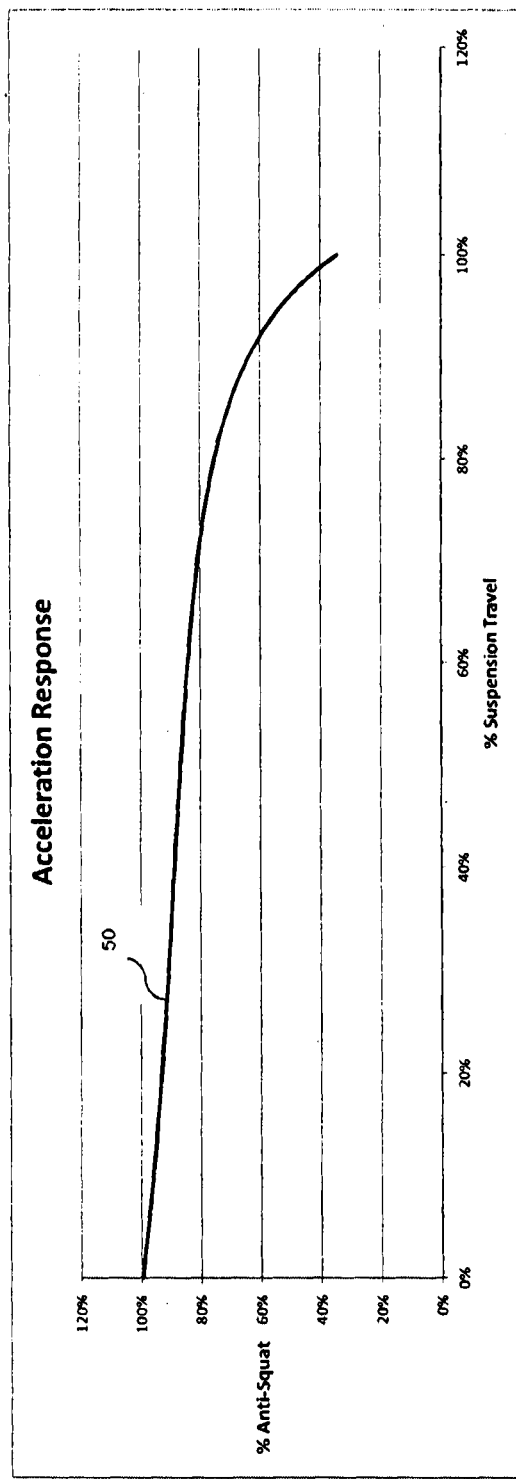
FIG. 6d depicts an acceleration response for the suspension system shown in FIGS. 6a-6c.

For the embodiment shown in FIGS. 6a-6c, an acceleration response curve 50 is shown in FIG. 6d. For this geometric arrangement, the idler sprocket 31 moves in a manner that produces an initially stable amount of anti-squat, followed by a steep decrease in the amount of anti-squat as the suspension is compressed.

The acceleration response of the embodiment may be tuned (changed or varied to achieve a desired response) by changing geometric variables which include: the length of the second idler carrier member, pivot location of the second idler carrier member on the driven wheel carrier member, location of linear guide on chassis and shape of the linear guide (e.g. straight, curved). These variables all affect the motion (speed or path) of the idler sprocket, and hence affect the amount of chain growth or shrinkage that occurs during suspension travel. The above-mentioned variables allow the acceleration response to be tuned independently without affecting any other characteristics of the suspension system so that other design variables (such as the driven wheel path) are not compromised.

The suspension system shown in FIGS. 6a-6c is configurable to enable the design of almost any desired acceleration response (the acceleration response shown in FIG. 6d illustrates the particular response which the geometric arrangement shown in FIGS. 6a-6c would generate). The ability that this system provides to tune a wide range of acceleration responses is due to the idler sprocket being rotatably mounted on a structure (the idler carrier member) that is movable relative to both the chassis and driven wheel carrier member.

In alternative single-pivot embodiments of the invention, still further arrangements of mounting the idler sprocket 31 into the suspension system are possible.

Figure 7:
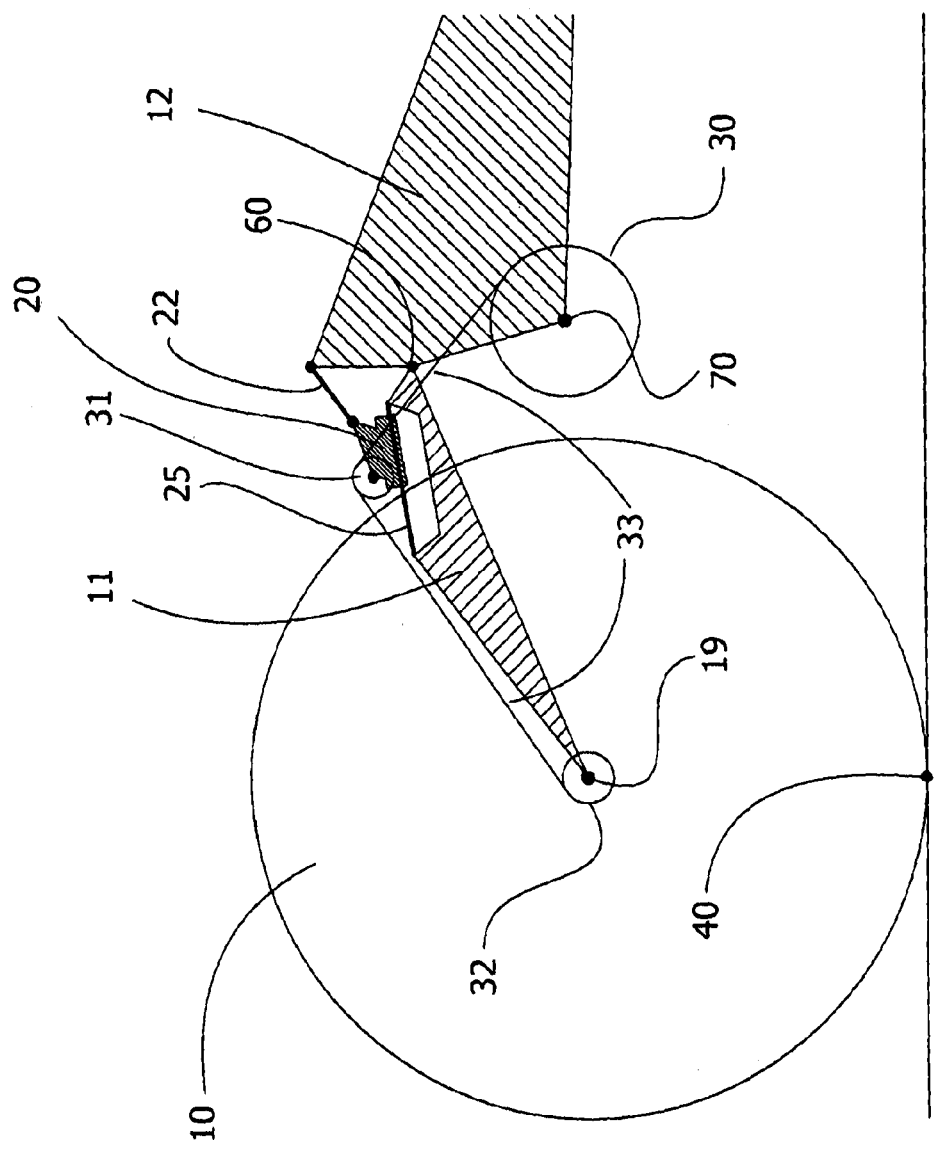
FIG. 7 shows a diagrammatic representation of a bicycle driven wheel suspension system according to a further 'single-pivot' embodiment of the invention.

Referring to FIG. 7, an idler carrier member 20 is slidably connected to a linear guide 25 that is mounted on the driven wheel carrier member 11. An idler carrier manipulation member 22 is pivotally connected at a location on the chassis 12, and at a location on the idler carrier member 20. In this way, the idler carrier member 20 is movable relative to both the chassis 12 and the driven wheel carrier member 11. The idler sprocket 31 is rotatably mounted at a location on the idler carrier member 20. In this embodiment, the idler sprocket 31 is configured such that the power transmitting segment 33 of the chain is routed above the idler sprocket 31. In other arrangements, the chain may be routed below the idler sprocket 31 or to the left or right of it. FIG. 7 depicts another example whereby the idler sprocket 31 is rotatably mounted on an idler carrier member 20 that forms part of a 'link and slider' mechanism operating between the driven wheel carrier member 11 and the chassis 12.

Figure 8:
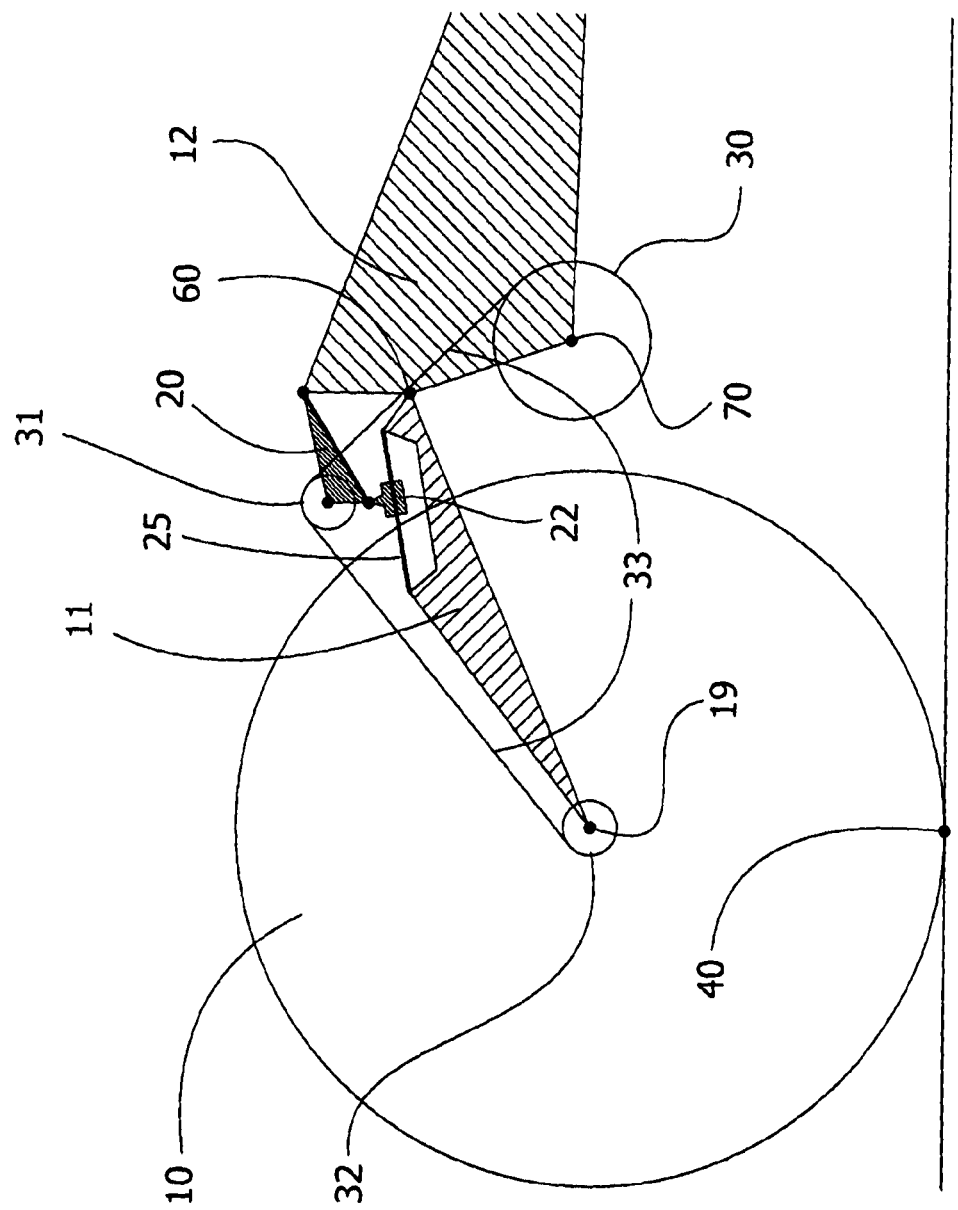
FIG. 8 shows a diagrammatic representation of a bicycle driven wheel suspension system according to a further 'single-pivot' embodiment of the invention.

Referring now to FIG. 8, there is shown another embodiment of a suspension system according to the invention which uses a linear guide 25. In this embodiment, an idler sprocket 31 is rotatably mounted at a location on an idler carrier member 20 that is pivotally connected at a location on the chassis 12. The idler carrier member 20 is pivotally connected to an idler carrier manipulation member 22. The idler carrier manipulation member 22 is slidably connected to the linear guide 25 that is mounted to the driven wheel carrier member 11. In this way, the idler carrier member 20 is movable relative to both the chassis 12 and the driven wheel carrier member 11. In this embodiment, the idler sprocket 31 is configured such that the power transmitting segment 33 of the chain is routed above the idler sprocket 31. In other arrangements, the chain may be routed below the idler sprocket 31 or to the left or right of it. FIG. 8 depicts another example whereby the idler sprocket 31 is rotatably mounted on an idler carrier member 20 that forms part of a 'link and slider' mechanism operating between the driven wheel carrier member 11 and the chassis 12.

Figure 9:
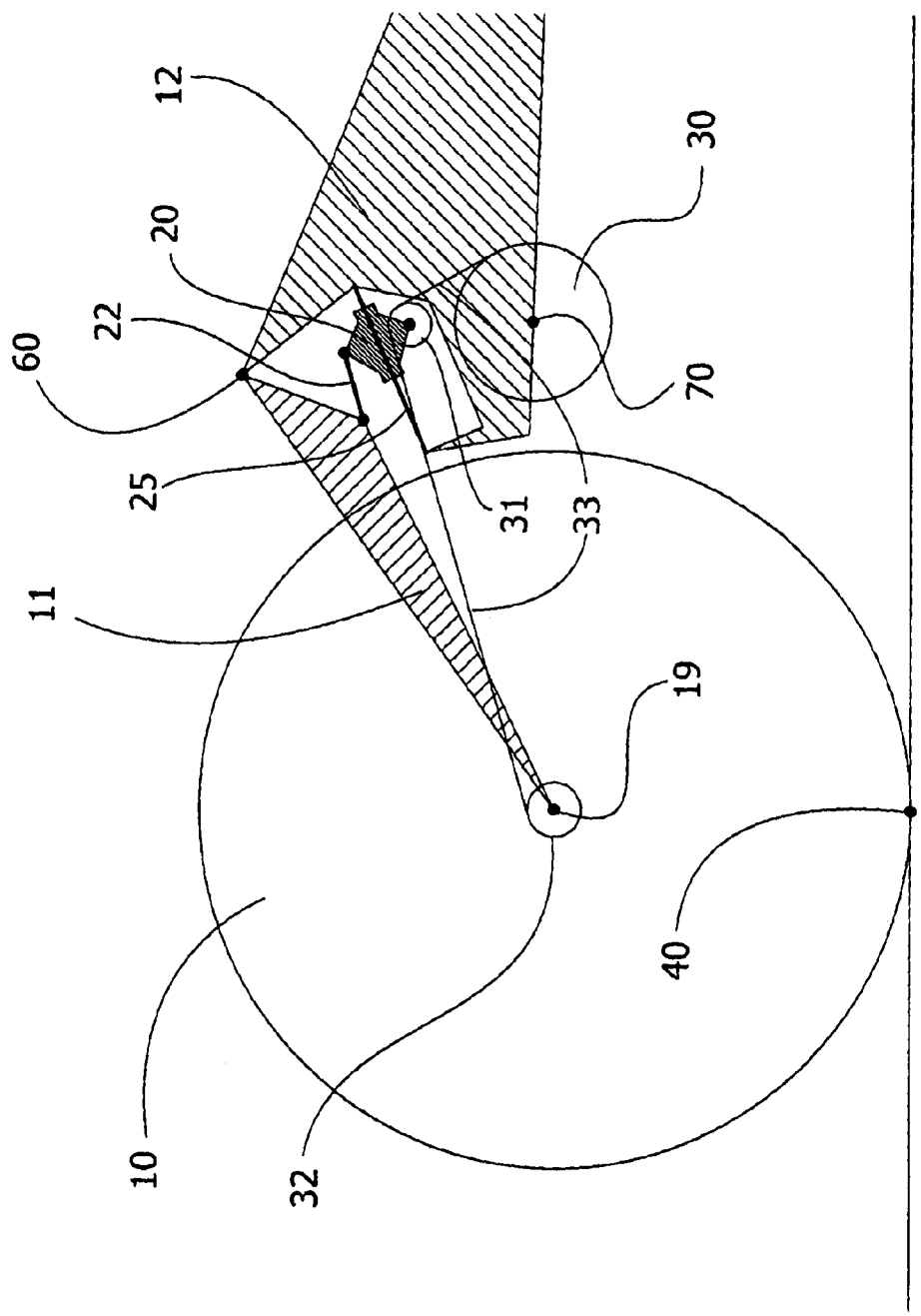
FIG. 9 shows a diagrammatic representation of a bicycle driven wheel suspension system according to a further 'single-pivot' embodiment of the invention.

Referring now to FIG. 9, there is shown another embodiment of a suspension system according to the invention which uses a linear guide 25. In this embodiment, an idler carrier member 20 is slidably connected to a linear guide 25 that is mounted on the chassis 12. An idler carrier manipulation member 22 is pivotally connected at a location on the driven wheel carrier member 11, and at a location on the idler carrier member 20. In this way, the idler carrier member 20 is movable relative to both the chassis 12 and the driven wheel carrier member 11. An idler sprocket 31 is rotatably mounted at a location on the idler carrier member 20. In this embodiment, the idler sprocket 31 is configured such that the power transmitting segment 33 of the chain is routed above the idler sprocket 31. In other arrangements, the chain may be routed below the idler sprocket 31 or to the left or right of it. FIG. 9 depicts another example whereby the idler sprocket 31 is rotatably mounted on an idler carrier member 20 that forms part of a 'link and slider' mechanism operating between the driven wheel carrier member 11 and the chassis 12.

Figure 10:
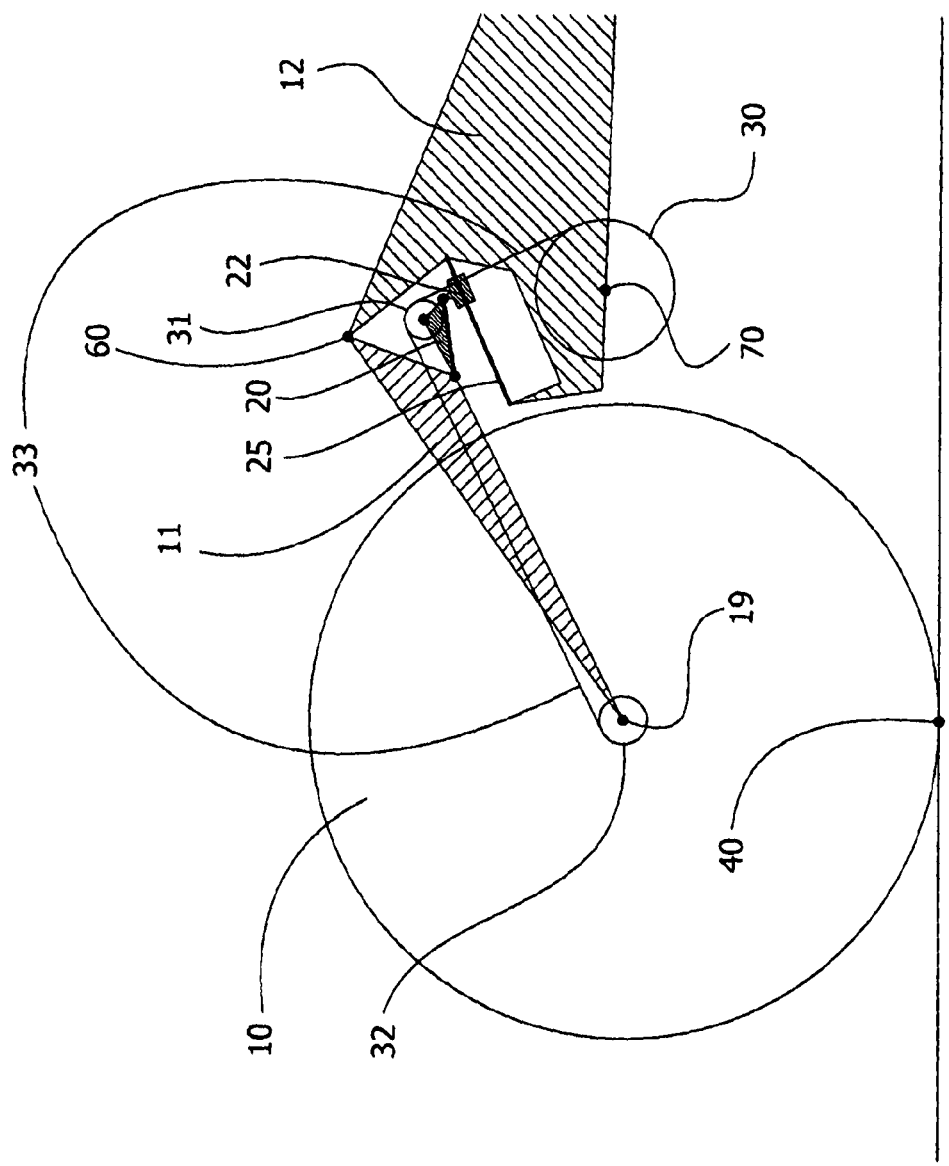
FIG. 10 shows a diagrammatic representation of a bicycle driven wheel suspension system according to a further 'single-pivot' embodiment of the invention.

Referring now to FIG. 10, there is shown another embodiment of a suspension system according to the invention which uses a linear guide 25. In this embodiment, an idler carrier member 20 is pivotally connected at a location on the driven wheel carrier member 11. An idler carrier manipulation member 22 is slidably connected to a linear guide 25 that is mounted on the chassis 12, and pivotally connected at a location on the idler carrier member 20. In this way, the idler carrier member 20 is movable relative to both the chassis 12 and the driven wheel carrier member 11. An idler sprocket 31 is rotatably mounted at a location on the idler carrier member 20. In this embodiment, the idler sprocket 31 is configured such that the power transmitting segment 33 of the chain is routed above the idler sprocket 31. In other arrangements, the chain may be routed below the idler sprocket 31 or to the left or right of it. FIG. 10 depicts another example whereby the idler sprocket 31 is rotatably mounted on an idler carrier member 20 that forms part of a 'link and slider' mechanism operating between the driven wheel carrier member 11 and the chassis 12.

Figure 11:
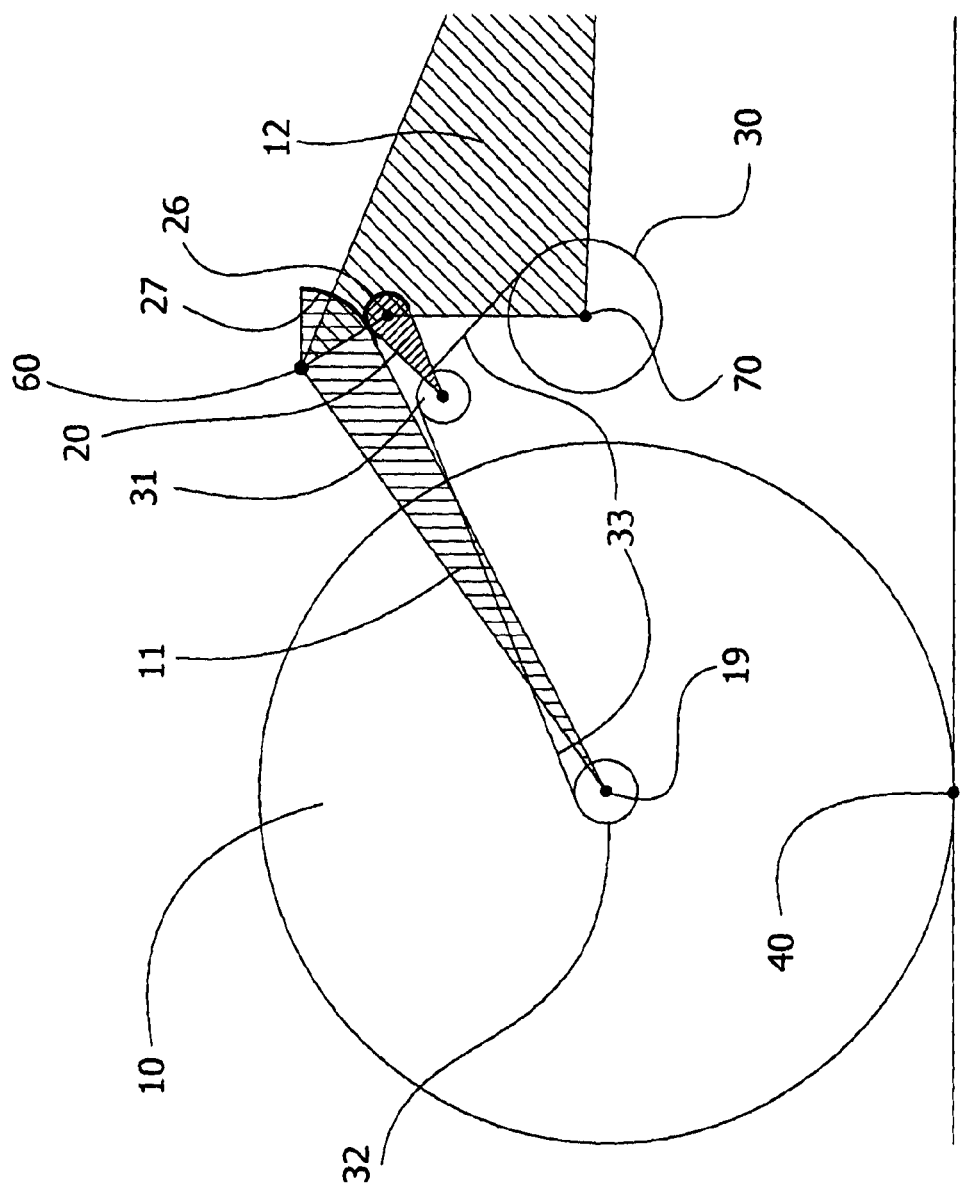
FIG. 11 shows a diagrammatic representation of a bicycle driven wheel suspension system according to a further 'single-pivot' embodiment of the invention.

Referring now to FIG. 11, there is shown yet another single-pivot suspension mechanism arrangement. In this embodiment, an idler carrier member 20 is pivotally connected at a location on the chassis 12. The idler carrier member 20 has a toothed surface 26 in a circular arc coaxial with its pivot point on the chassis 12. The driven wheel carrier member 11 has a toothed surface 27 in a circular arc coaxial with its pivot. The arc radii of the toothed surfaces are sized appropriately so that the teeth engage like a pair of gears, such that the idler carrier member 20 moves as a function of suspension travel. In this way, the idler carrier member 20 is movable relative to both the chassis 12 and the driven wheel carrier member 11. An idler sprocket 31 is rotatably mounted at a location on the idler carrier member 20. In this embodiment, the idler sprocket 31 is configured such that the power transmitting segment 33 of the chain is routed above the idler sprocket 31. In other arrangements, the chain may be routed below the idler sprocket 31 or to the left or right of it. FIG. 11 depicts an example whereby the idler sprocket 31 is rotatably mounted on an idler carrier member 20 that forms part of a 'geared' mechanism operating between the driven wheel carrier member 11 and the chassis 12.

Figure 12:
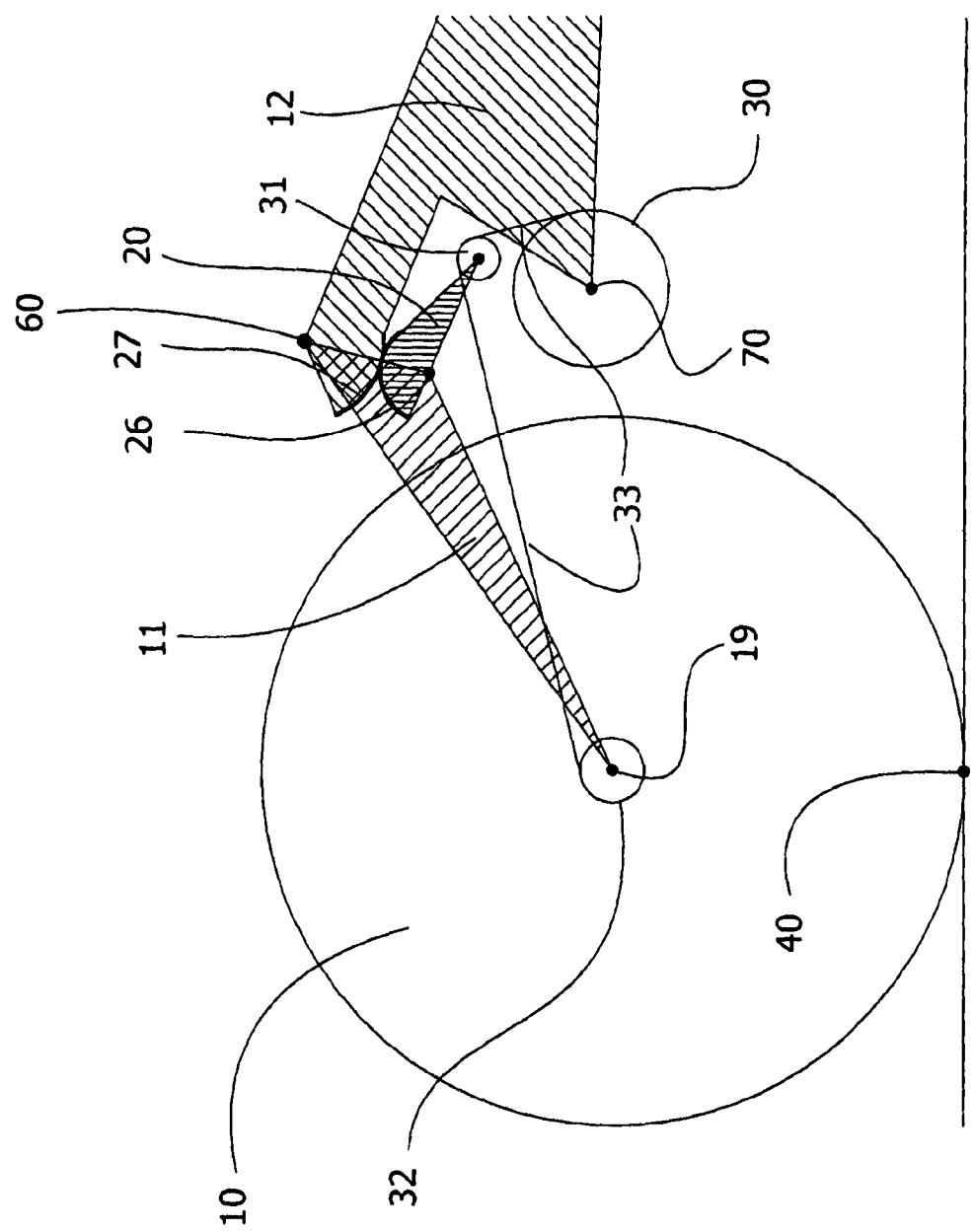
FIG. 12 shows a diagrammatic representation of a bicycle driven wheel suspension system according to a further 'single-pivot' embodiment of the invention.

Referring now to FIG. 12, there is shown a further embodiment of a geared single-pivot suspension arrangement. In this embodiment, an idler carrier member 20 is pivotally connected at a location on the driven wheel carrier member 11. The idler carrier member 20 has a toothed surface 26 in a circular arc coaxial with its pivot point on the driven wheel carrier member 11. The chassis 12 has a toothed surface 27 in a circular arc coaxial with its pivot. The arc radii of the toothed surfaces are sized appropriately so that the teeth engage like a pair of gears, such that the idler carrier member 20 moves as a function of suspension travel. In this way, the idler carrier member 20 is movable relative to both the chassis 12 and the driven wheel carrier member 11. An idler sprocket 31 is rotatably mounted at a location on the idler carrier member 20. In this embodiment, the idler sprocket 31 is configured such that the power transmitting segment 33 of the chain is routed above the idler sprocket 31. In other arrangements, the chain may be routed below the idler sprocket 31 or to the left or right of it. FIG. 11 depicts another example whereby the idler sprocket 31 is rotatably mounted on an idler carrier member 20 that forms part of a 'geared' mechanism operating between the driven wheel carrier member 11 and the chassis 12.

Figure 13:
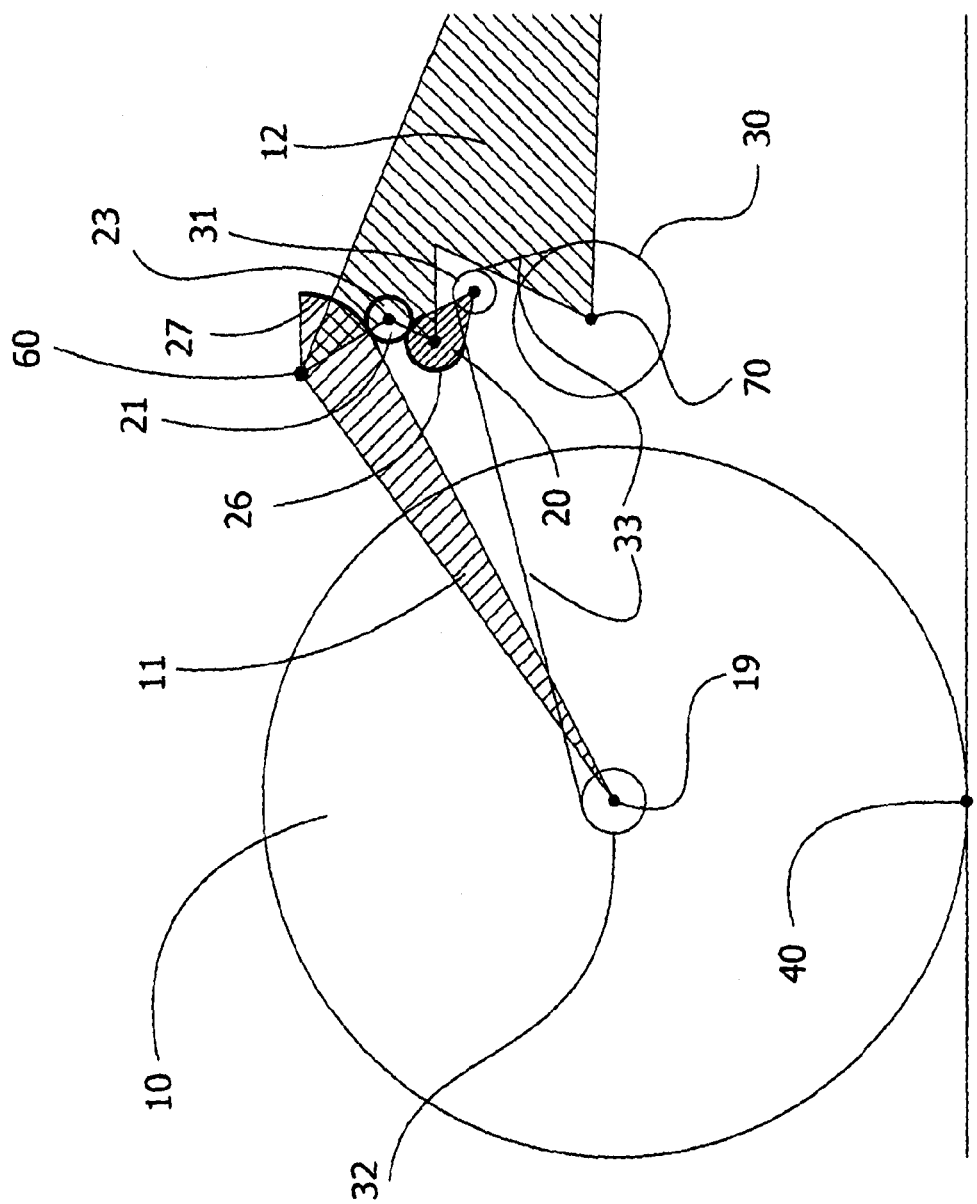
FIG. 13 shows a diagrammatic representation of a bicycle driven wheel suspension system according to a further 'single-pivot' embodiment of the invention.

Referring now to FIG. 13, there is shown a further embodiment of a geared single-pivot suspension arrangement. In this embodiment, an idler carrier member 20 is pivotally connected at a location on the chassis 12. The idler carrier member 20 has a toothed surface 26 in a circular arc coaxial with its pivot point on the chassis 12. The driven wheel carrier member 11 has a toothed surface 27 in a circular arc coaxial with its pivot. An idler carrier manipulation gear 23 is rotatably mounted to the chassis 12 such that it engages both the toothed surfaces 26 and 27, such that the idler carrier member 20 moves as a function of suspension travel. In this way, the idler carrier member 20 is movable relative to both the chassis 12 and the driven wheel carrier member 11. An idler sprocket 31 is rotatably mounted at a location on the idler carrier member 20. In this embodiment, the idler sprocket 31 is configured such that the power transmitting segment 33 of the chain is routed above the idler sprocket 31. In other arrangements, the chain may be routed below the idler sprocket 31 or to the left or right of it. FIG. 13 depicts another example whereby the idler sprocket 31 is rotatably mounted on an idler carrier member 20 that forms part of a 'geared' mechanism operating between the driven wheel carrier member 11 and the chassis 12.

Figure 14:
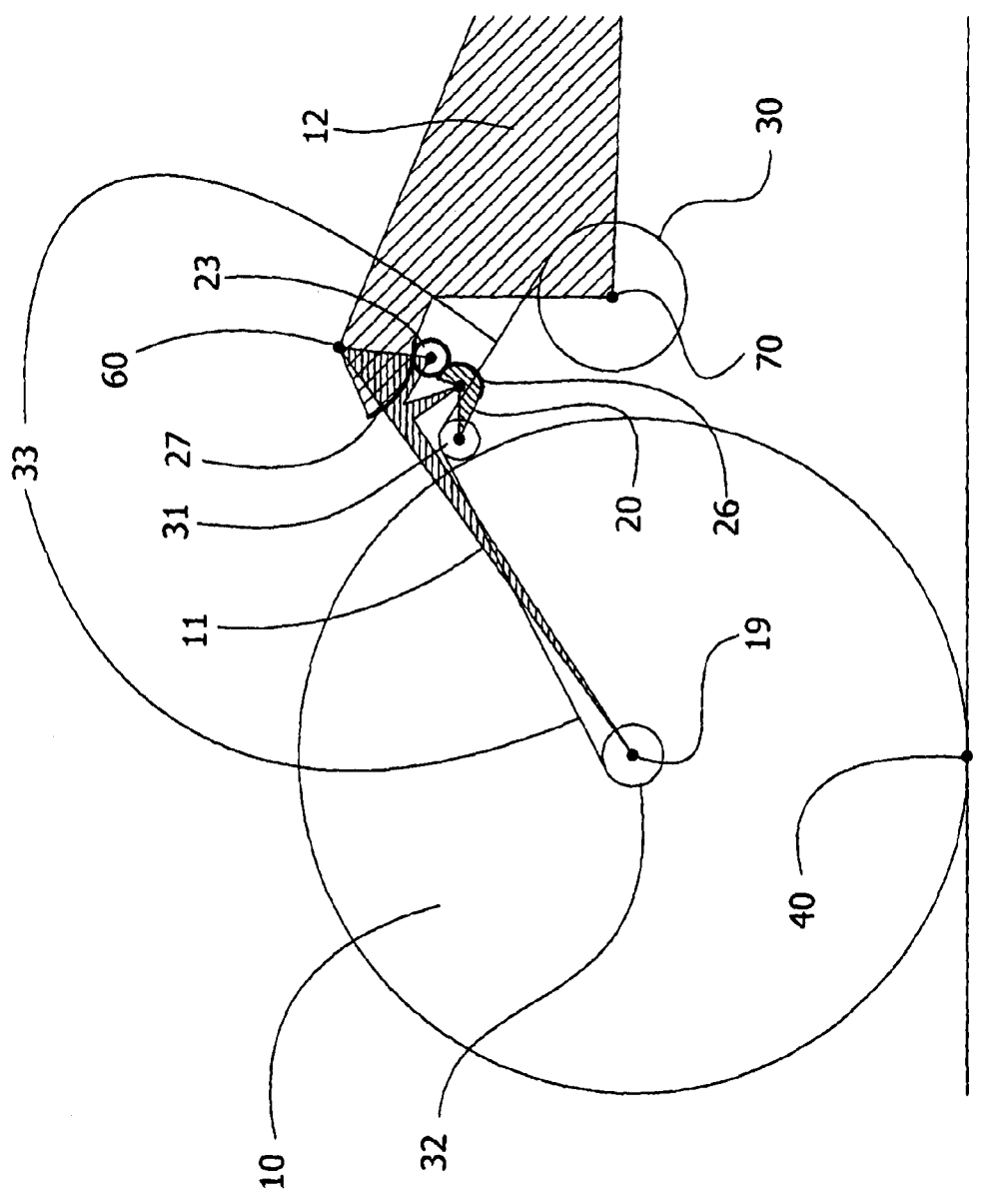
FIG. 14 shows a diagrammatic representation of a bicycle driven wheel suspension system according to a further 'single-pivot' embodiment of the invention.

Referring now to FIG. 14, there is shown a further embodiment of a geared single-pivot suspension arrangement. In this embodiment, an idler carrier member 20 is pivotally connected at a location on the driven wheel carrier member 11. The idler carrier member 20 has a toothed surface 26 in a circular arc coaxial with its pivot point on the driven wheel carrier member 11. The chassis 12 has a toothed surface 27 in a circular arc coaxial with its pivot. An idler carrier manipulation gear 23 is rotatably connected to the driven wheel carrier member 11 such that it engages both the toothed surfaces 26 and 27, such that the idler carrier member 20 moves as a function of suspension travel. In this way, the idler carrier member 20 is movable relative to both the chassis 12 and the driven wheel carrier member 11. An idler sprocket 31 is rotatably mounted at a location on the idler carrier member 20. In this embodiment, the idler sprocket 31 is configured such that the power transmitting segment 33 of the chain is routed above the idler sprocket 31. In other arrangements, the chain may be routed below the idler sprocket 31 or to the left or right of it. FIG. 13 depicts another example whereby the idler sprocket 31 is rotatably mounted on an idler carrier member 20 that forms part of a 'geared' mechanism operating between the driven wheel carrier member 11 and the chassis 12.

Figure 15:
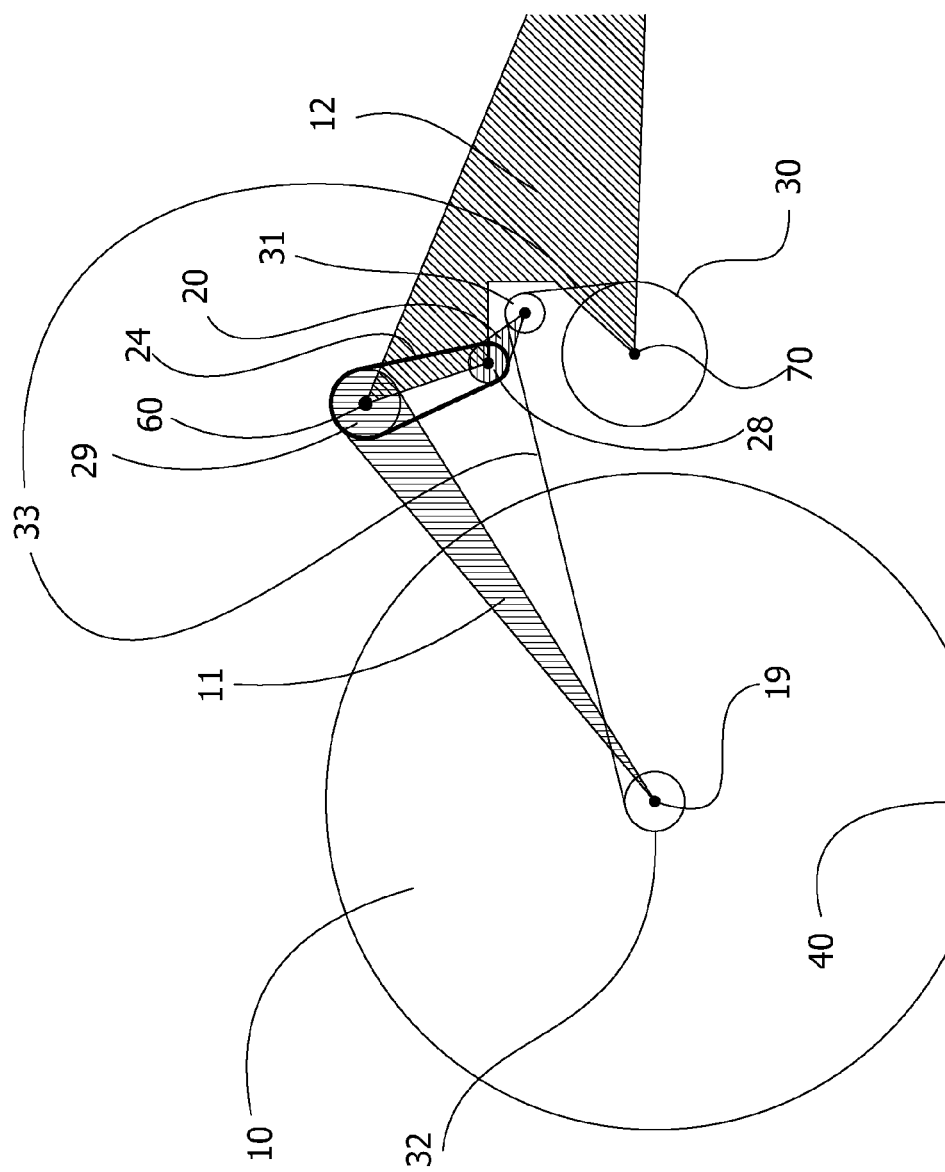
FIG. 15 shows a diagrammatic representation of a bicycle driven wheel suspension system according to a further 'single-pivot' embodiment of the invention.

Referring now to FIG. 15, there is shown a further embodiment of the invention having a pulley mechanism incorporated into the single-pivot suspension system. In this embodiment, an idler carrier member 20 is pivotally connected at a location on the chassis 12. The idler carrier member 20 has a fixed pulley or sprocket 28, coaxial with its pivot on the chassis 12, designed to engage with a belt or chain. The driven wheel carrier member 11 has a fixed pulley or sprocket 29, coaxial with its pivot on the chassis 12, also designed to engage with a belt or chain. An idler carrier manipulation belt or chain 24 encircles pulley or sprocket elements 28, 29, so that the idler carrier member 20 rotates as a function of suspension travel. In this way, the idler carrier member 20 is movable relative to both the chassis 12 and the driven wheel carrier member 11. An idler sprocket 31 is rotatably mounted at a location on the idler carrier member 20. In this embodiment, the idler sprocket 31 is configured such that the power transmitting segment 33 of the chain is routed above the idler sprocket 31. In other arrangements, the chain may be routed below the idler sprocket 31 or to the left or right of it. FIG. 13 depicts an example whereby the idler sprocket 31 is rotatably mounted on an idler carrier member 20 that forms part of a 'belt and pulley' (or 'chain and sprocket') mechanism operating between the driven wheel carrier member 11 and the chassis 12.

Figure 16:
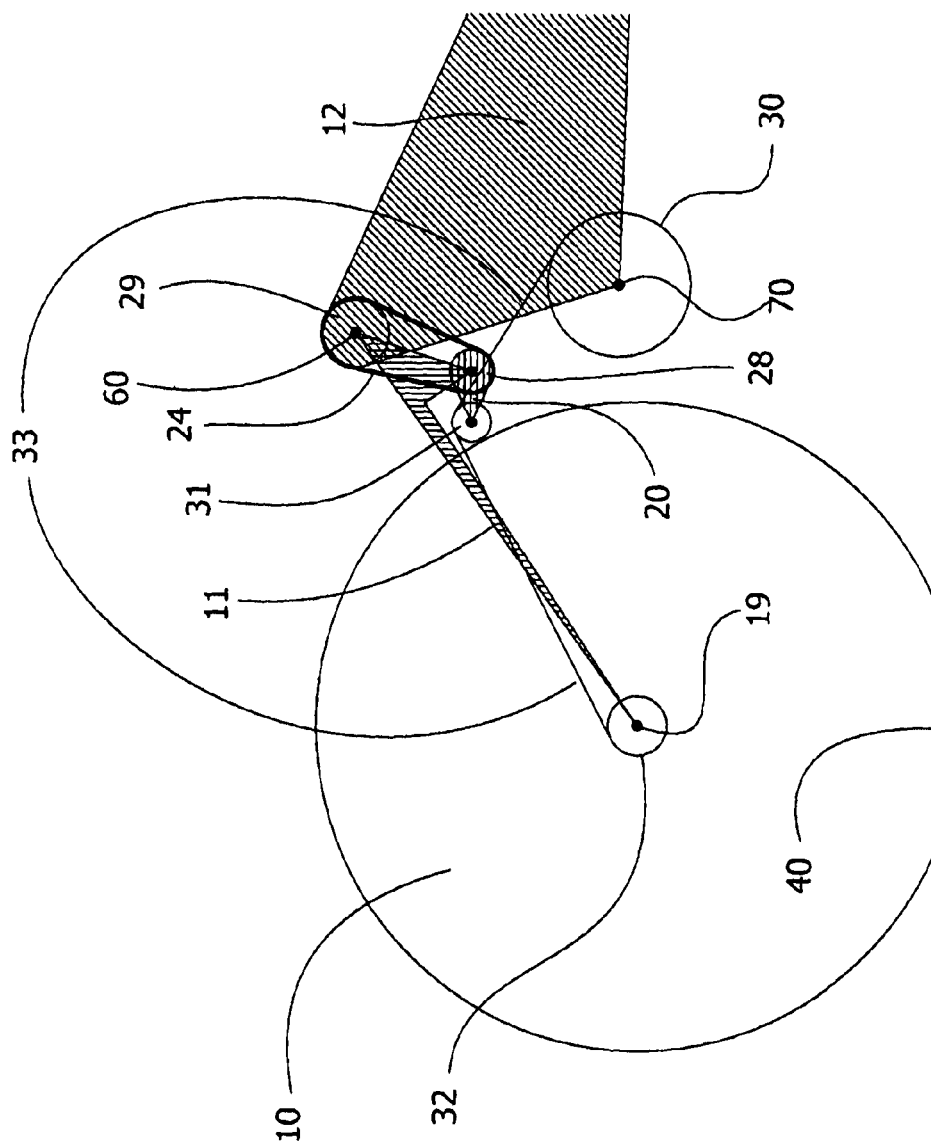
FIG. 16 shows a diagrammatic representation of a bicycle driven wheel suspension system according to a further 'single-pivot' embodiment of the invention.

Referring now to FIG. 16, there is shown another embodiment of the invention having a 'belt and pulley' mechanism incorporated into the single-pivot suspension system. In this embodiment, an idler carrier member 20 is pivotally connected at a location on the driven wheel carrier member 11. The idler carrier member 20 has a fixed pulley or sprocket 28, coaxial with its pivot on the driven wheel carrier member, designed to engage with a belt or chain. The chassis 12 has a fixed pulley or sprocket 29, coaxial with its pivot on the driven wheel carrier member 11, also designed to engage with a belt or chain. An idler carrier manipulation belt or chain 24 encircles pulley or sprocket elements 28, 29, so that the idler carrier member 20 rotates as a function of suspension travel. In this way, the idler carrier member 20 is movable relative to both the chassis 12 and the driven wheel carrier member 11. An idler sprocket 31 is rotatably mounted at a location on the idler carrier member 20. In this embodiment, the idler sprocket 31 is configured such that the power transmitting segment 33 of the chain is routed above the idler sprocket 31. In other arrangements, the chain may be routed below the idler sprocket 31 or to the left or right of it. FIG. 13 depicts an example whereby the idler sprocket 31 is rotatably mounted on an idler carrier member 20 that forms part of a 'belt and pulley' (or 'chain and sprocket') mechanism operating between the driven wheel carrier member 11 and the chassis 12.

Figure 17:
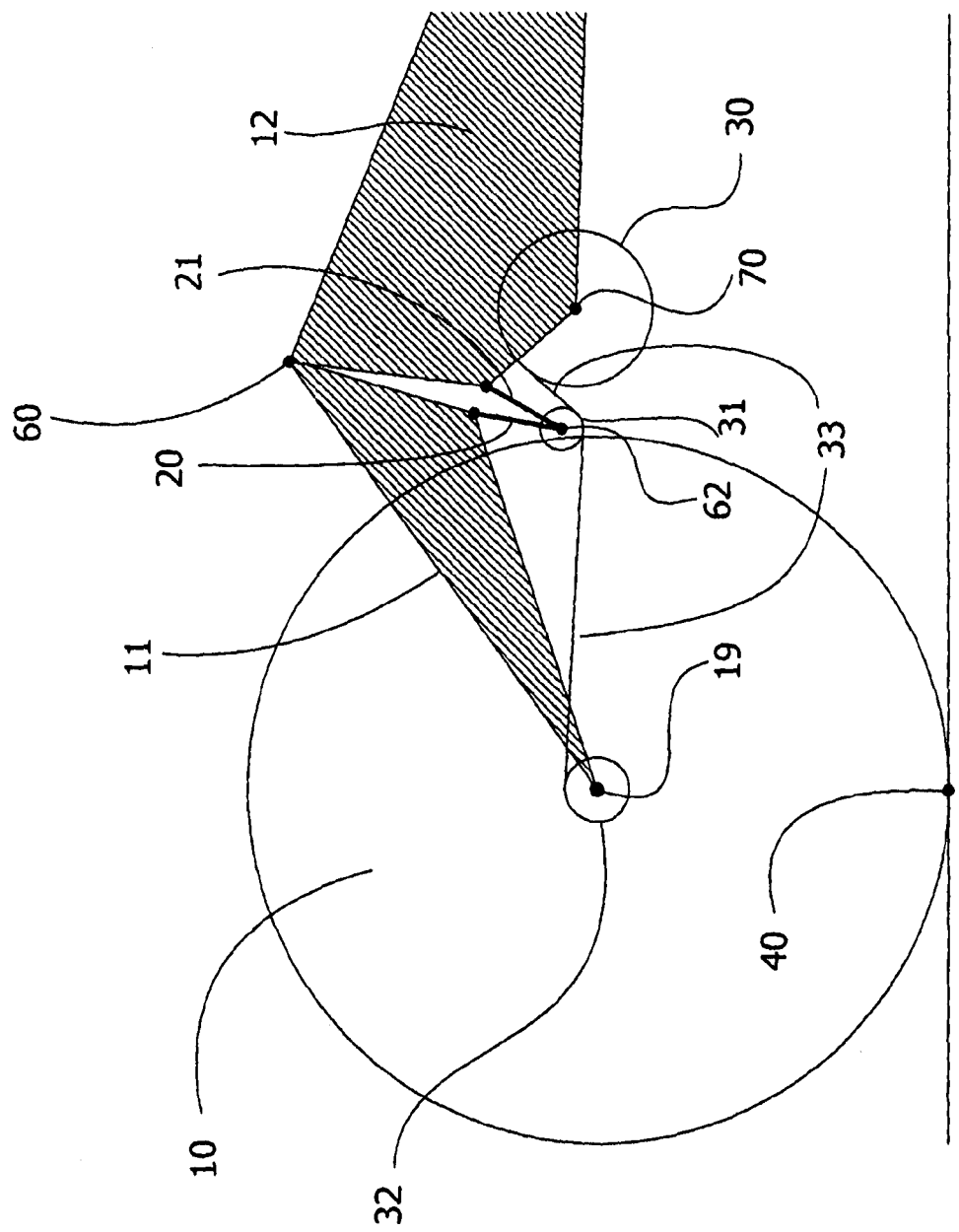
FIG. 17 shows a diagrammatic representation of a bicycle driven wheel suspension system according to a further 'single-pivot' embodiment of the invention.

Referring now to FIG. 17, there is shown an example of a vehicle suspension system according to the present invention in which the idler sprocket 31 is configured such that the power transmitting segment 33 of the chain is routed below the idler sprocket 31. Any of the embodiments described herein may be configured such that the chain runs below the idler sprocket 31. The particular representation shown in FIG. 17 shows the idler sprocket 31 rotatably mounted on idler carrier members 20, 21 similar to that shown in FIGS. 2a-2c.

The embodiments described above for a single-pivot suspension system, illustrate that there are numerous structural mechanisms that may be used to control movement of the idler member throughout suspension travel. Examples shown include linkage mechanisms, link and slider mechanisms, geared mechanisms and pulley mechanisms. Any of these mechanisms, or combinations of these mechanisms working together may be used to control the predetermined path that the idler member needs to follow to generate a desired acceleration response. In each embodiment, the idler member is configured to strategically affect growth or shrinkage of the power transmitting segment of the chain, thereby manipulating the amount of anti-squat throughout the suspension travel.

It is to be understood that any of the mechanisms described may be incorporated to operate between any two movable elements of an overall suspension system (i.e. including movable elements that might also be used to operate a spring/damper mechanism). The invention shall be taken to include all such permutations which are not described with reference to further illustrations.

Four-Bar Linkage Embodiments

The present invention is not limited to single-pivot suspension mechanisms. The invention is also applicable to four-bar linkage suspension mechanisms. An example of how the invention may be embodied in a simple four-bar linkage mechanism is shown in FIGS. 18*a*-18*c*.

Figure 18A:
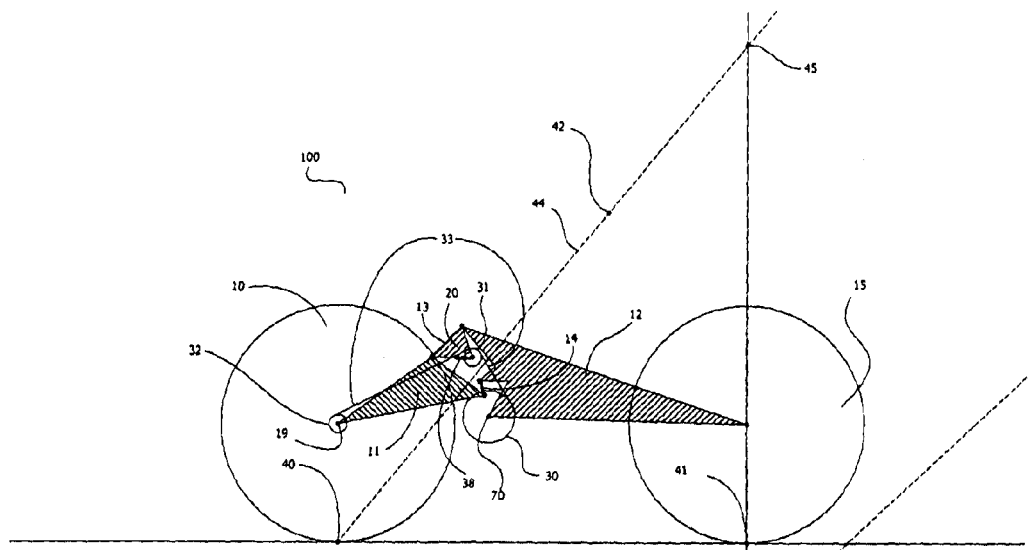
FIGS. 18a-18c show diagrammatic representations of a bicycle driven wheel suspension system according to a 'four-bar' suspension embodiment of the invention at 0%, 50% and 100% suspension travel respectively.
Figure 18B:
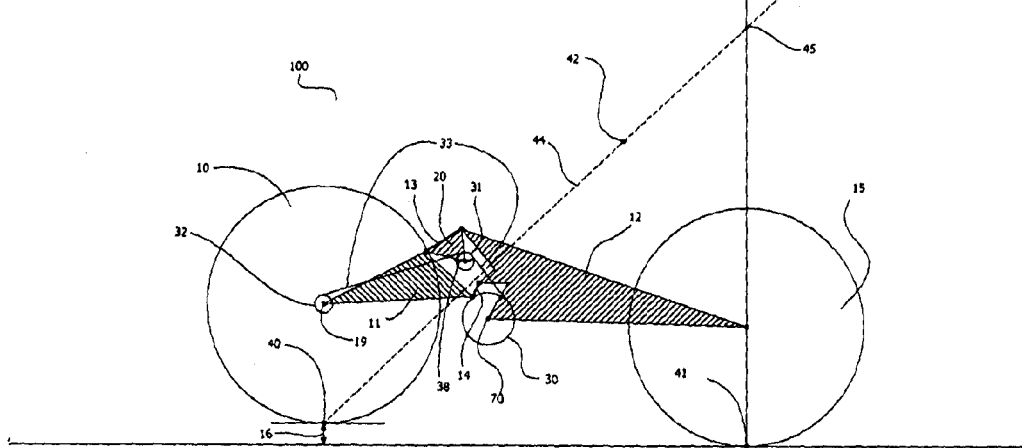
Figure 18C:
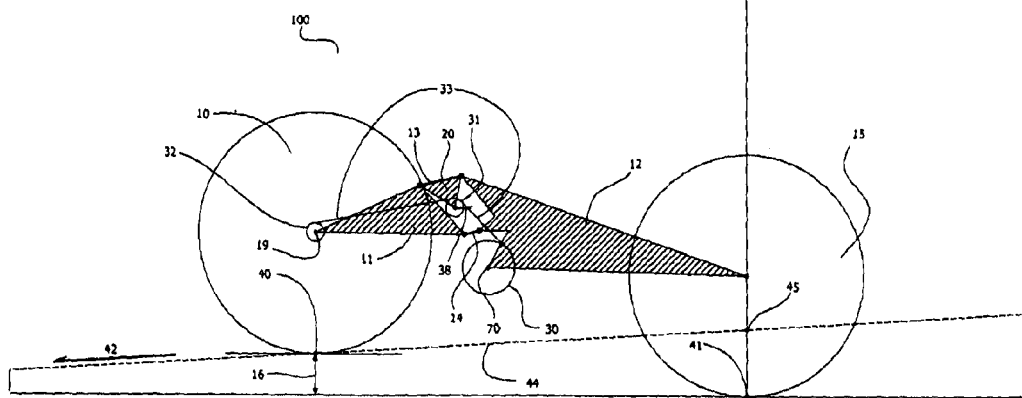

Each of FIGS. 18*a*-18*c* is a simplified two dimensional (2D) diagrammatic representation of a vehicle. FIG. 18*a* depicts the suspension system in a fully extended state (0% suspension travel); FIG. 18*b* shows the suspension system at 50% suspension travel, while FIG. 18*c* shows the suspension system in a fully compressed state (100% suspension travel). The suspension spring and damper arrangement are not shown in these figures for clarity.

The vehicle in FIGS. 18*a*-18*c* is a bicycle 100 having a rear driven wheel suspension system. The bicycle 100 has a front wheel 15, a rear (driven) wheel 10 and a chassis 12 (the main frame or front triangle). A rear driven wheel suspension system is provided by a suspension mechanism that is configured to isolate the movement of the driven wheel 10 from the movement of the chassis 12 of the bicycle 100. The suspension mechanism includes a driven wheel carrier member 11 that is rotatably connected to the driven wheel 10 (specifically the driven wheel axle 19). A first driven wheel carrier manipulation member 13 is pivotally connected to the driven wheel carrier member 11 and to the chassis 12. A second driven wheel carrier manipulation member 14 is pivotally connected to the chassis 12 and to the driven wheel carrier member 11. This type of linkage arrangement is known as a four-bar linkage. The first and second driven wheel carrier manipulation members are located so as to allow for a generally vertical movement of the driven wheel 10 relative to the chassis 12.

In FIGS. 18*a*-18*c*, the bicycle 100 has a bottom bracket 70 that is part of the chassis 12. A first sprocket 30 (the front or driving sprocket) is rotatably mounted to the bottom bracket 70. A power source (e.g. a rider) is mounted on the chassis 12, and applies power through pedals (not shown) that are connected to the driving sprocket 30. The rider is considered 'mounted' to the chassis as he/she is attached to the chassis via the pedals, handlebars and seat.

The driving sprocket 30 is mechanically coupled by a looped power transmission element (a chain in this embodiment) to a second sprocket 32 (the rear or driven sprocket) that is engaged with the driven wheel 10. Power is transmitted from the power source to the driven wheel 10 to generate vehicle acceleration through this chain-driven drivetrain arrangement. In FIGS. 18*a*-18*c* only the power transmitting segment 33 of the chain is shown. The power transmitting segment of the chain is known as the 'acceleration chain run' or 'power run'. The power transmitting segment refers to the segment of chain between the front and rear sprockets that is under tension during powered acceleration of the vehicle.

In this embodiment, an idler member 31 (an idler sprocket) is included in the suspension system/drivetrain to alter the dynamic behaviour of the vehicle under powered acceleration. The idler sprocket 31 is configured to engage with the power transmitting segment of the chain and to move to follow a predetermined path 38 as a function of suspension travel, to thereby alter a path of the power transmitting segment of the chain. This results in a controlled lengthening/shortening of the power transmitting segment of the chain. In this embodiment, the idler sprocket 31 is configured such that the power transmitting segment 33 of the chain is routed above the idler sprocket 31. In other arrangements, the chain may be routed below the idler sprocket 31 or to the left or right of it. The idler member 31 is configured to strategically affect growth or shrinkage of the power transmitting segment of the chain, thereby manipulating the amount of anti-squat.

The idler sprocket 31 in this system is rotatably mounted on the first driven wheel carrier manipulation member 13, at a distance from the pivot location of the first driven wheel carrier manipulation member 13 on the chassis 12 and on the driven wheel carrier member 11. In this embodiment, the first driven wheel carrier manipulation member 13 also acts as the idler carrier member 20 since the idler is rotatably mounted to it. In this embodiment, the idler carrier member 20 is part of the four-bar linkage suspension mechanism. Importantly, the idler carrier member 20 is movable relative to both the chassis 12 and driven wheel carrier member 11. FIGS. 18*a*-18*c* show how the position of the idler sprocket 31 moves throughout suspension travel. As the idler sprocket 31 moves throughout suspension travel, the path of the power transmitting segment of the chain is altered as shown. As this section of the chain is under tension, the direction at which chain tension forces are being transmitted back into the suspension system is constantly changing as the suspension moves through its range of travel. Again, for each instantaneous position of suspension travel, a driving force line 44 is drawn from the rear wheel contact patch 40 through the instant centre 42 of the driven wheel 10 relative to the suspended mass 12.

Figure 18D:
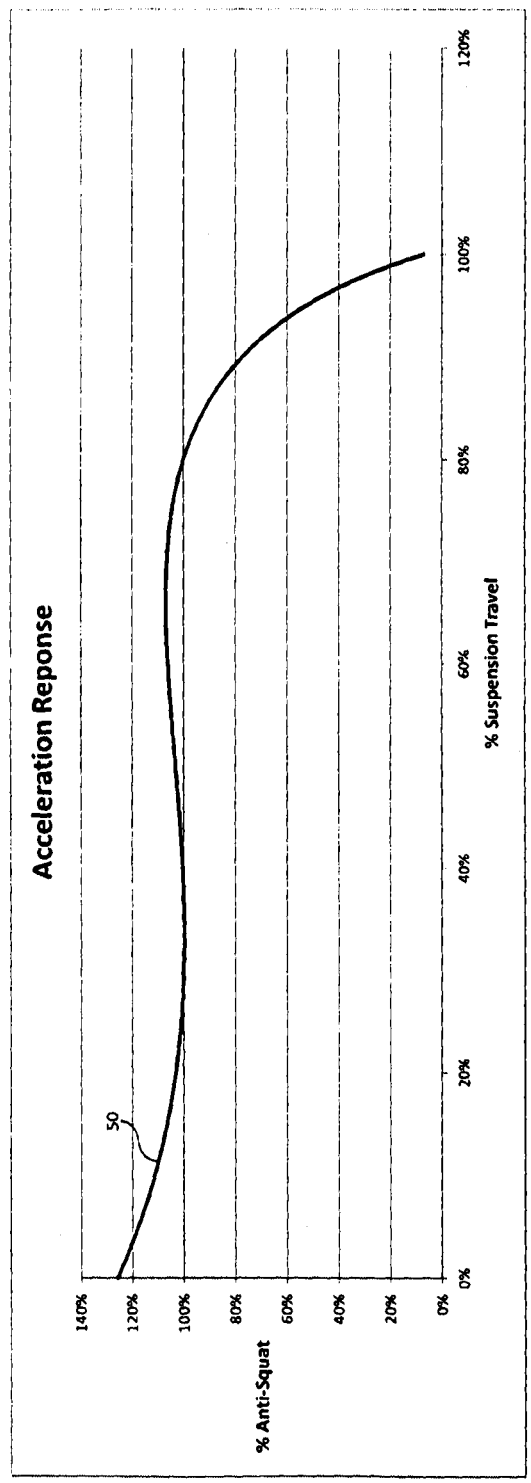
FIG. 18d depicts an acceleration response for the suspension system shown in FIGS. 18a-18c.

For the embodiment shown in FIGS. 18*a*-18*c*, an acceleration response curve 50 is shown in FIG. 18*d*. For this geometric arrangement, the idler sprocket 31 moves in a manner that produces an initially high amount of anti-squat, settling to a stable amount of anti-squat before finishing with a rapidly reducing amount of anti-squat as the suspension compresses.

The acceleration response of the embodiment may be tuned (changed or varied to achieve a desired response) by changing geometric variables which include: the location of the idler sprocket on the first driven wheel carrier manipulation member (distance from chassis pivot or distance from the driven wheel carrier member pivot) and the diameter of the idler sprocket. These variables all affect the motion (speed or path) of the idler sprocket, and hence affect the amount of chain growth or shrinkage that occurs during suspension travel. The above-mentioned variables allow the acceleration response to be tuned independently without affecting any other characteristics of the suspension system so that other design variables (such as the driven wheel path) are not compromised.

The suspension system shown in FIGS. 18*a*-18*c* is configurable to enable the design of almost any desired acceleration response (the acceleration response shown in FIG. 18*d* illustrates the particular response which the particular geometric arrangement shown in FIGS. 18*a*-18*c* would generate). The ability that this system provides to tune a wide range of acceleration responses is due to the idler sprocket being rotatably mounted on a structure (the idler carrier member) that is movable relative to both the chassis and driven wheel carrier member.

Figure 19:
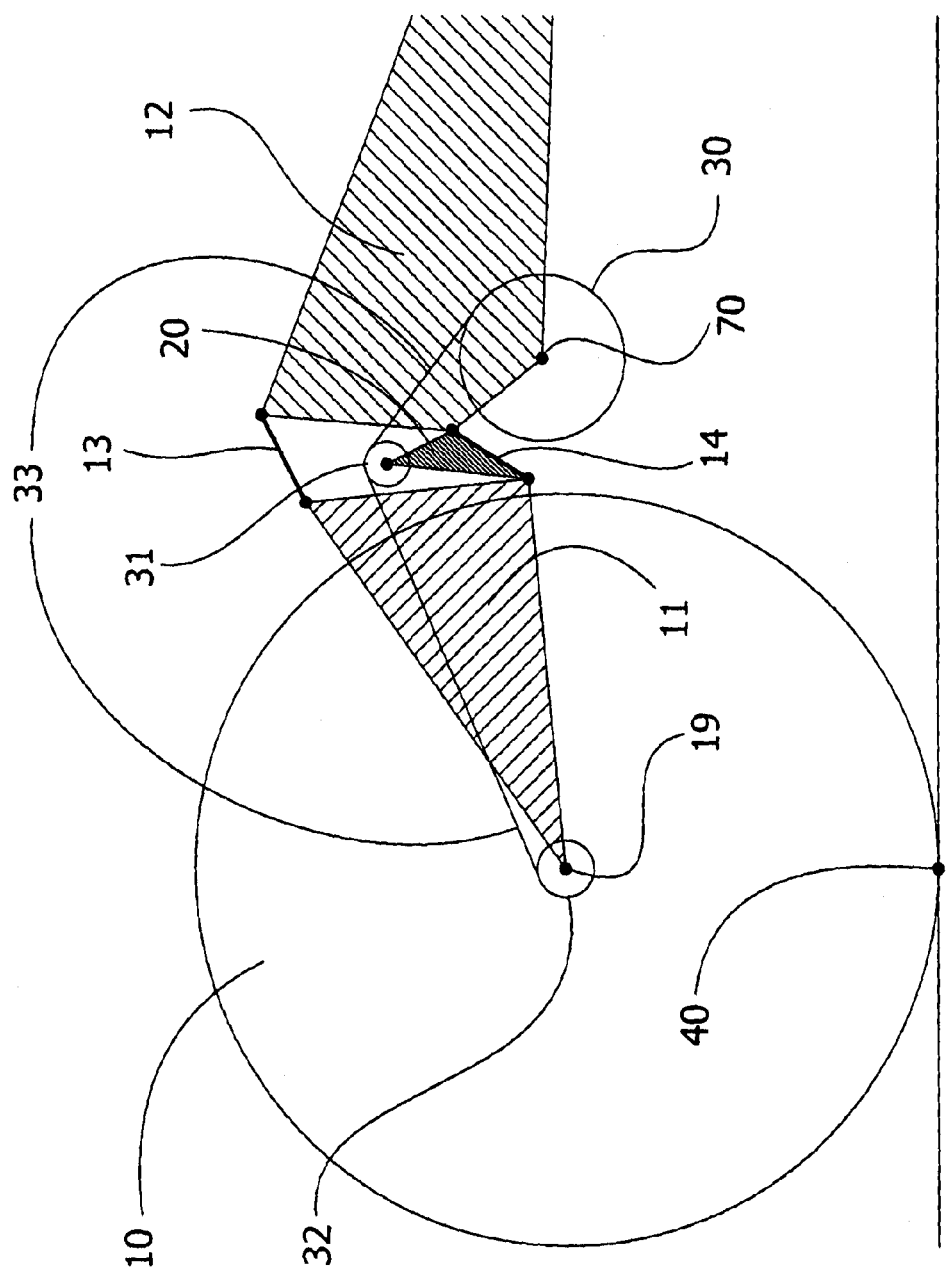
FIG. 19 shows a diagrammatic representation of a bicycle driven wheel suspension system according to a further 'four-bar' suspension embodiment of the invention.

Referring to FIG. 19, there is shown a further embodiment of a four-bar suspension mechanism according to the present invention. In this embodiment, there is a first driven wheel carrier manipulation member 13 pivotally connected to both the driven wheel carrier member 11 and the chassis 12. There is also a second driven wheel carrier manipulation member 14 pivotally connected to both the driven wheel carrier member 11 and the chassis 12. In this embodiment, the idler sprocket 31 is rotatably mounted to the second driven wheel carrier manipulation member 14 (the lower link) at a distance from the respective pivot locations on the wheel carrier member 11 and chassis 12. In this embodiment, the idler carrier member 20 is part of the four-bar linkage suspension mechanism. Importantly, the idler carrier member 20 is movable relative to both the chassis 12 and driven wheel carrier member 11. The idler sprocket 31 is configured in this embodiment such that the power transmitting segment 33 of the chain runs above the idler sprocket 31.

It will be appreciated by those skilled in the art that there are numerous ways of incorporating an idler member into a four-bar linkage suspension arrangement within the scope of the present invention. The embodiments described above show relatively simple examples of how an idler member may be mounted into a four-bar linkage suspension. The embodiments presented may represent the most practical and realistic application of the invention for a four-bar system. It is to be understood however, that any of the structural mechanisms described for the single-pivot embodiments may also be applied to a four-bar linkage system. The invention shall be taken to include all such permutations which are not described with reference to further illustrations.

Six-Bar Linkage Embodiment

The present invention is also applicable to six-bar linkage mechanisms. An example of how the invention may be embodied in a simple six-bar linkage is shown in FIG. 20.

Figure 20:
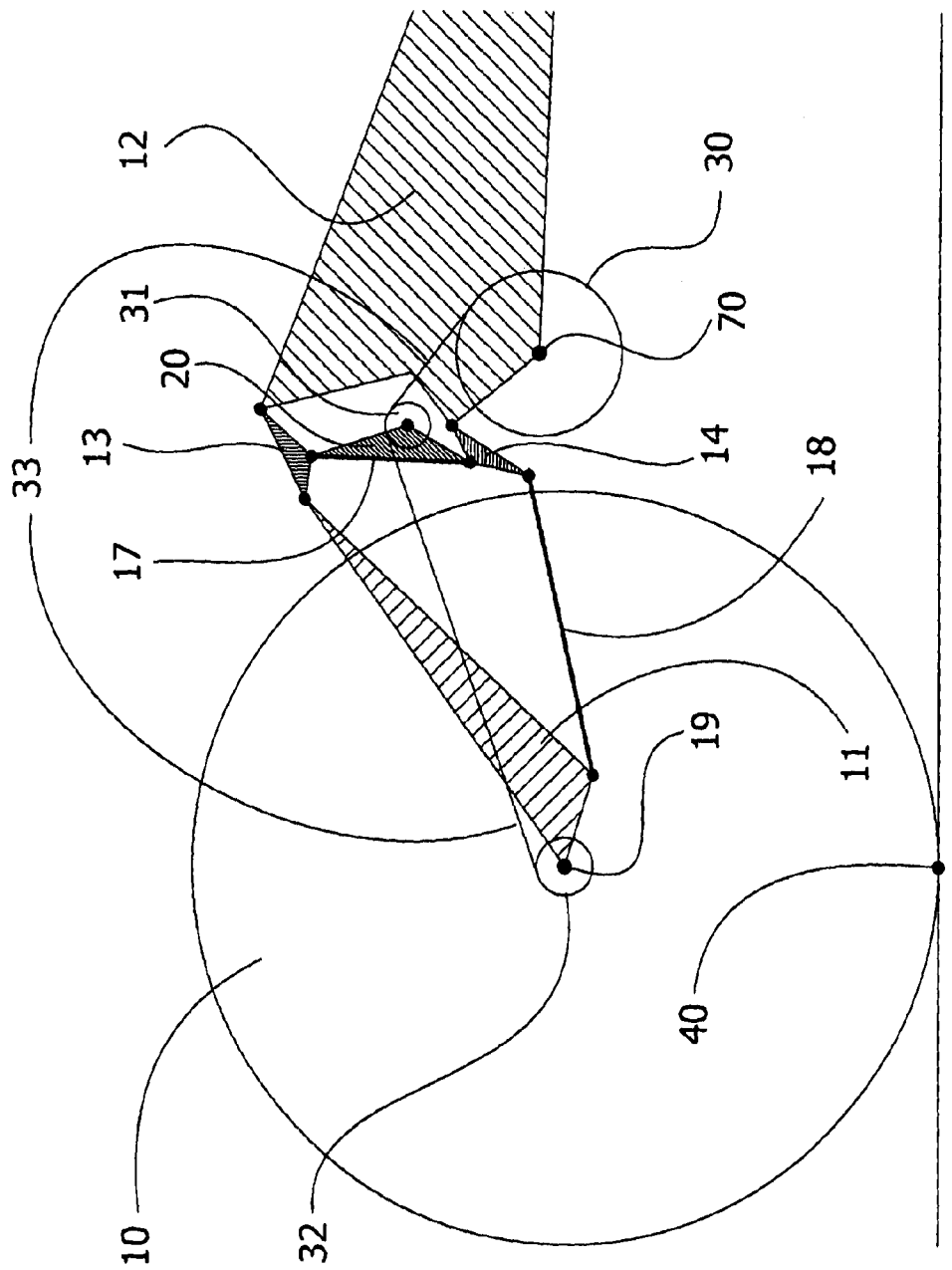
FIG. 20 shows a diagrammatic representation of a bicycle driven wheel suspension system according to a 'six-bar' suspension embodiment of the invention.

In FIG. 20 there is shown a suspension mechanism including a driven wheel carrier member 11 that is rotatably connected to the driven wheel 10 (specifically the driven wheel axle 19). A first driven wheel carrier manipulation member 13 is pivotally connected to both the driven wheel carrier member 11 and to the chassis 12. A second driven wheel carrier manipulation member 14 is pivotally connected to the chassis 12 as shown. A chainstay link 18 is pivotally connected between the driven wheel carrier member 11 and the second driven wheel carrier manipulation member 14. A control link 17 is pivotally connected between the first driven wheel carrier manipulation member 13 and the second driven wheel carrier manipulation member 14. An idler sprocket 31 is rotatably mounted at a location on the control link 17. In this embodiment, the control link 17 also serves as the idler carrier member 20. In this embodiment, the idler sprocket 31 is configured such that the power transmitting segment 33 of the chain is routed above the idler sprocket 31. In other arrangements, the chain may be routed below the idler sprocket 31 or to the left or right of it. Importantly, the idler carrier member 20 is movable relative to both the chassis 12 and driven wheel carrier member 11.

Numerous other embodiments of six-bar linkage mechanisms are possible that fall within the scope of the present invention. For example, the driven wheel carrier member 11 and chainstay link 18 may be connected to other combinations of members 13, 14 and 17. The idler sprocket 31 may also be mounted on any of members 13, 14 and 18. Alternatively, the idler sprocket 31 may be controlled by a dedicated mechanism, such as any of the mechanisms illustrated and described for the single-pivot embodiments.

Slider Mechanism Embodiment

Figure 21:
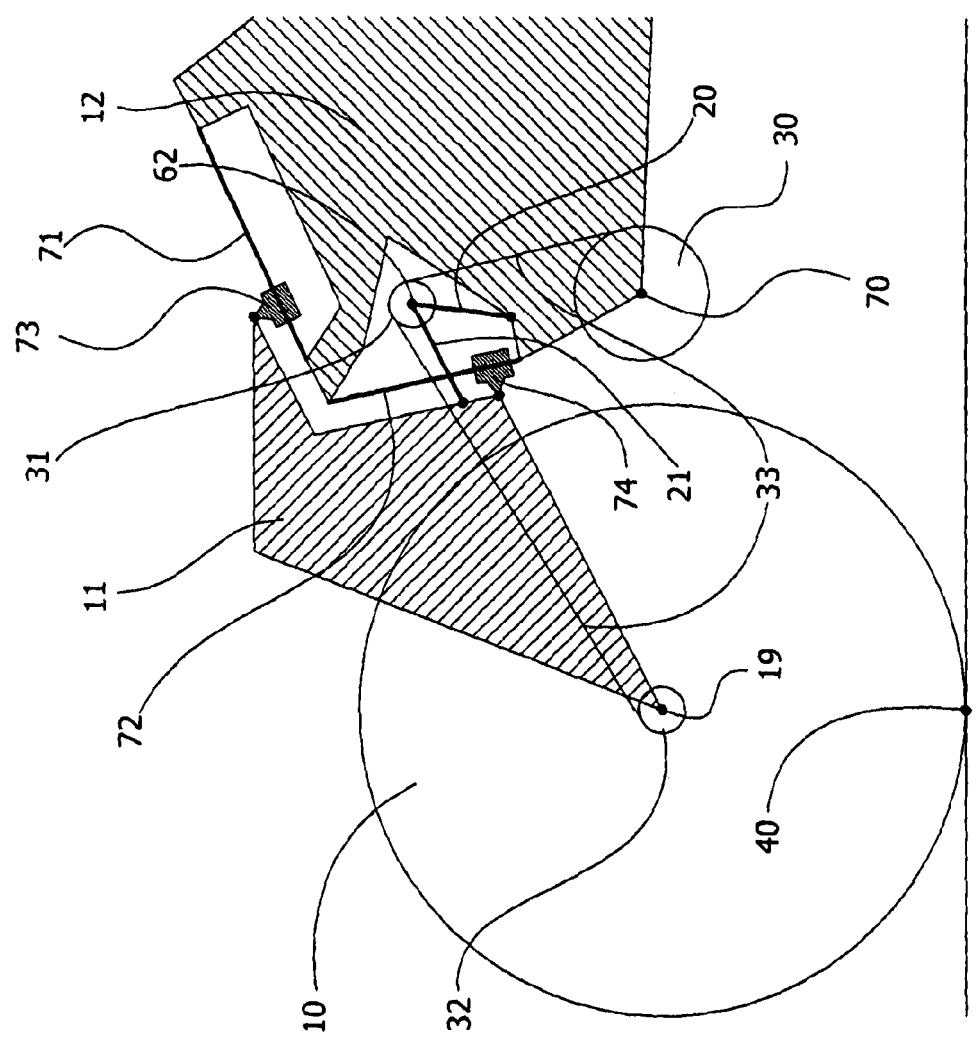
FIG. 21 shows a diagrammatic representation of a bicycle driven wheel suspension system according to a 'slider and slider' suspension embodiment of the invention.

The present invention is also applicable to suspension mechanisms of the 'slider' type whereby the suspension mechanism is slidable on linear tracks. An example of how the invention may be embodied in a simple 'slider and slider' suspension mechanism is shown in FIG. 21. In this embodiment, the driven wheel carrier member 11 is movable with respect to the chassis 12 on linear guides 71, 72. Linear guide 71 is mounted to the chassis 12 and linear guide 72 is mounted to the chassis 12. A first driven wheel carrier manipulation member 73 is pivotally connected to the driven wheel carrier member 11 and slidably connected to linear guide 71. A second wheel carrier manipulation member 74 is pivotally connected to the driven wheel carrier member 11 and slidably connected to linear guide 72.

In this embodiment, an idler member 31 (an idler sprocket) is included in the suspension system/drivetrain to alter the dynamic behaviour of the vehicle under powered acceleration. The idler sprocket 31 is configured to engage with the power transmitting segment of the chain and to move to follow a predetermined path as a function of suspension travel, to thereby alter a path of the power transmitting segment of the chain. This results in a controlled lengthening/shortening of the power transmitting segment of the chain. In this embodiment, the idler sprocket 31 is configured such that the power transmitting segment 33 of the chain is routed above the idler sprocket 31. In other arrangements, the chain may be routed below the idler sprocket 31 or to the left or right of it. The idler member 31 is configured to strategically affect growth or shrinkage of the power chain run, thereby manipulating the amount of anti-squat.

The idler sprocket 31 in this embodiment is rotatably mounted at the pivot point 62 between a first idler carrier member 20 and a second idler carrier member 21. The first idler carrier member 20 is pivotally connected to the chassis 12. The second idler carrier member 21 is pivotally connected to the driven wheel carrier member 11. In this embodiment, movement of the idler sprocket 31 during suspension travel is governed by a 'linkage' mechanism (the first and second idler carrier members) operating between the driven wheel carrier member 11 and the chassis 12. Importantly, the idler carrier members 20, 21 are movable relative to both the chassis 12 and driven wheel carrier member 11.

It will be appreciated by those skilled in the art that there are numerous ways of configuring a suspension mechanism to isolate movement of the driven wheel from the chassis. It is to be understood that any of these mechanisms described may be incorporated in many different ways, to facilitate isolated movement of the driven wheel. The invention shall be taken to include all such permutations which are not described with reference to further illustrations.

Braking System Embodiment

The present invention is also applicable to vehicle braking systems. Specifically, braking systems where the power transmitting wheel (the braking wheel) is part of a suspension system, and power is transmitted between the braking wheel and a power sink (mounted on the chassis) via a chain or belt drivetrain. A power sink may be taken to be a friction device or some kind of energy recovery system (e.g. a generator or flywheel). The invention may therefore be used to control the dynamic behaviour of the vehicle under braking.

Figure 22:
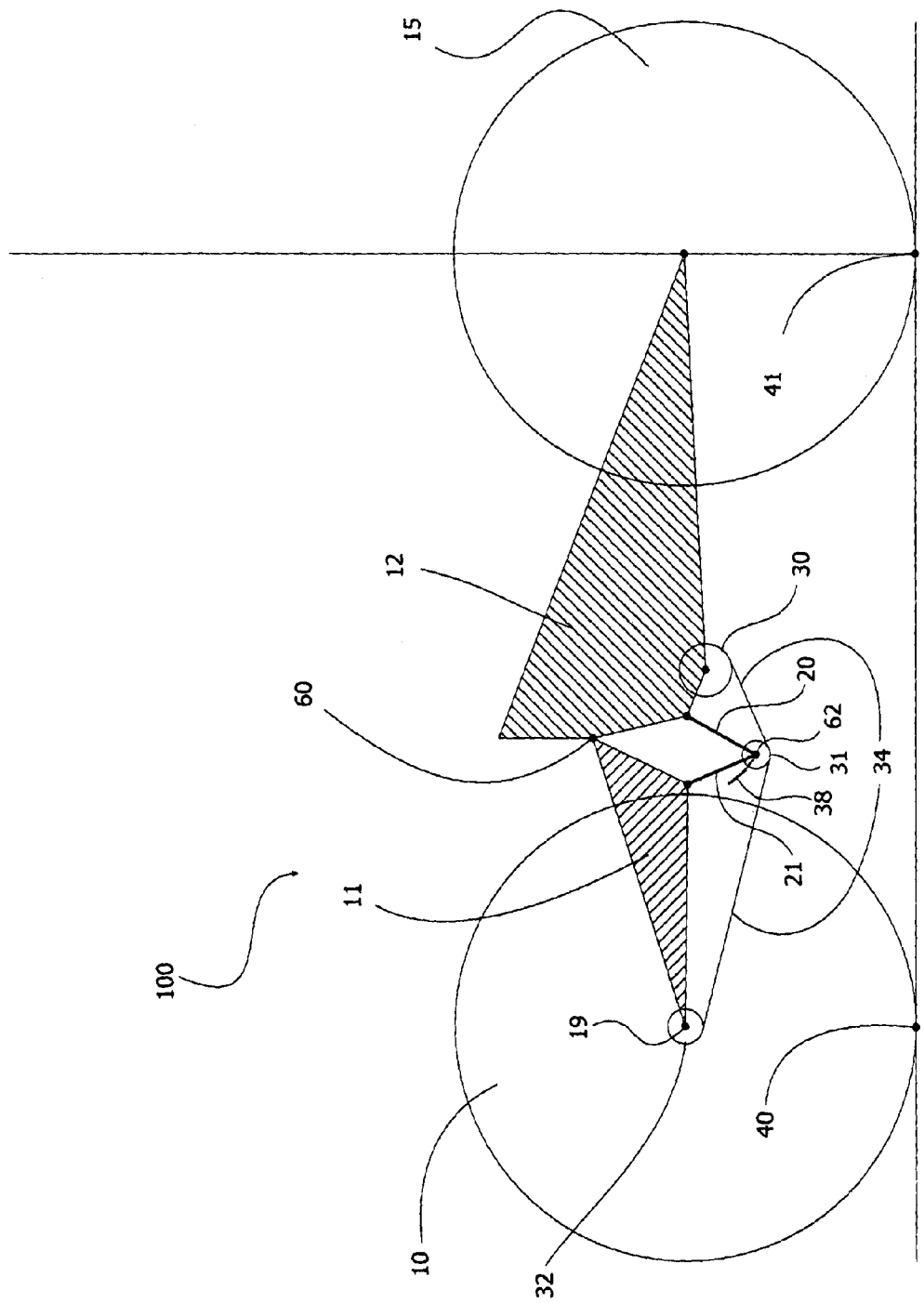
FIG. 22 shows a diagrammatic representation of a vehicle wheel suspension system according to an embodiment of the invention applicable to vehicle braking.

FIG. 22 depicts a diagrammatic representation of a braking wheel suspension system for a vehicle 100. The vehicle 100 in FIG. 22 is has a rear braking wheel suspension system. The vehicle 100 has a front wheel 15, a rear (braking) wheel 10 and a chassis 12 (the main frame or front triangle). A rear braking wheel suspension system is provided by a suspension mechanism that is configured to isolate the movement of the braking wheel 10 from the movement of the chassis 12 of the vehicle 100. The suspension mechanism includes a braking wheel carrier member 11 that is rotatably connected to the braking wheel 10 (specifically the braking wheel axle 19). The braking wheel carrier member 11 is also pivotally connected to the chassis 12 at pivot point 60. This embodiment therefore depicts a single-pivot suspension mechanism.

In FIG. 22, the vehicle 100 has a rear sprocket 32 which is fixed to the braking wheel. A front sprocket 30 is fixed to a rotary power sink (e.g. a friction device or energy recovery system) which is mounted on the chassis 12. The front sprocket 30 is mechanically coupled by a looped power transmission element (a chain in this embodiment) to fixed rear sprocket. Power is transmitted between the braking wheel 10 and the chassis 12 to generate vehicle deceleration (braking) through this drivetrain arrangement. In FIG. 22 only the power transmitting segment 34 of the chain is shown. The power transmitting segment of the chain for braking is the lower run of the chain (deceleration or braking chain run). The power transmitting segment 34 of the chain refers to the segment of chain between the front and rear sprockets that is under tension during braking.

In this embodiment, an idler member 31 (an idler sprocket) is included in the suspension system/drivetrain to alter the dynamic behaviour of the vehicle under braking. The idler sprocket 31 is configured to engage with the power transmitting segment 34 of the chain and to move to follow a predetermined path 38 as a function of suspension travel, to thereby alter a path of the power transmitting segment of the chain. This results in a controlled lengthening/shortening of the power transmitting segment of the chain. In this embodiment, the idler sprocket 31 is configured such that the power transmitting segment 34 of the chain is routed below the idler sprocket 31. In other arrangements, the chain may be routed above the idler sprocket 31 or to the left or right of it. The idler member 31 is configured to strategically affect growth or shrinkage of the deceleration chain run, thereby manipulating the amount of anti-rise.

The idler sprocket 31 in this embodiment is rotatably mounted at the pivot point 62 between a first idler carrier member 20 and a second idler carrier member 21. The first idler carrier member 20 is pivotally connected to the chassis 12. The second idler carrier member 21 is pivotally connected to the driven wheel carrier member 11. In this embodiment, movement of the idler sprocket 31 during suspension travel is governed by a 'linkage' mechanism (the first and second idler carrier members) operating between the driven wheel carrier member 11 and the chassis 12. Importantly, the idler carrier members 20, 21 are movable relative to both the chassis 12 and driven wheel carrier member 11.

Motorcycle Embodiment

The invention may be applied to control the dynamic behaviour of a motorcycle under powered acceleration or braking. An idler sprocket may be incorporated into the drivetrain according to the principles of the invention to enable the acceleration or deceleration (braking) response of the motorcycle to be tuned.

The motorcycle is a special case, where the drivetrain used for acceleration is the same drivetrain used for deceleration (engine braking). This brings further usefulness to the present invention, whereby tuning of the acceleration response or braking response can be used to eliminate or reduce overall growth/shrinkage of the looped power transmission element (the chain or belt).

Figure 23A:
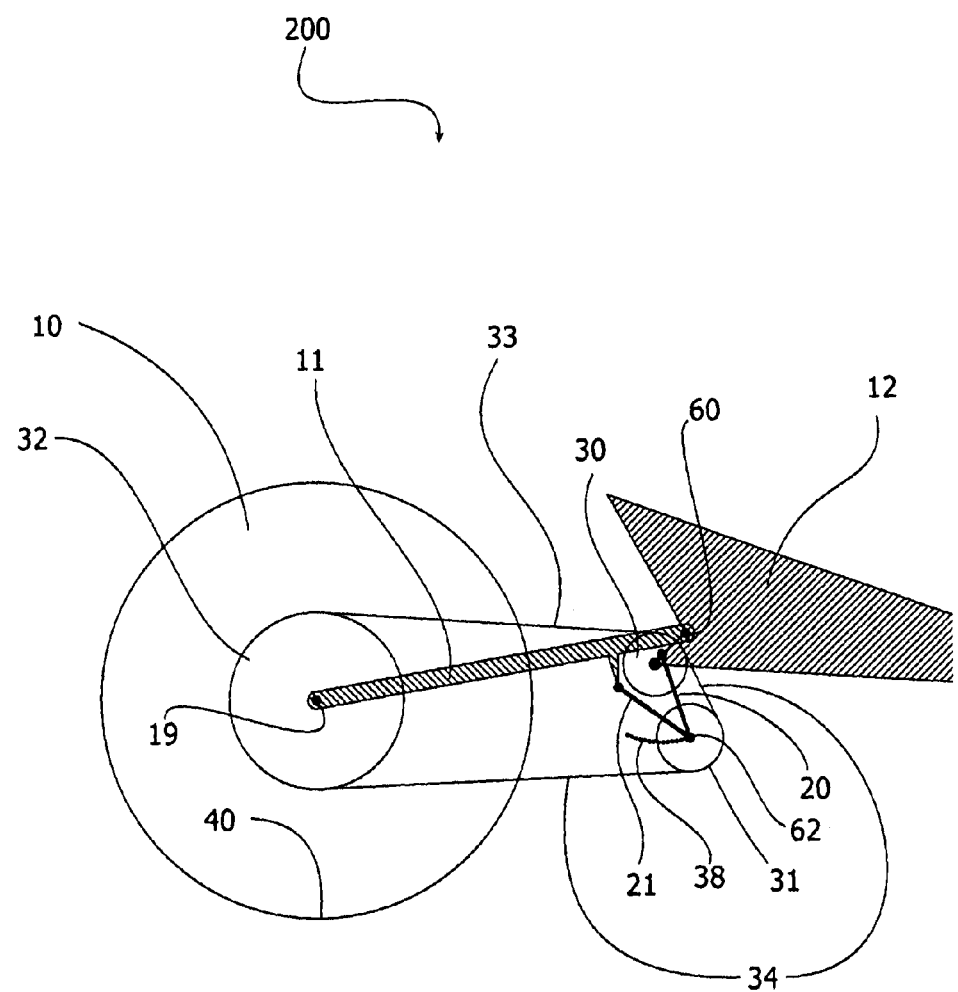
FIG. 23a shows a diagrammatic representation of a motorcycle wheel suspension system according to an embodiment of the invention.

Referring now to FIG. 23*a* there is shown an embodiment of the invention for a motorcycle 200. The motorcycle 200 has a rear power transmitting wheel suspension system. The motorcycle 200 has a front wheel 15 (not shown), a rear (power transmitting) wheel 10 and a chassis 12. A rear power transmitting wheel suspension system is provided by a suspension mechanism that is configured to isolate the movement of the power transmitting wheel 10 from the chassis 12 of the motorcycle 200. The suspension mechanism includes a power transmitting wheel carrier link 11 (a swingarm) that is rotatably connected to the power transmitting wheel 10 (specifically to the power transmitting wheel axle 19). The power transmitting wheel carrier member 11 is also pivotally connected to the chassis 12 at pivot point 60.

A front sprocket 30 is rotatably mounted to the chassis 12 and operably connected to a rotary power source or sink also mounted on the chassis 12. For a motorcycle, the rotary power source and sink are the same element (i.e. the engine). When engine braking (using friction in the engine to decelerate), the engine may be referred to as a power sink. The front sprocket 30 is mechanically coupled by a chain (or suitable looped power transmission element) to a rear sprocket 32 that is fixed to the power transmitting wheel 10. Power is transmitted between the power source or sink and the power transmitting wheel. When accelerating, the power transmitting wheel 10 is driven by the power transmitting chain segment 33 (the upper chain run or acceleration chain run) that is in tension. When engine braking, power is transmitted between the power transmitting wheel 10 and the power sink via the power transmitting segment of the chain 34 (the lower chain run or deceleration chain run) which comes under tension when engine braking.

If a rider quickly reduces the engine power (by closing a throttle), then friction in the engine causes an overall deceleration of the vehicle. This deceleration is referred to as engine braking as previously described. The friction in the engine (engine braking force) is transmitted to the power transmitting wheel 10 via the lower run of the chain 34 (the deceleration chain run). Consequently, the transmission of this engine braking force can influence the suspension behaviour (in the same way that under powered acceleration the driving force influences suspension behaviour). This effect is known as "anti-rise" as discussed previously, and is analogous to anti-squat. It is possible to quantify anti-rise using the same graphical method as for anti-squat. It is also possible to graph the quantity of anti-rise, as a function of suspension travel, to produce an "Engine Braking Response" curve. For a given vehicle, the "Engine Braking Response" and the "Acceleration Response" can be plotted on the same set of axes, to give a visual representation of the overall performance of the vehicle's suspension system.

It can be shown that the separation distance between the engine braking response curve and the acceleration response curve is indicative of the amount of overall chain growth/shrinkage that might occur as the suspension moves. With current technology, overall chain growth/shrinkage is accommodated using a spring loaded chain tensioner. An undesirable effect of such a tensioner is that when the vehicle changes from a state of acceleration to a state of engine braking (and vice-versa), the tensioner takes up (or releases) chain slack. This results in 'slop' between acceleration and engine braking.

In some applications, it may be desirable to reduce/eliminate the amount of overall chain growth/shrinkage, so that it is not necessary to use a spring loaded chain tensioner.

The present invention can be used in a number of ways to reduce/eliminate the overall chain growth/shrinkage:

Idler sprocket acting on deceleration chain run, to tune the engine braking response to closely match the acceleration response.

Idler sprocket acting on acceleration chain run, to tune the acceleration response to closely match the engine braking response.

Idler sprockets acting on both the acceleration chain run and the deceleration chain run, to produce desired acceleration and engine braking responses that are closely matched.

Referring again to FIG. 23a, an idler member 31 (an idler sprocket) is included in the suspension system/drivetrain to alter the dynamic behaviour of the vehicle under engine braking. The idler sprocket 31 is configured to engage with the power transmitting segment 34 of the chain and to move to follow a predetermined path 38 as a function of suspension travel, to thereby alter a path of the power transmitting segment 34 of the chain. This results in a controlled lengthening/shortening of the power transmitting segment of the chain. In this embodiment, the idler sprocket 31 is configured such that the power transmitting segment 34 of the chain is routed below the idler sprocket 31. In other arrangements, the chain may be routed above the idler sprocket 31 or to the left or right of it. The idler member 31 is configured to strategically affect growth or shrinkage of the deceleration chain run, thereby manipulating the amount of anti-rise.

The idler sprocket 31 in this embodiment is rotatably mounted at the pivot point 62 between a first idler carrier member 20 and a second idler carrier member 21. The first idler carrier member 20 is pivotally connected to the chassis 12. The second idler carrier member 21 is pivotally connected to the driven wheel carrier member 11. In this embodiment, movement of the idler sprocket 31 during suspension travel is governed by a 'linkage' mechanism (the first and second idler carrier members) operating between the driven wheel carrier member 11 and the chassis 12. Importantly, the idler carrier members 20, 21 are movable relative to both the chassis 12 and driven wheel carrier member 11.

Figure 23B:
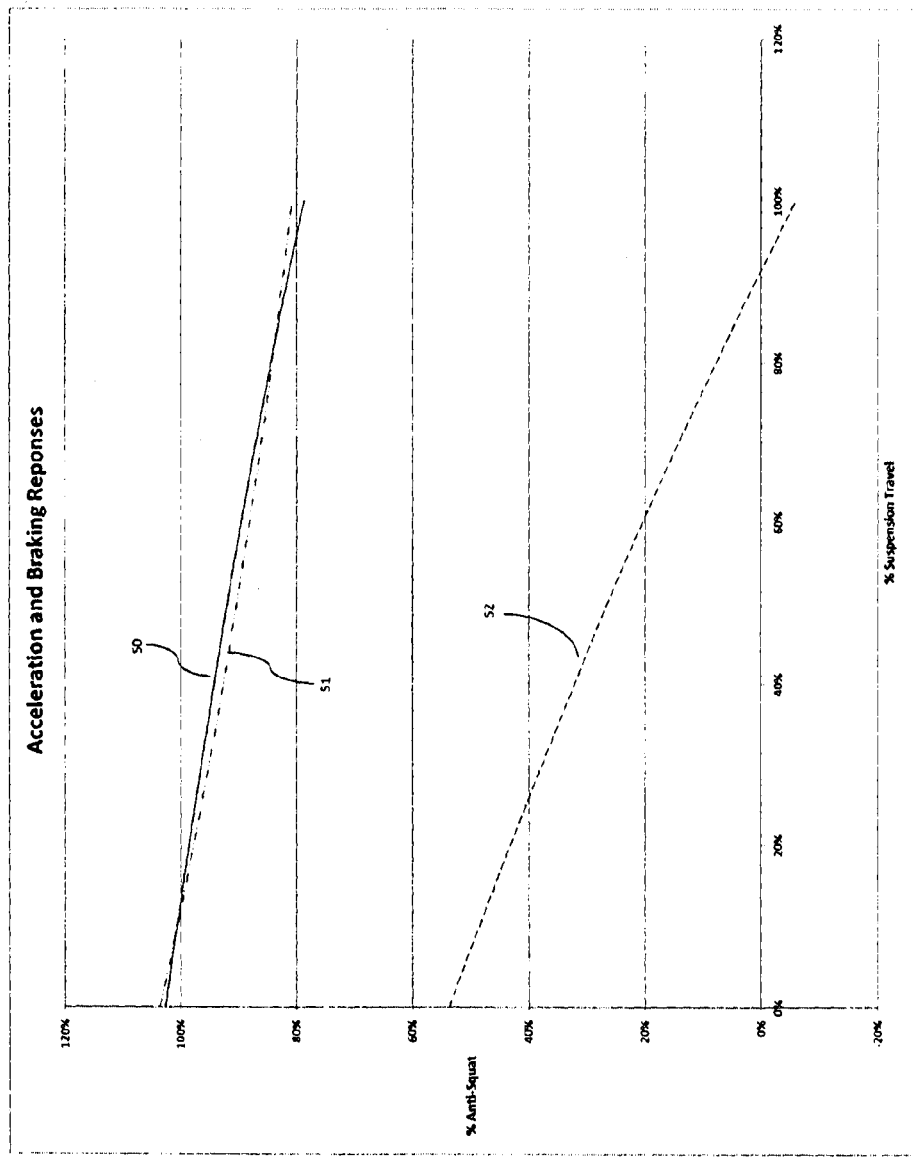

For this example, the location of pivot point 60 (position where the power transmitting wheel carrier member 11 pivots about the chassis 12) is selected to produce a desired acceleration response curve 50 as shown in FIG. 23b. If the power transmitting segment 34 of the chain was run directly from the rear sprocket 32 to the front sprocket 30 with no idler sprocket, the system would exhibit a non-idler braking response curve 52 also shown in FIG. 23b. By strategically manipulating the power transmitting segment 34 of the chain using the idler sprocket 31, the system can be made to exhibit the braking response curve 51. The braking response curve 51 closely matches the acceleration response curve 50, thereby virtually eliminating overall chain growth/shrinkage.

In the embodiment illustrated in FIG. 23a, an idler sprocket 31 according to the present invention is used to tune the engine braking response of the motorcycle 200. In alternative embodiments, the idler sprocket 31 may be used to tune the acceleration response or both the acceleration and braking responses.

Front Wheel Drive Embodiment

As previously highlighted, the present invention can be applied to front wheel drive vehicles also.

Figure 24:
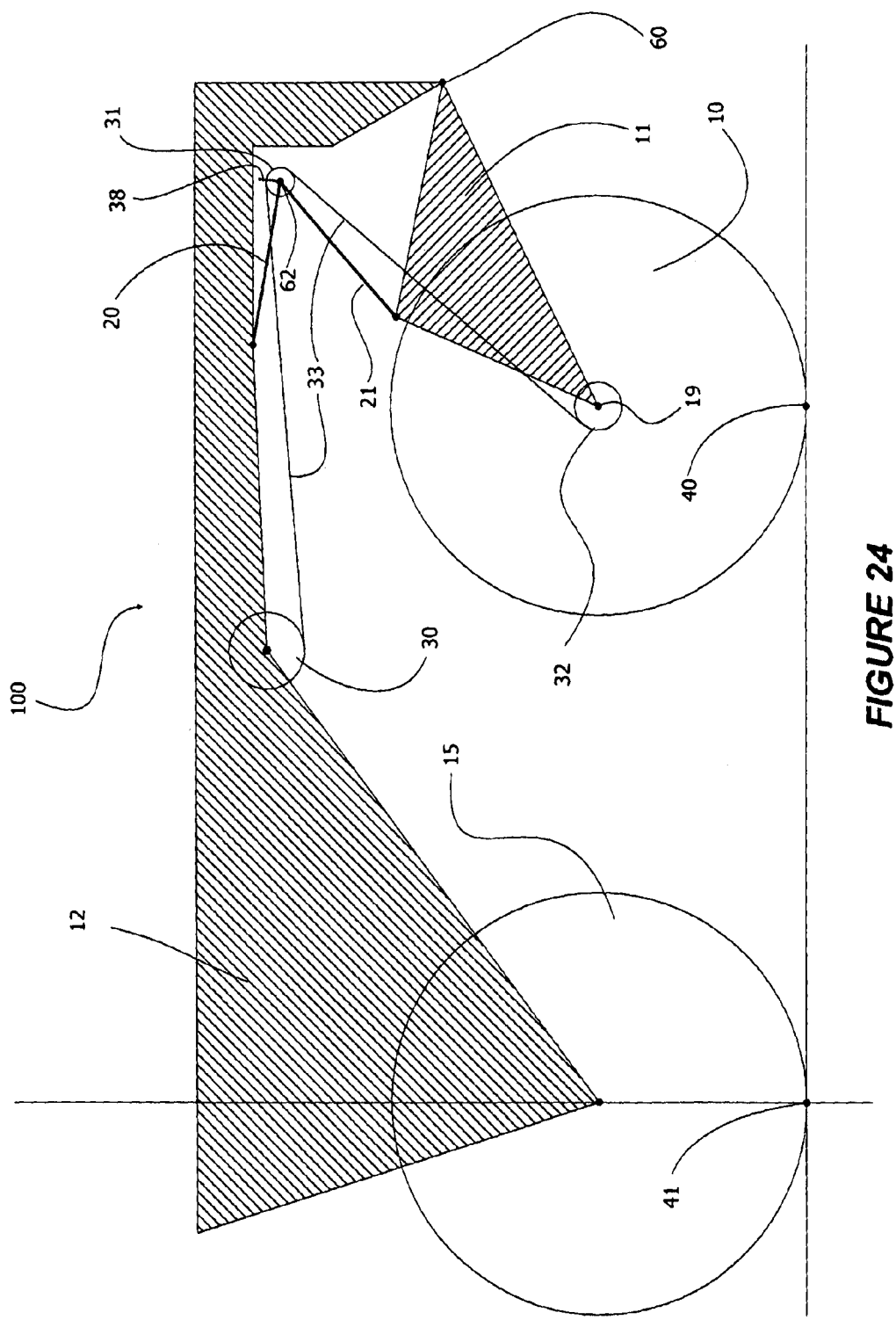
FIG. 24 shows a diagrammatic representation of how the present invention can be applied to a front wheel drive vehicle.

FIG. 24 depicts a front wheel drive vehicle embodiment of the present invention. The vehicle 100 in FIG. 24 has a front driven wheel suspension system. The vehicle 100 has a front (driven) wheel 10, a rear (non-driven) wheel 15 and a chassis 12. A front driven wheel suspension system is provided by a suspension mechanism that is configured to isolate the movement of the driven wheel 10 from the movement of the chassis 12 of the vehicle 100. The suspension mechanism includes a driven wheel carrier link 11 that is rotatably connected to the driven wheel 10 (specifically the driven wheel axle 19). The wheel carrier link 11 is also pivotally connected to the chassis 12 at pivot point 60. This embodiment therefore represents a single-pivot suspension mechanism.

A driving sprocket 30 is rotatably mounted to the chassis 12 and receives rotary power from a power source such as an engine (not shown) mounted on the chassis 12. The driving sprocket 30 is mechanically coupled by a looped power transmission element (a chain in this embodiment) to a driven sprocket 32 that is engaged with the driven wheel 10. Power is transmitted from the power source to the driven wheel 10 to generate vehicle acceleration through this chain-driven drivetrain arrangement. In FIG. 24 only the power transmitting segment 33 of the chain is shown. The power transmitting segment of the chain is known as the 'acceleration chain run' or 'power run'. The power transmitting segment refers to the segment of chain between the sprockets that is under tension during powered acceleration of the vehicle.

In this embodiment, an idler member 31 (an idler sprocket) is included in the suspension system/drivetrain to alter the dynamic behaviour of the vehicle under powered acceleration. The idler sprocket 31 is configured to engage with the power transmitting segment 33 of the chain and to move to follow a predetermined path 38 as a function of suspension travel, to thereby alter a path of the power transmitting segment 33 of the chain. This results in a controlled lengthening/shortening of the power transmitting segment of the chain. In this embodiment, the idler sprocket 31 is configured such that the power transmitting segment 33 of the chain is routed above the idler sprocket 31. In other arrangements, the chain may be routed below the idler sprocket 31 or to the left or right of it. The idler member 31 is configured to strategically affect growth or shrinkage of the power chain run, thereby manipulating the amount of anti-rise.

The idler sprocket 31 in this embodiment is rotatably mounted at the pivot point 62 between a first idler carrier member 20 and a second idler carrier member 21. The first idler carrier member 20 is pivotally connected to the chassis 12. The second idler carrier member 21 is pivotally connected to the driven wheel carrier member 11. In this embodiment, movement of the idler sprocket 31 during suspension travel is governed by a 'linkage' mechanism (the first and second idler carrier members) operating between the driven wheel carrier member 11 and the chassis 12. Importantly, the idler carrier members 20, 21 are movable relative to both the chassis 12 and driven wheel carrier member 11.

It will be appreciated by those skilled in the art that there are numerous ways of configuring a suspension mechanism to isolate movement of the driven wheel from the chassis. It is to be understood that any of the mechanisms previously described (e.g. four-bar, six-bar, slider-slider etc.) may be incorporated in many different ways, to facilitate isolated movement of the driven wheel for a front wheel suspension system. The invention shall be taken to include all such permutations which are not described with reference to further illustrations.

It will also be appreciated by those skilled in the art that there are numerous ways of incorporating an idler member into a front driven wheel suspension system within the scope of the present invention. It is to be understood that any of the mechanisms previously described may be incorporated to operate between any two movable elements of an overall suspension system (i.e. including movable elements that might also be used to operate a spring/damper mechanism).

The invention shall be taken to include all such permutations which are not described with reference to further illustrations.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

It will be appreciated by those skilled in the art that the invention is not restricted in its use to the particular applications described. Neither is the present invention restricted in its preferred embodiments with regard to the particular elements and/or features described or depicted herein. It will be appreciated that the invention is not limited to the embodiments disclosed, but is capable of numerous rearrangements, modifications and substitutions without departing from the scope of the invention as set forth and defined by the following claims.

What is claimed is:

1. A driven wheel suspension system for a vehicle having a chassis suspended from a driven wheel, including:
    a suspension mechanism including a driven wheel carrier member rotatably connected to the driven wheel, the suspension mechanism configured to isolate the movement of the driven wheel from the movement of the chassis, the driven wheel movable a distance relative to the chassis which defines a suspension travel;
    a drivetrain including a looped power transmission element configured to transmit power between the driven wheel and a power source mounted on the chassis; and
    an idler member rotatably mounted on an idler carrier member that is movable relative to both the chassis and driven wheel carrier member, said idler member configured to engage with a power transmitting segment of the looped power transmission element and move to follow a predetermined path as a function of suspension travel, to thereby alter a path of said power transmitting segment of the looped power transmission element,
    wherein, altering the path of said power transmitting segment of the looped power transmission element results in a lengthening or shortening of the power transmitting segment of the looped power transmission element.

2. The driven wheel suspension system as claimed in claim 1 wherein the idler member is rotatably mounted on an idler carrier member that forms part of a linkage mechanism.

3. The driven wheel suspension system as claimed in claim 1 wherein the idler member is rotatably mounted on an idler carrier member that forms part of a link and slider mechanism.

4. The driven wheel suspension system as claimed in claim 1 wherein the idler member is rotatably mounted on an idler carrier member that forms part of a geared mechanism.

5. The driven wheel suspension system as claimed in claim 1 wherein the idler member is rotatably mounted on an idler carrier member that forms part of a belt and pulley mechanism.

6. The driven wheel suspension system as claimed in claim 1 wherein the suspension mechanism is a single-pivot arrangement whereby the driven wheel carrier member is pivotally connected to the chassis.

7. The driven wheel suspension system as claimed in claim 1 wherein the suspension mechanism is a four-bar linkage.

8. The driven wheel suspension system as claimed in claim 1 wherein the suspension mechanism is a six-bar linkage.

9. The driven wheel suspension system as claimed in claim 1 wherein the suspension mechanism is slidable on linear tracks.

10. The driven wheel suspension system as claimed in claim 1 wherein the looped transmission member is a chain.

11. The driven wheel suspension system as claimed in claim 10 wherein the idler member is a sprocket.

12. The driven wheel suspension system as claimed in claim 1 wherein the looped transmission member is a belt.

13. The driven wheel suspension system as claimed in claim 12 wherein the idler member is a pulley.

14. The driven wheel suspension system as claimed in claim 1 wherein the power source is a motor.

15. The driven wheel suspension system as claimed in claim 1 wherein the power source is manually operated.

16. The driven wheel suspension system as claimed in claim 1 wherein the driven wheel is a rear wheel of the vehicle.

17. The driven wheel suspension system as claimed in claim 1 wherein the driven wheel is a front wheel of the vehicle.

18. The driven wheel suspension system as claimed in claim 1 wherein the idler member is configured such that the power transmitting segment of the looped power transmission element is routed above the idler member.

19. The driven wheel suspension system as claimed in claim 1 wherein the idler member is configured such that the power transmitting segment of the looped power transmission element is routed below the idler member.

20. A driven wheel suspension system for a bicycle having a chassis suspended from a rear driven wheel, including:
    a suspension mechanism including a driven wheel carrier member rotatably connected to the driven wheel, the suspension mechanism configured to isolate the movement of the driven wheel from the movement of the chassis, the driven wheel movable a distance relative to the chassis which defines a suspension travel;
    a drivetrain configured to transmit power between the driven wheel and a power source mounted on the chassis, the drivetrain including:
        a driving sprocket rotatably mounted to the chassis that receives power from the power source;
        a driven sprocket mounted to the driven wheel;
        a chain looped around and engaged with the driving sprocket and the driven sprocket; and
    an idler member rotatably mounted on an idler carrier member that is movable relative to both the chassis and driven wheel carrier member, said idler member configured to engage with a power transmitting segment of the chain and move to follow a predetermined path as a function of suspension travel, to thereby alter a path of said power transmitting segment of the chain,
    wherein, altering the path of said power transmitting segment of the chain results in a lengthening or shortening of the power transmitting segment of chain.

21. A power transmitting wheel suspension system for a motorcycle having a chassis suspended from a rear power transmitting wheel, including:
    a suspension mechanism including a power transmitting wheel carrier member rotatably connected to the power transmitting wheel, the suspension mechanism configured to isolate the movement of the power transmitting wheel from the movement of the chassis, the power transmitting wheel movable a distance relative to the chassis which defines a suspension travel;

a drivetrain configured to transmit power between a power source or power sink mounted on the chassis and the power transmitting wheel, the drivetrain including:
  a front sprocket rotatably mounted to the chassis and operatively connected to the power source or power sink;
  a rear sprocket fixed to the power transmitting wheel;
  a chain looped around and engaged with the front sprocket and the rear sprocket; and
an idler member rotatably mounted on an idler carrier member that is movable relative to both the chassis and power transmitting wheel carrier member, said idler member configured to engage with a power transmitting segment of the chain and move to follow a predetermined path as a function of suspension travel, to thereby alter a path of said power transmitting segment of the chain,
wherein, altering the path of said power transmitting segment of the chain results in a lengthening or shortening of the power transmitting segment of the chain.

22. A vehicle having a chassis and a power transmitting wheel, including:
  a drivetrain having a chain or belt and configured to:
    (a) transmit power between the power transmitting wheel and a power source mounted to the chassis in order to accelerate the vehicle; or
    (b) transmit power between the power transmitting wheel and a power sink mounted to the chassis in order to brake the vehicle;
  a suspension mechanism including a power transmitting wheel carrier member rotatably connected to the power transmitting wheel, the suspension mechanism configured to isolate the movement of the power transmitting wheel from the movement of the chassis, the power transmitting wheel movable a distance relative to the chassis which defines a suspension travel; and
  an idler member rotatably mounted on an idler carrier member that is movable relative to both the chassis and power transmitting wheel carrier member, said idler member configured to engage with a power transmitting segment of the chain or belt and move to follow a predetermined path as a function of suspension travel, to thereby alter a path of said power transmitting segment of the chain or belt;
  wherein, altering the path of said power transmitting segment of the chain or belt results in a lengthening or shortening of the power transmitting segment of the chain or belt.

* * * * *